United States Patent [19]

Abe et al.

[11] Patent Number: 5,029,017

[45] Date of Patent: Jul. 2, 1991

[54] IMAGE PROCESSING APPARATUS CAPABLE OF ENLARGING/REDUCING APPARATUS

[75] Inventors: Yoshinori Abe; Masahiko Matsunawa, both of Tokyo, Japan

[73] Assignee: Konishiroku Photo Industry Co., Ltd., Tokyo, Japan

[21] Appl. No.: 534,379

[22] Filed: Jun. 7, 1990

Related U.S. Application Data

[63] Continuation of Ser. No. 105,181, Oct. 6, 1987, abandoned.

[30] Foreign Application Priority Data

| Oct. 8, 1986 | [JP] | Japan | 61-241119 |
| Oct. 8, 1986 | [JP] | Japan | 61-241120 |
| Oct. 8, 1986 | [JP] | Japan | 61-241121 |
| Oct. 8, 1986 | [JP] | Japan | 61-241122 |
| Oct. 8, 1986 | [JP] | Japan | 61-241123 |
| Oct. 8, 1986 | [JP] | Japan | 61-314374 |

[51] Int. Cl.$^5$ .............................................. H04N 1/00
[52] U.S. Cl. ................................... 358/451; 358/448
[58] Field of Search ................ 358/451, 140, 160, 22, 358/448, 453; 364/521

[56] References Cited

U.S. PATENT DOCUMENTS

| 4,075,663 | 2/1978  | Wellendorf. |         |
| 4,153,896 | 5/1979  | White       | 364/521 |
| 4,193,092 | 3/1980  | Stoffel.    |         |
| 4,275,450 | 6/1981  | Potter.     |         |
| 4,303,948 | 12/1981 | Arai et al. | 358/451 |
| 4,496,974 | 1/1985  | Heitmann    | 358/140 |
| 4,528,693 | 7/1985  | Pearson et al. | |
| 4,561,024 | 12/1985 | Tamura      | 358/451 |
| 4,633,503 | 12/1986 | Hinman.     |         |
| 4,701,806 | 10/1987 | Nagoshima   | 358/451 |
| 4,725,892 | 2/1988  | Suzuki et al. | |

*Primary Examiner*—James J. Groody
*Assistant Examiner*—David E. Harvey
*Attorney, Agent, or Firm*—Finnegan, Henderson, Farabow, Garrett and Dunner

[57] ABSTRACT

In an image processing apparatus capable of enlarging/reducing operation according to the invention, there are provided an input buffer for storing an image data, an enlargement/reduction circuit for performing the enlargement/reduction processing of the image data outputted from the input buffer, an output buffer for storing the enlarged/reduced image data, and a timing circuit for controlling processing timing for the image data through the input buffer, the enlargement/reduction circuit and the output buffer. The timing circuit respectively controls the data read-out timing from the input buffer and the data write-in timing into the output buffer in accordance with the designated enlargement/reduction ratio by regulating the frequency of clock pulse.

21 Claims, 51 Drawing Sheets

FIG. 6
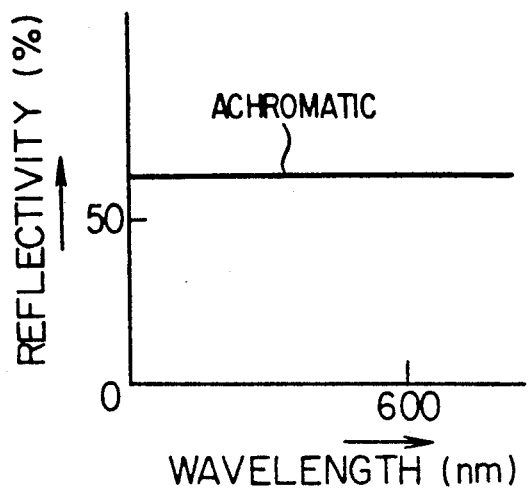
6-A
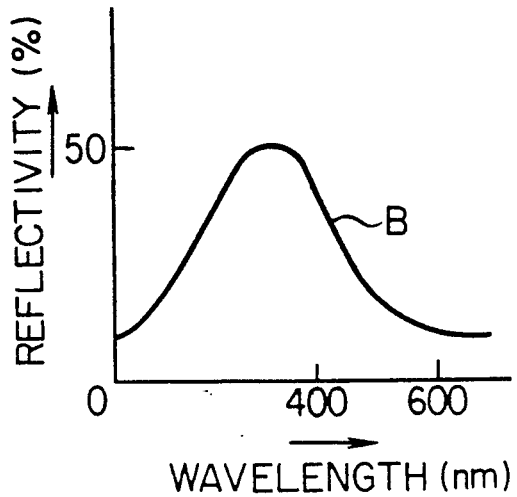
6-B
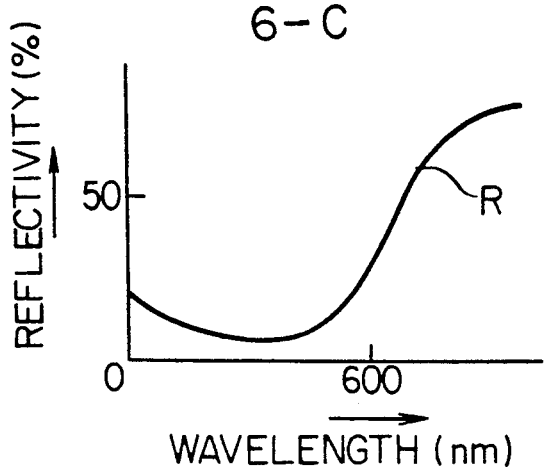
6-C
FIG. 7
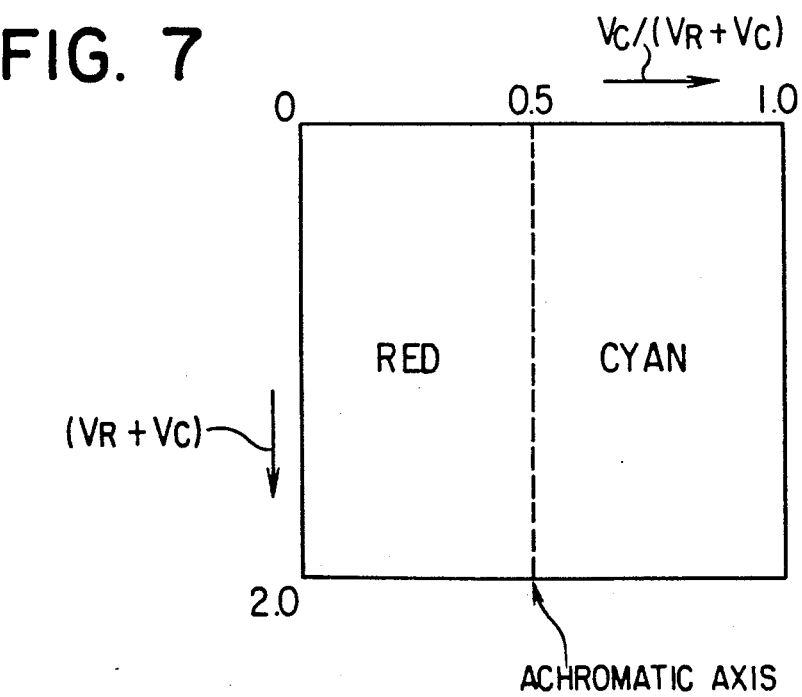

FIG. 15

| | (INCREASING INCLINATION) | | | (DECRESING INCLINATION) | |
|---|---|---|---|---|---|
| 0F0 | 0.00000 | 0 | F00 | 15.00000 | F |
| 0F1 | 0.93750 | 1 | F01 | 14.06250 | E |
| 0F2 | 1.87500 | 2 | F02 | 13.12500 | D |
| 0F3 | 2.81250 | 3 | F03 | 12.18750 | C |
| 0F4 | 3.75000 | 4 | F04 | 11.25000 | B |
| 0F5 | 4.68750 | 5 | F05 | 10.31250 | A |
| 0F6 | 5.62500 | 6 | F06 | 9.37500 | 9 |
| 0F7 | 6.56250 | 7 | F07 | 8.43750 | 8 |
| 0F8 | 7.50000 | 8 | F08 | 7.50000 | 8 |
| 0F9 | 8.43750 | 9 | F09 | 6.56250 | 7 |
| 0FA | 9.37500 | A | F0A | 5.62500 | 6 |
| 0FB | 10.31250 | B | F0B | 4.68750 | 5 |
| 0FC | 11.25000 | C | F0C | 3.75000 | 4 |
| 0FD | 12.18750 | D | F0D | 2.81250 | 3 |
| 0FE | 13.12500 | E | F0E | 1.87500 | 2 |
| 0FF | 14.06250 | | F0F | 0.93750 | 1 |

IMAGE DATA D0
IMAGE DATA D1
INTERPORATION DATA S
INTERPOLATION SELECTION DATA SD

FIG. 16

INTERPOLATION SELECTION DATA SD → STEP NO.

| ADRS | +0 | +1 | +2 | +3 | +4 | +5 | +6 | +7 | +8 | +9 | +A | +B | +C | +D | +E | +F |
|------|----|----|----|----|----|----|----|----|----|----|----|----|----|----|----|----|
| 400  | 4  | 4  | 4  | 3  | 3  | 3  | 3  | 2  | 2  | 2  | 2  |    | 1  | 1  | 1  | 0  |
| 410  | 4  | 4  | 4  | 3  | 3  | 3  | 3  | 3  | 2  | 2  | 2  | 1  | 1  | 2  | 1  | 1  |
| 420  | 4  | 4  | 4  | 4  | 4  | 3  | 3  | 3  | 3  | 3  | 3  | 2  | 2  | 2  | 2  | 2  |
| 430  | 4  | 4  | 4  | 4  | 4  | 4  | 4  | 4  | 4  | 3  | 3  | 3  | 3  | 3  | 3  | 3  |
| 440  | 4  | 4  | 4  | 4  | 4  | 4  | 4  | 4  | 4  | 4  | 4  | 4  | 4  | 4  | 4  | 4  |
| 450  | 4  | 4  | 4  | 4  | 4  | 4  | 4  | 4  | 5  | 5  | 5  | 5  | 5  | 5  | 5  | 5  |
| 460  | 4  | 4  | 4  | 5  | 5  | 5  | 5  | 5  | 5  | 5  | 5  | 5  | 6  | 6  | 6  | 6  |
| 470  | 4  | 4  | 5  | 5  | 5  | 5  | 6  | 6  | 6  | 6  | 6  | 6  | 6  | 6  | 7  | 7  |
| 480  | 4  | 4  | 5  | 5  | 5  | 6  | 6  | 6  | 7  | 6  | 7  | 7  | 7  | 7  | 8  | 8  |
| 490  | 4  | 5  | 5  | 5  | 5  | 6  | 6  | 7  | 7  | 7  | 7  | 7  | 8  | 8  | 8  | 9  |
| 4A0  | 4  | 5  | 5  | 5  | 5  | 6  | 7  | 7  | 7  | 8  | 8  | 8  | 9  | 9  | 9  | A  |
| 4B0  | 4  | 5  | 5  | 5  | 5  | 7  | 7  | 8  | 8  | 9  | 8  | 9  | 9  | A  | A  | B  |
| 4C0  | 4  | 5  | 5  | 5  | 7  | 7  | 7  | 8  | 8  | 9  | 9  | A  | A  | B  | B  | C  |
| 4D0  | 4  | 5  | 5  | 5  | 7  | 7  | 8  | 9  | 9  | A  | A  | A  | B  | B  | C  | C  |
| 4E0  | 4  | 5  | 5  | 5  | 7  | 7  | 8  | 9  | 9  | A  | A  | B  | C  | C  | D  | D  |
| 4F0  | 4  | 5  | 5  | 5  | 7  | 7  | 8  | 9  | A  | A  | B  | C  | C  | D  | E  | E  |

IMAGE DATA D0 — IMAGE DATA D1 — INTERPOLATION DATA S

CONTENTS OF INTERPOLATION DATA MEMORY 13

FIG. 17

| DENSITY | THRESHOLD VALUE DATA |
|---|---|
| LOW | 2H |
| ↓ | 5H |
| REGULAR | 8H |
| ↓ | BH |
| HIGH | EH |

| D | 5 | C | 3 |
|---|---|---|---|
| 1 | 9 | 0 | 7 |
| A | 2 | B | 4 |
| 0 | 6 | 1 | 8 |

18-B

| F | 7 | D | 5 |
|---|---|---|---|
| 3 | B | 1 | 9 |
| C | 4 | E | 6 |
| 0 | 8 | 2 | A |

18-C

| F | 9 | E | 7 |
|---|---|---|---|
| 5 | D | 3 | B |
| E | 6 | F | 8 |
| 2 | A | 4 | C |

A  REDUCING RECORD

B  ENLARGING RECORD

C  EQUAL SIZE RECORD

| MAGNIFICAT-ION M | READING START ADDRESS OF INPUT BUFFER | WRITING START ADDRESS OF OUTPUT BUFFER |
|---|---|---|
| 50 % | 0 | 1024 |
| 51 % | 0 | 1004 |
| 52 % | 0 | 983 |
| ⋮ | ⋮ | ⋮ |
| 100 % | 0 | 0 |
| 101 % | 20 | 0 |
| ⋮ | ⋮ | ⋮ |
| 198 % | 1014 | 0 |
| 199 % | 1019 | 0 |
| 200 % | 1024 | 0 |

FIG. 34

| ORIGINAL IMAGE DATA NO. | SAMPLING POSITION | | INTERPOLATION SELECTION DATA SD | ORIGINAL IMAGE DATA NO. | SAMPLING POSITION | | INTERPOLATION SELECTION DATA SD | ORIGINAL IMAGE DATA NO. | SAMPLING POSITION | | INTERPOLATION SELECTION DATA SD |
|---|---|---|---|---|---|---|---|---|---|---|---|
| 0 | 0.00000 | 0.62500 | 0A | 33 | 33.12500 | 33.75000 | 2C | 66 | 66.25000 | 66.87500 | 4E |
| 1 | 1.25000 | 1.87500 | 4E | 34 | 34.37500 | | 6 | 67 | 67.50000 | | 8 |
| 2 | 2.50000 | | 8 | 35 | 35.00000 | 35.62500 | 0A | 68 | 68.12500 | 68.75000 | 2C |
| 3 | 3.12500 | 3.75000 | 2C | 36 | 36.25000 | 36.87500 | 4E | 69 | 69.37500 | | 6 |
| 4 | 4.37500 | | 6 | 37 | 37.50000 | | 8 | 70 | 70.00000 | 70.62500 | 0A |
| 5 | 5.00000 | 5.62500 | 0A | 38 | 38.12500 | 38.75000 | 2C | 71 | 71.25000 | 71.87500 | 4E |
| 6 | 6.25000 | 6.87500 | 4E | 39 | 39.37500 | | 6 | 72 | 72.50000 | | 8 |
| 7 | 7.50000 | | 8 | 40 | 40.00000 | 40.62500 | 0A | 73 | 73.12500 | 73.75000 | 2C |
| 8 | 8.12500 | 8.75000 | 2C | 41 | 41.25000 | 41.87500 | 4E | 74 | 74.37500 | | 6 |
| 9 | 9.37500 | | 6 | 42 | 42.50000 | | 8 | 75 | 75.00000 | 75.62500 | 0A |
| 10 | 10.00000 | 10.62500 | 0A | 43 | 43.12500 | 43.75000 | 2C | 76 | 76.25000 | 76.87500 | 4E |
| 11 | 11.25000 | 11.87500 | 4E | 44 | 44.37500 | | 6 | 77 | 77.50000 | | 8 |
| 12 | 12.50000 | | 8 | 45 | 45.00000 | 45.62500 | 0A | 78 | 78.12500 | 78.75000 | 2C |
| 13 | 13.12500 | 13.75000 | 2C | 46 | 46.25000 | 46.87500 | 4E | 79 | 79.37500 | | 6 |
| 14 | 14.37500 | | 6 | 47 | 47.50000 | | 8 | 80 | 80.00000 | 80.62500 | 0A |
| 15 | 15.00000 | 15.62500 | 0A | 48 | 48.12500 | 48.75000 | 2C | 81 | 81.25000 | 81.87500 | 4E |
| 16 | 16.25000 | 16.87500 | 4E | 49 | 49.37500 | | 6 | 82 | 82.50000 | | 8 |
| 17 | 17.50000 | | 8 | 50 | 50.00000 | 50.62500 | 0A | 83 | 83.12500 | 83.75000 | 2C |
| 18 | 18.12500 | 18.75000 | 2C | 51 | 51.25000 | 51.87500 | 4E | 84 | 84.37500 | | 6 |
| 19 | 19.37500 | | 6 | 52 | 52.50000 | | 8 | 85 | 85.00000 | 85.62500 | 0A |
| 20 | 20.00000 | 20.62500 | 0A | 53 | 53.12500 | 53.75000 | 2C | 86 | 86.25000 | 86.87500 | 4E |
| 21 | 21.25000 | 21.87500 | 4E | 54 | 54.37500 | | 6 | 87 | 87.50000 | | 8 |
| 22 | 22.50000 | | 8 | 55 | 55.00000 | 55.62500 | 0A | 88 | 88.12500 | 88.75000 | 2C |
| 23 | 23.12500 | 23.75000 | 2C | 56 | 56.25000 | 56.87500 | 4E | 89 | 89.37500 | | 6 |
| 24 | 24.37500 | | 6 | 57 | 57.50000 | | 8 | 90 | 90.00000 | 90.62500 | 0A |
| 25 | 25.00000 | 25.62500 | 0A | 58 | 58.12500 | 58.75000 | 2C | 91 | 91.25000 | 91.87500 | 4E |
| 26 | 26.25000 | 26.87500 | 4E | 59 | 59.37500 | | 6 | 92 | 92.50000 | | 8 |
| 27 | 27.50000 | | 8 | 60 | 60.00000 | 60.62500 | 0A | 93 | 93.12500 | 93.75000 | 2C |
| 28 | 28.12500 | 28.75000 | 2C | 61 | 61.25000 | 61.87500 | 4E | 94 | 95.37500 | | 6 |
| 29 | 29.37500 | | 6 | 62 | 62.50000 | | 8 | 95 | 95.00000 | 95.62500 | 0A |
| 30 | 30.00000 | 30.62500 | 0A | 63 | 63.12500 | 63.75000 | 2C | 96 | 96.25000 | 96.87500 | 4E |
| 31 | 31.25000 | 31.87500 | 4E | 64 | 64.37500 | | 6 | 97 | 97.00000 | | 8 |
| 32 | 32.50000 | | 8 | 65 | 65.00000 | 65.62500 | 0A | 98 | 98.12500 | 98.75000 | 2C |
| | | | | | | | | 99 | 99.37500 | | 6 |

ENLARGING MAGNIFICATION : 160 %

FIG. 35

CONTENTS OF DATA ROM 311 (ENLARGING MAGNIFICATION: 160%)

| ADRS | +0 | +1 | +2 | +3 | +4 | +5 | +6 | +7 | +8 | +9 | +A | +B | +C | +D | +E | +F |
|------|----|----|----|----|----|----|----|----|----|----|----|----|----|----|----|----|
| 00 | 07 | A6 | 47 | E6 | 87 | 27 | C6 | 67 | 07 | A6 | 47 | E6 | 87 | 27 | C6 | 67 |
| 10 | 07 | A6 | 47 | E6 | 87 | 27 | C6 | 67 | 07 | A6 | 47 | E6 | 87 | 27 | C6 | 67 |
| 20 | 07 | A6 | 47 | E6 | 87 | 27 | C6 | 67 | 07 | A6 | 47 | E6 | 87 | 27 | C6 | 67 |
| 30 | 07 | A6 | 47 | E6 | 87 | 27 | C6 | 67 | C7 | A6 | 47 | E6 | 87 | 27 | C6 | 67 |
| 40 | 07 | A6 | 47 | E6 | 87 | 27 | C6 | 67 | 07 | A6 | 47 | E6 | 87 | 27 | C6 | 67 |
| 50 | 07 | A6 | 47 | E6 | 87 | 27 | C6 | 67 | 07 | A6 | 47 | E6 | 87 | 27 | C6 | 67 |
| 60 | 07 | A6 | 47 | E6 | 87 | 27 | C6 | 67 | 07 | A6 | 47 | E6 | 87 | 27 | C6 | 67 |
| 70 | 07 | A6 | 47 | E6 | 87 | 27 | C6 | 67 | 07 | A6 | 47 | E6 | 87 | 27 | C6 | 67 |
| 80 | 07 | A6 | 47 | E6 | 87 | 27 | C6 | 67 | 07 | A6 | 47 | E6 | 87 | 27 | C6 | 67 |
| 90 | 07 | A6 | 47 | E6 | 87 | 27 | C6 | 67 | 07 | A6 | 47 | E6 | 87 | 27 | C6 | 63 |
| A0 | 00 | 00 | 00 | 00 | 00 | 00 | 00 | 00 | 00 | 00 | 00 | 00 | 00 | 00 | 00 | 00 |
| B0 | 00 | 00 | 00 | 00 | 00 | 00 | 00 | 00 | 00 | 00 | 00 | 00 | 00 | 00 | 00 | 00 |
| C0 | 00 | 00 | 00 | 00 | 00 | 00 | 00 | 00 | 00 | 00 | 00 | 00 | 00 | 00 | 00 | 00 |
| D0 | 00 | 00 | 00 | 00 | 00 | 00 | 00 | 00 | 00 | 00 | 00 | 00 | 00 | 00 | 00 | 00 |
| E0 | 00 | 00 | 00 | 00 | 00 | 00 | 00 | 00 | 00 | 00 | 00 | 00 | 00 | 00 | 00 | 00 |
| F0 | 00 | 00 | 00 | 00 | 00 | 00 | 00 | 00 | 00 | 00 | 00 | 00 | 00 | 00 | 00 | 00 |

INTERPOLATION SELECTION DATA SD
PROCESSING TIMING SIGNAL TD
REPEAT SIGNAL

FIG. 36

| ORIGINAL IMAGE DATA NO. | | SAMPLING POSITION | | INTERPOLATION SELECTION DATA SD | |
|---|---|---|---|---|---|
| 0 | 0.00000 0 | 33 | 33.75000 C | 66 | 66.25000 4 |
| 1 | 1.25000 4 | 34 | 35.00000 x | 67 | 67.50000 8 |
| 2 | 2.50000 8 | 35 | 35.00000 0 | 68 | 68.75000 C |
| 3 | 3.75000 C | 36 | 36.25000 4 | 69 | 70.00000 x |
| 4 | 5.00000 x | 37 | 37.50000 8 | 70 | 70.00000 0 |
| 5 | 5.00000 0 | 38 | 38.75000 C | 71 | 71.25000 4 |
| 6 | 6.25000 4 | 39 | 40.00000 x | 72 | 72.50000 8 |
| 7 | 7.00000 8 | 40 | 40.00000 0 | 73 | 73.76000 C |
| 8 | 8.75000 C | 41 | 41.25000 4 | 74 | 75.00000 x |
| 9 | 10.00000 x | 42 | 42.50000 8 | 75 | 75.00000 0 |
| 10 | 10.00000 0 | 43 | 43.75000 C | 76 | 76.25000 4 |
| 11 | 11.25000 4 | 44 | 45.00000 x | 77 | 77.50000 8 |
| 12 | 12.50000 8 | 45 | 45.00000 0 | 78 | 78.75000 C |
| 13 | 13.75000 C | 46 | 46.25000 4 | 79 | 80.00000 x |
| 14 | 15.00000 x | 47 | 47.50000 8 | 80 | 80.00000 0 |
| 15 | 15.00000 0 | 48 | 48.75000 C | 81 | 81.25000 4 |
| 16 | 16.25000 4 | 49 | 50.00000 x | 82 | 82.50000 8 |
| 17 | 17.50000 8 | 50 | 50.00000 0 | 83 | 83.75000 C |
| 18 | 18.75000 C | 51 | 51.25000 4 | 84 | 85.00000 x |
| 19 | 20.00000 x | 52 | 52.50000 8 | 85 | 85.00000 0 |
| 20 | 20.00000 0 | 53 | 53.75000 C | 86 | 86.25000 4 |
| 21 | 21.25000 4 | 54 | 55.00000 x | 87 | 87.50000 8 |
| 22 | 22.50000 8 | 55 | 55.00000 0 | 88 | 88.75000 C |
| 23 | 23.75000 C | 56 | 56.25000 4 | 89 | 90.00000 x |
| 24 | 25.00000 x | 57 | 57.50000 8 | 90 | 90.00000 0 |
| 25 | 25.00000 0 | 58 | 58.75000 C | 91 | 91.25000 4 |
| 26 | 26.25000 4 | 59 | 60.00000 x | 92 | 92.50000 8 |
| 27 | 27.50000 8 | 60 | 60.00000 0 | 93 | 93.75000 C |
| 28 | 28.75000 C | 61 | 61.25000 4 | 94 | 95.00000 x |
| 29 | 30.00000 x | 62 | 62.50000 8 | 95 | 95.00000 0 |
| 30 | 30.00000 0 | 63 | 63.75000 C | 96 | 96.25000 4 |
| 31 | 31.25000 4 | 64 | 65.00000 x | 97 | 97.00000 8 |
| 32 | 32.50000 8 | 65 | 65.00000 0 | 98 | 98.75000 C |
| | | | | 99 | 100.00000 x |

REDUCING MAGNIFICATION 80%

FIG. 37

CONTENTS OF DATA ROM 311 (REDUCING MAGNIFICATION: 80%)

| SD | +0 | +1 | +2 | +3 | +4 | +5 | +6 | +7 | +8 | +9 | +A | +B | +C | +D | +E | +F |
|----|----|----|----|----|----|----|----|----|----|----|----|----|----|----|----|----|
| 00 | 07 | 47 | 87 | C7 | 05 | 07 | 47 | 87 | C7 | 05 | 07 | 47 | 87 | C7 | 05 | 07 |
| 10 | 47 | 87 | C7 | 05 | 07 | 47 | 87 | C7 | 05 | 07 | 47 | 87 | C7 | 05 | 07 | 47 |
| 20 | 87 | C7 | 05 | 07 | 47 | 87 | C7 | 05 | 07 | 47 | 87 | C7 | 05 | 07 | 47 | 87 |
| 30 | C7 | 05 | 07 | 47 | 87 | C7 | 05 | 07 | 47 | 87 | C7 | 05 | 07 | 47 | 87 | C7 |
| 40 | 05 | 07 | 47 | 87 | C7 | 05 | 07 | 47 | 87 | C7 | 05 | 07 | 47 | 87 | C7 | 05 |
| 50 | 07 | 47 | 87 | C7 | 05 | 07 | 47 | 87 | C7 | 05 | 07 | 47 | 87 | C7 | 05 | 07 |
| 60 | 47 | 87 | C7 | 01 | 00 | 00 | 00 | 00 | 00 | 00 | 00 | 00 | 00 | 00 | 00 | 00 |
| 70 | 00 | 00 | 00 | 00 | 00 | 00 | 00 | 00 | 00 | 00 | 00 | 00 | 00 | 00 | 00 | 00 |
| 80 | 00 | 00 | 00 | 00 | 00 | 00 | 00 | 00 | 00 | 00 | 00 | 00 | 00 | 00 | 00 | 00 |
| 90 | 00 | 00 | 00 | 00 | 00 | 00 | 00 | 00 | 00 | 00 | 00 | 00 | 00 | 00 | 00 | 00 |
| A0 | 00 | 00 | 00 | 00 | 00 | 00 | 00 | 00 | 00 | 00 | 00 | 00 | 00 | 00 | 00 | 00 |
| B0 | 00 | 00 | 00 | 00 | 00 | 00 | 00 | 00 | 00 | 00 | 00 | 00 | 00 | 00 | 00 | 00 |
| C0 | 00 | 00 | 00 | 00 | 00 | 00 | 00 | 00 | 00 | 00 | 00 | 00 | 00 | 00 | 00 | 00 |
| D0 | 00 | 00 | 00 | 00 | 00 | 00 | 00 | 00 | 00 | 00 | 00 | 00 | 00 | 00 | 00 | 00 |
| E0 | 00 | 00 | 00 | 00 | 00 | 00 | 00 | 00 | 00 | 00 | 00 | 00 | 00 | 00 | 00 | 00 |
| F0 | 00 | 00 | 00 | 00 | 00 | 00 | 00 | 00 | 00 | 00 | 00 | 00 | 00 | 00 | 00 | 00 |

INTERPOLATION SELECTION DATA
PROCESSING TIMING SIGNAL TD
INVALID DATA
REPEAT SIGNAL

FIG. 48

| MAGNIFICAT-ION M | READING START ADDRESS OF INPUT BUFFER | WRITING START ADDRESS OF OUTPUT BUFFER |
|---|---|---|
| 50 % | 368 | 0 |
| 51 % | 368 | 0 |
| 52 % | 368 | 0 |
| ⋮ | ⋮ | ⋮ |
| 100 % | 368 | 0 |
| 101 % | 368 | 0 |
| ⋮ | ⋮ | ⋮ |
| 198 % | 1014 | 0 |
| 199 % | 1019 | 0 |
| 200 % | 1024 | 0 |

FIG. 49

| MAGNIFICAT-ION M | READING START ADDRESS OF INPUT BUFFER | WRITING START ADDRESS OF OUTPUT BUFFER |
|---|---|---|
| 50% | 0 | 1208 |
| 51% | 0 | 1191 |
| 52% | 0 | 1174 |
| ⋮ | ⋮ | ⋮ |
| 100% | 0 | 368 |
| ⋮ | ⋮ | ⋮ |
| 198% | 646 | 0 |
| 199% | 651 | 0 |
| 200% | 656 | 0 |

57-A REDUCING RECORD

57-B EQUAL SIZE RECORD

57-C ENLARGING RECORD

IMAGE PROCESSING APPARATUS CAPABLE OF ENLARGING/REDUCING APPARATUS

This application is a continuation of application Ser. No. 07/105,181 filed Oct. 6, 1987, now abandoned.

BACKGROUND OF THE INVENTION

The present invention relates to an enlargement/reduction type image processing device which is suitable for use in a simplified electrophotographic color copying machine.

In an image processing device which can perform the enlargement and reduction of an original image, the output devices such as an indication device and a recording device used therein generally indicate output data only in the form of binary values of white and black.

As a method for expressing the pseudo-half tone using aforementioned output devices, the dither method is known, which is one type of the area-gradation method, wherein the half-tone image can be expressed by means of altering the number of dots to be recorded in a given area (matrix).

Accordingly, in the dither method, as shown in FIG. 58, the portion corresponding to one pixel of the original, is recorded with one dot using a given threshold value matrix, whereby the output data converted into binary values are obtained. The above-mentioned output data expresses the pseudo-half tone image using the white and black binary values.

On the other hand, a color image processing device having such an output device as described above has been developed, wherein the original image obtained from the image-reading means such as a CCD can be recorded with the externally preset enlargement/reduction ratio.

In this case, an enlarged/reduced image is generally to be obtained by means of altering the frequency of clock (transfer clock) reading out the signal from the CCD depending on the enlargement/reduction ratio.

For example, if the scanning duration of one line in the main scanning direction (horizontal scanning direction) of the output device is $T_w$, and the number of pixels of one line is N, the frequency $f_o$ of the output device transfer clock can be expressed in the following equation:

$$f_o = N/T_w$$

In the same manner, if the transfer clock from the CCD is f and the time required for the CCD to scan one line is T, the following equation can be established:

$$f = N/T$$

Therefore, assuming $f > f_o$, a reduced original image is recorded; and while assuming $f < f_o$, an enlarged original image is recorded.

In the conventional image processing device as described above, the CCD transfer clock is altered depending on the enlargement/reduction ratio, resulting in the disadvantages as described below.

First, since the transfer clock supplied to the CCD is altered, the light amount of the exposure lamp has to be controlled together with the transfer clock. Consequently, a circuit for controlling the light amount has to be installed.

Second, since the transfer clock frequency supplied to the CCD has to be variable depending on the enlargement/reduction ratio, the clock oscillator to be employed has to be of a variable type. In such a configuration, the transfer clock frequency must be finely adjusted in order to be able to finely set the enlargement/reduction ratio, thus resulting in a complicated construction of the variable oscillator.

Furthermore, since the alteration of the transfer clock supplied to the CCD depending on the enlargement/reduction ratio is equivalent to the alteration of the sampling position with respect to the original image, the same data of the same sampling position of the original image may be repeatedly used in the image enlargement mode, and in the image reduction mode, some original image data may be eliminated.

In this way, the enlarged/reduced image is obtained by means of simply altering the sampling position of original image data, thus degrading the recorded image quality after the image processing.

To eliminate these disadvantages, the enlarged/reduced image should be obtained by means of increasing or decreasing image data related to a pair of adjacent original image data based on the density level relation between the pair of adjacent original image data after obtaining such original image data.

As in the case described above wherein the data interpolation is used, the image data (interpolation data) of the sampling position depending on the enlargement/reduction ratio is prepared in the form of a ROM table.

The high-speed processing type ROM table is used for this purpose, because the real time processing is required. Also, the addressing the ROM table requires the data (interpolation selection data) for designating the address of the ROM table according to the enlargement/reduction ratio, as well as a pair of image data.

Accordingly, an interpolation data selection means is installed. Also, an address counter for addressing the interpolation selection data itself is installed in the interpolation data selection means. However, if the address counter is so constructed as to be composed of a plurality of binary counter, the enlargement/reduction ratio can be set with the increment of $\frac{1}{2}^n$. For example, a counter of $2^6 = 64$ is used as an address counter, the enlargement/reduction ratio can be set only with the increment of 1/64.

Consequently, it is impossible to enlarge or reduce the original image with the arbitrary increment.

The image processing device according to the present invention using the interpolation table for enlargement and reduction of the original image, is so constructed that the enlargement/reduction ratio can be set with an arbitrary increment.

Also, for example, in order to enlarge the image two times as large as the original one, the frequency requires the clock two times larger than that of the non-enlargement/reduction mode in the enlargement/reduction processing circuit. The circuit components to be used, therefore, have to be operable up to the high frequency range, thus causing the increased cost of the components and the unstable circuit operation.

Additionally, the operation speed of the circuit components, of course, have their own limits, thereby causing various disadvantages to occur; for example, the design maximum enlargement ratio is limited.

Taking such disadvantages into consideration, the present invention proposes an image processing device wherein not only the image quality obtained after the enlargement/reduction processing is improved, but also the maximum enlargement ratio has been raised without unnecessarily increasing the circuit operation frequency.

In an image recording device whereby enlargement and reduction of an original image can be performed, when a photo-electric conversion element is to be used as an image-reading means such as a CCD and the like, it is a general method, as already mentioned above, to obtain the enlarged/reduced image signals by means of increasing or decreasing the appropriate image data depending on the enlargement/reduction ratio with respect to the picture element data of the original image which has been read out by the photoelectric conversion element.

FIG. 54 is a main portion of a block diagram showing an example of a processing system for executing the enlargement/reduction procedures used in an image processing device incorporating the principle described above.

In the diagram, 40 is a memory for the image data, and its input terminal 41 is supplied with an image data D which has been read out by the image reading means and undergone the enlargement and reduction processing. The output image data obtained by an output terminal 42, is supplied to the recording device or the like, thus allowing an enlarged/reduced image to be reproduced.

When executing the enlargement/reduction procedures, the image data quantity to be supplied to the memory 40 is restricted by the recording width of the recording device; in such a case, the output timing of an address generator 47 with respect to the memory 40, is controlled by the enlargement/reduction procedures.

Accordingly, a first counter 43 and a second counter 44 are mounted so that preset values P1 and P2 can be set to each counter, and when both counters respectively count clock CK (FIG. 55 C) of the specified frequency up to the preset values P1 and P2, a first output pulse C1 and a second output pulse C2 are generated (FIG. 55 D and E).

The first output pulse C1 sets and the second output pulse C2 resets a flip flop 45, whereby a window pulse WP is generated as shown in FIG. 55 F. When this window pulse WP is supplied to a gate circuit 46 as a gate pulse, the clock CK is supplied to the address generator 47 during a time period which corresponds to a width W1 of the window pulse WP. However, this clock CK is one which has been synchronized with the enlarged/reduced image data.

As a result, the address data corresponding to the memory 40 is generated only for the period W1; consequently, only the image data corresponding to the period W1 out of the image data (FIG. 55 B) which are regulated by a horizontal effective area signal H-VALID or a horizontal direction valid signal H-VALID as shown in FIG. 55 A, is written in the memory (FIG. 55 G).

Therefore, if the preset values P1 and P2 are modified according to the enlargement/reduction ratio, the width W1 of the window pulse changes proportionally to the modification, whereby the image data quantity to be written into the memory 40 is restricted.

In the case of reduction, the window pulse WP and the width of the horizontal effective area signal H-VALID are processed in the same area.

On the other hand, in the case of enlargement, since the image data quantity tends to increase, taking the amount to be increased into consideration, the width of the window pulse WP is so designed as to be small with respect to the width of the horizontal effective signal H-VALID in order to eliminate the data quantity.

However, in the conventional image processing device having the enlargement/reduction function as described above, there are following problems:

In the construction as shown in FIG. 54, even if the image data quantity to be written into the memory 40 is restricted depending on the enlargement/reduction ratio, the initial writing address of the memory 40 is always designated to the first address (0 address) thereof regardless of the enlargement ratio; therefore, especially in such a case the construction is applied to an image processing device wherein image reading or image recording is executed based on the center line of an original (recording paper), the image to be recorded sometimes overflows from the transfer area of the recording paper depending on the enlargement ratio.

For example, as shown in FIG. 56, if W is the maximum read out width (equivalent to the width of the horizontal effective area) of the image reading means, in such a device wherein the image data of the original 52 is read out based on a center line l of a table for placing an original 51, and the image is recorded based on the center line l, the image is recorded as shown in FIG. 57 B in the mode using no enlargement/reduction (equal size record), however, in the reduction mode, the image is recorded as shown in FIG. 57 A.

This is because, the first write address of the memory 40, i.e., the 0 address, corresponds to the write start position of the output device (recording device, such as a laser printer). Accordingly, if the size of a recording paper P on which a image is to be recorded is too small, the image may deviate away from the transfer area of the recording paper, resulting in that the reduced image cannot be properly recorded on the recording paper.

Also, if the size of the recording paper P is too large, the reduced image is recorded at the edge portion of the recording paper P, thus providing a disadvantage.

Further, in the case of the enlargement mode, the non-image portion of the original is also enlarged, and the image is enlarged in such a manner as shown in FIG. 57 C, thus providing a possibility that the required range of the image cannot be recorded on a given recording paper P.

Thus, the present invention provides an image processing device having the enlargement/reduction capability, wherein the aforementioned conventional disadvantages are solved, and an enlarged/reduced image can be so recorded as to be always based on the center line without generating any lack of the image to be recorded.

To record the required area of the image on a given recording paper P with object described above, as disclosed in the present invention later on, the enlargement/reduction treated image data may be first accommodated in the output buffer, and then the data is stored in the final memory or supplied to the output device so that an image can be recorded.

In this case, controlling the timing of the writing or reading of the image data with respect to the output buffer depending on the enlargement/reduction ratio, as clarified by the reasons described later on, such disadvantages are eliminated as that the reduced image is recorded in the area deflected from the specified portion of the recording paper, or that a part of the enlarged image is not recorded on the recording paper.

However, the following points should be taken into consideration when such an output buffer as described above is used.

In the output buffer, a line memory or the like is used in order to accommodate the image data. In this case, when altering the ratio from the enlargement mode to the reduction mode, a part of the original image data remains in the line memory. That is to say, as shown in FIG. 59, when the previous ratio and the current ratio differ from each other and the latter is smaller than the former, i.e., if the ratio M1 of the previous reduction processing and the ratio M2 of the current reduction processing can be expressed in the equation, $$M1 > M2$$

then the image data corresponding to the address of the (M1−M2) remains in the memory without being rewritten for the reason of processing based on the center line l.

If such a condition is left, a correct image data cannot be outputted, because previous image data and the newly written image data cannot be distinguished.

This kind of problem might occur at the time of switching on the power of the image processing device. That is, at the time of starting the operation such as turning on the power of the image processing device, the line memory data may become "1" as well as "0", whose probability is 50%.

When the device is in the all clear ("0") status, there is no problem; however, in other statuses, the original image data and the current image data cannot be distinguished, thus, as described above, there is a possibility that a correct image data might not be read out.

The present invention is so designed as to solve the problems as described above, more particularly to propose an enlargement/reduction type image processing device wherein the residual image data occurring in the line memory at the time of reduction processing can be reliably eliminated.

SUMMARY OF THE INVENTION

In order to perform the enlargement/reduction process with an arbitrary incremental ratio, the image processing device according to the present invention comprises an interpolation table in which an interpolation data for interpolating a plurality of image information is written, and a data selection table in which the data of a selection signal for selecting the interpolation data of the aforementioned interpolation table is written; whereby the interpolation data of the aforementioned interpolation table is referred to depending on the enlargement/reduction ratio.

In the above image processing device, the data selection table comprises a data selection signal writing circuit and a data selection memory.

Thus, the image processing device according to the present invention is characterized in that the interpolation selection data to be outputted within the repetition cycles for one line depending on the specified enlargement/reduction ratio, i.e., the interpolation selection data of one line comprising the unit data corresponding to one cycle to be repeated, is sequentially fed to the above-mentioned data selection memory.

The interpolation selection data constituting the unit data having a specified number of data are repeatedly and sequentially written into the data selection memory until obtaining a data number corresponding to one line, wherein the number of one unit data varies depending on the enlargement/reduction ratio.

The incremental degree of the specified enlargement/reduction ratio is determined by the number of the unit data transferred in the non-enlargement/reduction mode. For example, if the number of the unit data in the non-enlargement/reduction mode is 64, then the enlargement/reduction ratio can be set with the increment of 1/64. In the same manner, if the number of the unit data is 100, then the enlargement/reduction ratio can be set with the increment of 1/100 (=1%).

In this way, by means of setting the number of the unit data to be fed, the increment of the enlargement/reduction ratio can be determined in the form of %.

In addition, the image processing device according to the present invention is characterized in that there are provided an input buffer for storing image data, an enlargement/reduction means for performing the enlargement/reduction processing of the image data outputted from the aforementioned input buffer, and an output buffer for storing the enlarged/reduced image data.

The clock frequency for reading out the image data from the input buffer, is changed depending on the enlargement/reduction ratio. Likewise, the clock frequency for writing the image data into the output buffer, is controlled depending on the enlargement/reduction ratio. More specifically, the effective processing velocity of the enlargement/reduction means is enhanced by means of lowering the read clock frequency from the input buffer in the enlargement processing mode.

Also, in the reduction processing mode, only the valid image data required for the reduced image can be written by means of lowering the write clock frequency fed to the output buffer.

For recording an enlarged/reduced image based on the center line without generating any lack of the image to be recorded, in the image processing device according to the present invention having the enlargement/reduction capability wherein the enlargement/reduction procedure is carried out by using the image data read out by means of photoelectrically converting the image information, an input and an output buffers for the image data are mounted.

The above-described image processing device is characterized in that the write start address on the output buffer and the read out start address of the image data on the input buffer, are so constructed as to be modified depending on the enlargement/reduction processing.

The read out start address on the input buffer is modified depending on the enlargement/reduction ratio (particularly in the image enlargement mode) or the size of the recording paper.

In this way, since the read out start address is modified according to the enlargement/reduction ratio, all the image data written in the input buffer, do not become the target to be read out.

Accordingly, especially in the enlargement processing mode, the read out start address is so set as to record the enlarged image, reguarding the center line of the recording paper as a recording reference line.

In the same manner, the write start address on the output buffer is modified depending on the enlargement/reduction ratio (particularly in the image reduction mode) or the size of the recording paper.

In this way, since the write start address is modified depending on the enlargement/reduction ratio, as for the range from the address 0 up to this write address, the inputted data becomes equivalent to that wherein the data "0" (data equivalent to the white area) is inputted.

Accordingly, the write start address on the output buffer is so set as to record the reduced image, regarding the center line of the recording paper as a recording reference line.

The enlargement/reduction type image processing device according to the present invention is so designed as to reliably eliminate the residual image data occurring in the line memory at the time of reduction mode. The image processing device described above is characterized in that there are provided an input buffer and an output buffer with respect to the image data and means for clearing the image data written in the output buffer during the non-effective area timing at the time of reading the image.

Since the invalid data is erased if the line memory is cleared during the non-effective area timing of the image reading, only the image data to be recorded is always written in the line memory, thus the wanted image data can be obtained.

BRIEF DESCRIPTION OF THE DRAWING

FIGS. 6 and 7 are explanatory diagrams showing the color separation;

FIGS. 15 and 16 are diagrams showing the relationship between the image data, interpolation selection data SD, and interpolation data S;

FIG. 17 is a chart showing an example of the threshold value to be used for the line drawings;

FIG. 18 is a chart showing an example of the threshold value data matrix to be used for the photographic picture;

FIGS. 34 and 35 are charts showing the example of specific numerical values of the sampling position and the interpolation selection data in the case of image enlargement mode;

FIGS. 36 and 37 are charts showing the specific numerical values of the sampling position and the interpolation selection data in the case of image reduction mode;

FIGS. 48 and 49 are charts showing the relationship between the read out start address and the write in start address used for image reading and image recording in the another examples indicated in FIGS. 46 and 47;

DETAILED DESCRIPTION OF THE INVENTION

Figure 1:
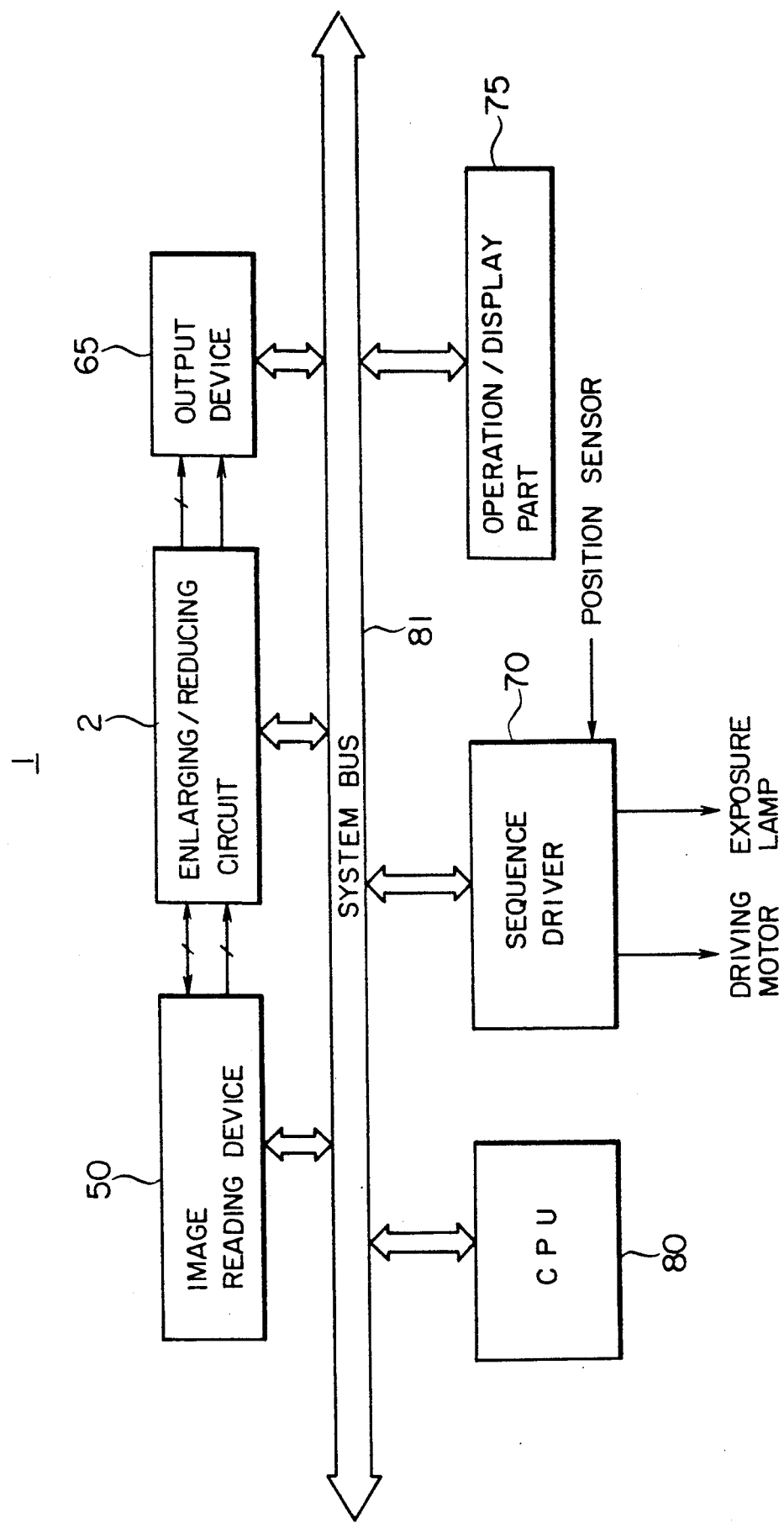
FIG. 1 is a block diagram showing a enlargement/reduction type image processing device according to the present invention.

The following description explains the case in detail referring to the accompanied drawings starting from the FIG. 1, wherein an example of the enlargement/reduction type image processing device according to the present invention, is applied to the type which reads out, processes and records an image using center line ( as a reference line.

The embodiment described below is, however, the case wherein the above-mentioned image processing device is applied to the color image processing device which uses an electrophotographic color copying machine as an output device.

Therefore, first of all, the general construction of the color image processing device mentioned above is explained using FIG. 1 for reference.

The image information, such as an original, is first converted into the image signal with the aid of an image reading device 50, and then the signal undergoes the image processings, such as A/D conversion processing, shading correction processing, color separation processing, and so on; thus, the signal is converted into an image data having specified number of bits corresponding to each color signal, for example, an image data having 16 gradations (0–F).

In an enlargement/reduction circuit 2, each image data undergoes image processing, such as enlargement and reduction according to the linear interpolation method. In this case, the interpolation data, used as an image data after the enlargement/reduction processing, is stored in the interpolation table (interpolation ROM); and an interpolation selection data stored in the data ROM and an original image data are used as a addressing signal for selecting the interpolation data. The necessary interpolation data is selected by the command from a system control circuit 80 depending on the enlargement/reduction ratio.

The image data after the image processing is supplied to an output device 65, and the image is recorded by the externally preset enlargement/reduction ratio. As for the output device 65, an electrophotographic color copying machine can be used.

The image reading device 50 is equipped with a driving motor for driving the image reading device such as a CCD, an exposure lamp, and so on, which are so controlled by the command signals from a sequence control circuit 70 as to have a given timing. The data from a position sensor (not illustrated) is inputted into the sequence control circuit 70.

Various kinds of input data, such as the designation of the enlargement/reduction ratio, designation of the recording position, and the designation of the recording color, are inputted into an operation/display portion 75, and also the content of the data is displayed. The element such as LED is used for the display means.

The above-described various operations, the image processing device and its condition, are controlled by the system control circuit 80. Therefore, this system can be properly controlled by means of the micro-computer.

FIG. 1 shows an example of the micro-computer control, wherein the necessary image processing data and control data between the control circuit 80 and the above-mentioned various circuit system, are transferred through the system bus 81.

The image read out start signal, initiation signal for the shading correction, and recording color designation signal, are supplied to the image reading device 50 through the system bus 81.

The enlargement/reduction ratio designated by the operation/display portion 75, and the threshold value selection data for selecting the threshold value for converting the image data into binary values depending on the type and density of the image to be recorded, are once taken into the control circuit 80, and then those data are supplied to the enlargement/reduction circuit 2 through the system bus 81.

The start signal, and the signal for selecting the recording paper size, are supplied to the output device 65.

Next, these components described above are described in detail.

First, referring to FIG. 13, an example of the construction of a simple-type color copying machine which can be applied to the present invention, is described below.

Figure 13:
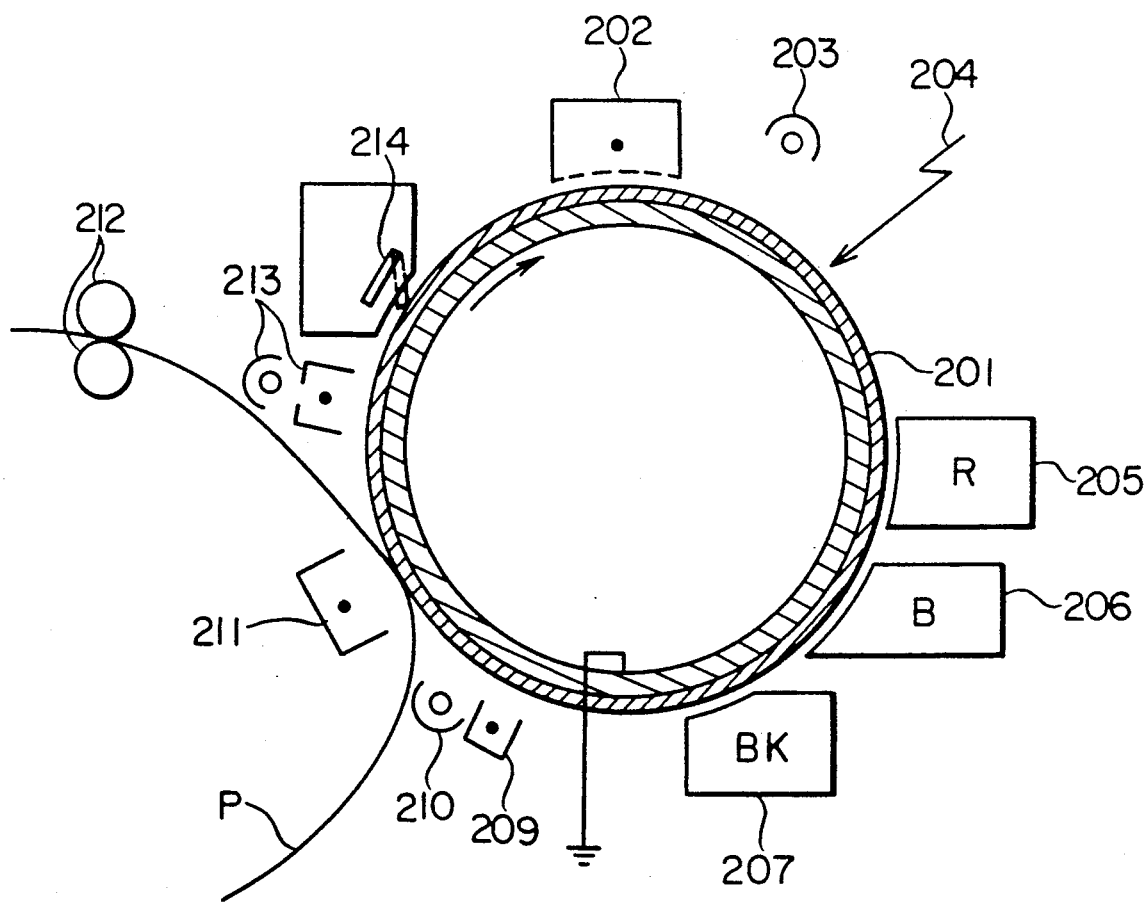
FIG. 13 is a construction diagram showing an example of a simple-type electrophotographic color copying machine.

The color copying machine shown in FIG. 13, is so constructed as to separate the color information into three color information in order to record the color image. In this example, three kinds of color information into which the color information is separated are black BK, red R, and blue B.

In FIG. 13, 200 is an example of the main portion of the color copying machine, 201 is a drum-shaped image forming body, on which photoconductive layer, such as selenium Se, is so formed as to hold an electrostatic image (electrostatic latent image) thereon corresponding to the optical image.

On the circumferential surface of the image forming body 201 is sequentially provided the members described below in the rotational direction.

The surface of the image forming member 201 is uniformly charged by a corona charger 202, and then the surface is uniformly exposed to a weak light by means of an exposure lamp 203. The electrostatically charged and exposed surface of the image forming member 201 undergoes an image exposure (its optical image is shown by 204) to an original image.

After the image exposure, the latent image is developed by means of the specified developing apparatus, which is arranged in number corresponding to the number of the color separation image. In this example, a developing apparatus 205 charged with a red toner developer, a developing machine 206 charged with a blue toner developer, and a developing apparatus 207 charged with a black toner developer, are so arranged as to confront the surface of the image forming body 201 in its rotational direction in the order of 205, 206, and 207.

The developing apparatuses 205, 206, and 207 are sequentially selected in synchronization with the rotation of the image forming member for example, by selecting the developing apparatus 207, the toner adheres to the electrostatic image so formed as to be based on the black color separation image, thus permitting the black color separation image to be developed.

A corona charger 209 used before transfer, and an exposure lamp 210 used before transfer, are mounted next to the developing apparatus 207, which facilitate the color toner image to be transferred to the recording paper P. However, the corona charger 209 used before transfer and the exposure lamp 210 used before transfer, are provided only if they are required.

The color or black-and-white toner image developed on the surface of the image forming body 201 is transferred onto the surface of the recording paper P thereon with the aid of a transfer device. The transferred image on the surface of the recording paper P, undergoes a fixing processing using a fixing device 212, and then the recording paper is discharged.

An eraser 213 is composed of either of or both of an erasing lamp or an erasing corona discharger.

A cleaning system 214 is composed of a cleaning blade or a fur brush, whereby the residual toner adhering to the surface of the drum after the color toner image of the image forming body 201 is transferred, is removed.

It has been well known that this removing operation on the surface of the image forming member 201, is so designed as to be completed before the developed area holding a toner image comes to the position where the removing operation is to be performed.

A Scorotron corona charger may be used as the corona charger 202, because the aforementioned charger is not so much affected by the residual charge on the surface of the image forming member 201 thus allowing the surface to be reliably charged.

As for an image exposure 204, a laser beam scanner may be used. In this case, a clear color image can be recorded.

In the development to be carried out at least after the first development for the purpose of superposing the color toner image, the toner image formed on the surface of the image forming member 201 in the previous development, should not be affected by the development to be carried out later. In this sense, the development should be preferably performed by the non-contact type jumping development.

FIG. 13 shows a developing apparatus using the abovementioned non-contact type jumping development. As for the developer, so-called two-component developer should be preferably used, because this type of developer can render a clear color, and also the charging of the toner can be easily controlled.

Figure 2:
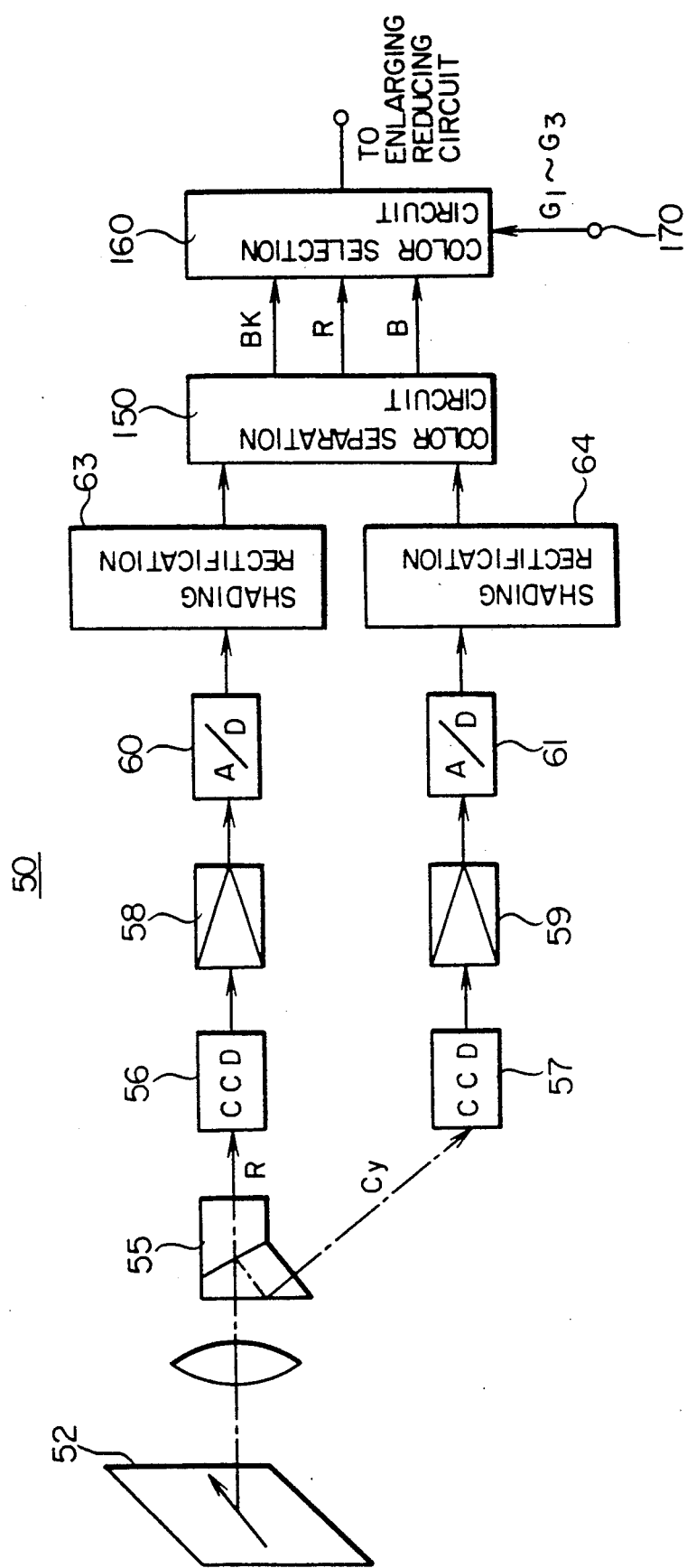
FIG. 2 is a block diagram showing an example of an image reading device.

FIG. 2 shows an example of an image read out device 50, wherein the color image information (optical image) of an original 52 is separated into two color separation images by means of a dichroic mirror 55. In this example, a color separation image of the red R and a color separation image of the cyan Cy, are separated. Accordingly, the dichroic mirror 55 having a cut-off range of approximately 600 nm or so, is used for this separation, whereby a red color component becomes transmitting light and a cyan color component becomes reflection light.

The color separation images, which means the separated color component image, of the red R and the cyan Cy, are supplied to the image reading means 56 and 57, respectively; thus, an image signal having only the red color component R and one having only the cyan color component Cy, are outputted from respective image reading means 56 and 57.

Figure 3:
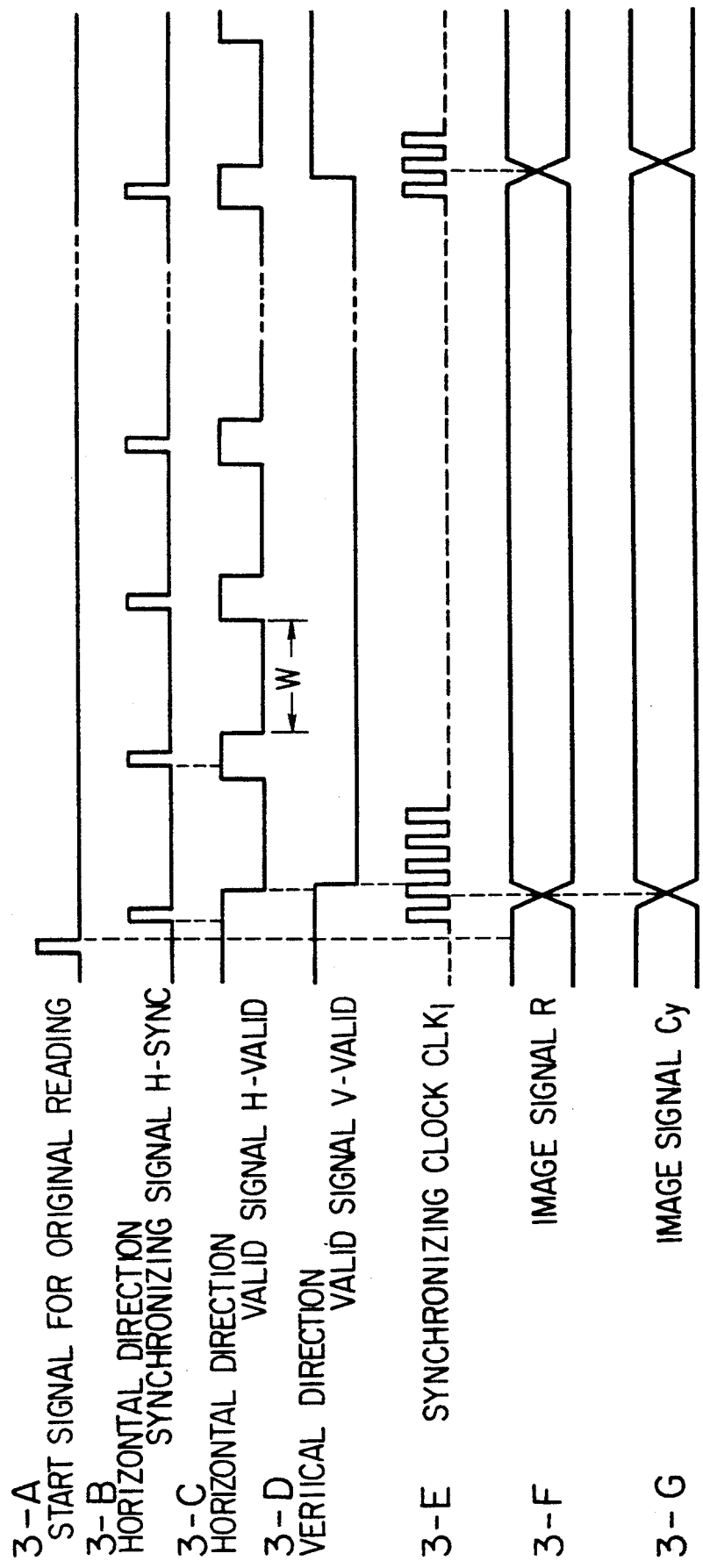
FIG. 3 is a waveform chart for explaining the operation of the image processing device of FIG. 2.

FIG. 3 shows the relationship between the image signal R, Cy and various timing signals. The horizontal effective area signal or horizontal direction valid signal H-VALID (FIG. 3 C) corresponds to the maximum read out width of the original W (see FIG. 56) of the CCDs 56 and 57. The image signals R and Cy shown by the letters F and G in FIG. 3, are read out in synchronization with the synchronous clock CLK1 (FIG. 3 E).

These image signals R and Cy are converted into the specified digital signals having a given number of bits by means of being supplied to the A/D converters 60 and 61 through the normalization amplifiers 58 and 59.

The digital image signal undergo the shading correction. The numerals 63 and 64 represent the shading correction circuits, both having the same construction whose specific example will be described later.

The digital color image signals which have already undergone the shading correction, are then supplied to a color separation circuit 150 at the next step; where the signals are converted into a plurality of color signals required for recording the color images.

In the example described above, the color recording system is so designed as to record a color image using three colors including red R, blue B, and black BK; therefore, these three color signals, R, B, and BK are obtained from the R and Cy signals by the color separation circuit 150. The specific example of the color separation will be described later.

One out of three color signals R, B, and Bk is selected by the color selection circuit 160. This is because, as described above, the image forming processing is so designed as to develop one color image for one rotation of the image forming member 201; consequently, the developing apparatuses 205, 206, and 207 are selected in synchronization with the rotation of the image forming member 201, and also the color signal corresponding to the selected developing apparatus, is selected by the color selection circuit 160.

A terminal 170 is supplied with selection signals (G1-G3) for selecting the color signals. The selection signals G1-G3 are supplied from the system control circuit 80, and are to be used for selecting the color signal to be outputted, depending on the case of the normal color recording mode (multi-color mode), and the case of single color recording, i.e., color designation recording mode (mono color mode).

The color separation processing from the image signals and R and Cy into three color signals is executed every one rotation of the image forming member 201 in this example; however, it is also possible that the color separation processing may be executed only one time during the preliminary rotation.

In the image reading device wherein light is radiated from a lamp onto the original so that the reflection light can be collected by means of a lens, a non-uniform optical image is obtained due to the so-called shading, i.e., the optical problems caused by lens, lamp, or the like.

Figure 4:
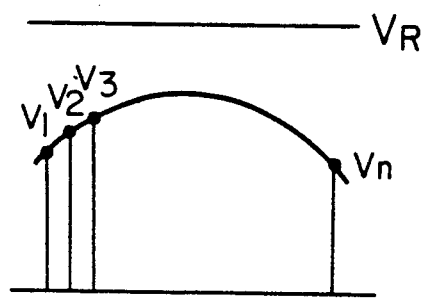
FIG. 4 is an explanatory diagram of the shading correction procedure.

In FIG. 4, supposing that the image data in the main scanning direction are V1, V2 ... Vn, the level at both ends in the main scanning direction is lower than other portion. In order to correct the problem described above, the shading correction circuits 63 and 64 execute the following processings.

In FIG. 4, VR is a maximum value of an image level, V1 is an image level of the first dot when the white area of the reference white plate (not illustrated) having a uniform density is read. Supposing that the image level at the time of actually reading the image is d1, the corrected gradation level d1' of the image becomes as follows:

$$d1' = d1 \times VR/V1$$

The correction is performed for every image data of each picture element in accordance with the above-described equation.

Figure 5:
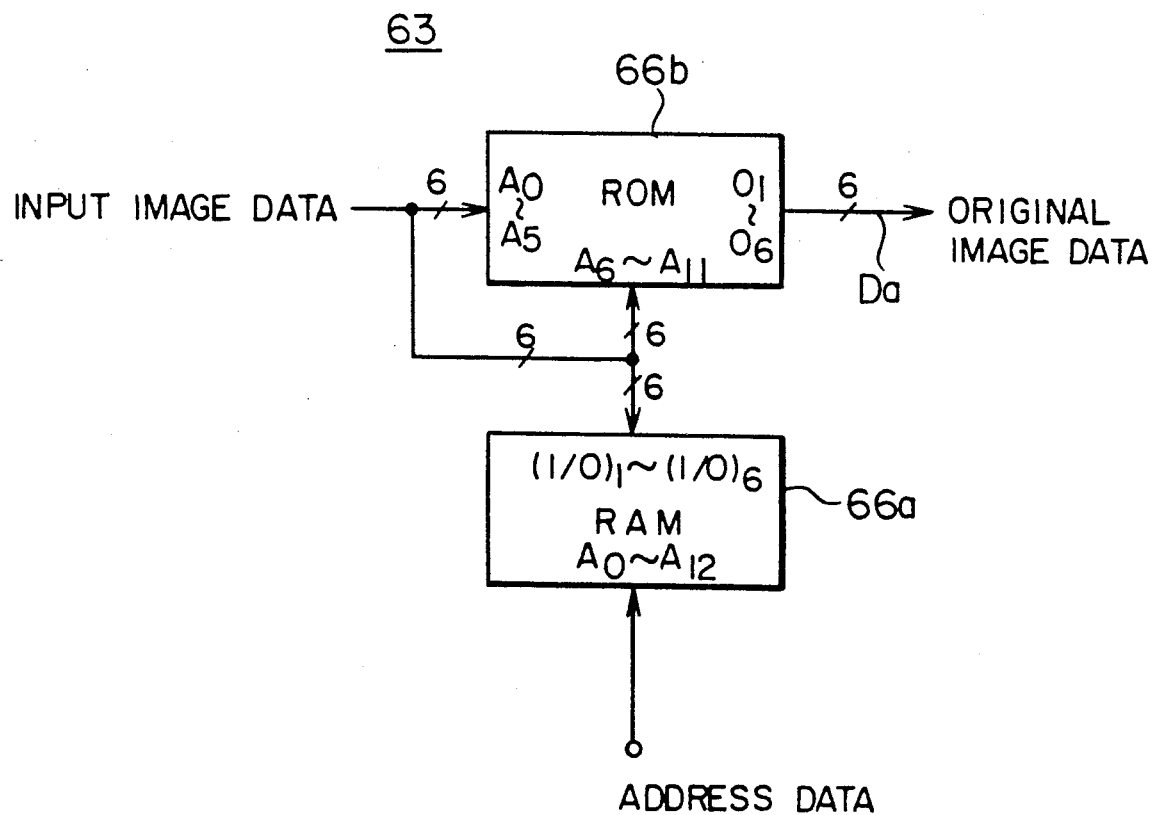
FIG. 5 is a block diagram showing an example of the shading correction circuit.

FIG. 5 shows an example of the shading correction circuit 63.

The first memory 66a is designed to read the normalization signal (shading correction data) of one line obtained when the white plate is irradiated.

The second memory 66b is designed to correct the image data, when reading an image, according to the shading correction data stored in the first memory 66a; and, for example, a ROM may be used.

When performing the shading correction, the image data for one line obtained by scanning the white plate, is stored in the first memory 66a as the shading correction data. At the time of reading the image of the original, the read image data is supplied to the address terminals A0 through A5 of the second memory 66b and at the same time, the shading correction data read out from the first memory 66a, is supplied to the address terminals A6 through A11. Accordingly, the image data which has undergone the shading correction according to the above-mentioned equation, is outputted from the second memory 66b.

The above-described color separation (color separation from two color components to three color signals), is performed based on the following concept:

FIG. 6 schematically shows the spectral and reflective characteristics of the color chart of the color component. The symbols A, B, and C in FIG. 6, show the spectral and reflective characteristics of the achromatic component, blue color, and red color, respectively.

The abscissa and ordinate show the wave length (nm) and reflectivity (%), respectively. Therefore, supposing that the spectral characteristics of the dichroic mirror 55 is 600 nm, the red component R penetrates and the cyan Cy is reflected.

Using a white color as a reference, if the level of the normalized red signal R is VR, the level of the cyan is VC, a coordinate system is prepared by using the signals VR and VC; and then the color separation of the red, blue, and black is carried out according to the prepared color separation map. When determining the coordinate system, the following points should be taken into consideration:

I. To be able to express the half tone, the concept of the reflectance (reflection density) of the original 52, which is equivalent to the luminance signal of the television signals, is adopted.

II. The concept of the difference (including color hue and saturation) of red cyan etc., is adopted.

Accordingly, the information signal obtained from the following equations is preferred to be used as the luminance information signal (for example, represented by a digital signal of 5 bits), and the color difference information signal (for example, a digital signal of 5 bits).

$$\text{Luminance information signal} = VR + VC \quad (1)$$

where, $$0 \leq VR \leq 1.0 \quad (2)$$

$$0 \leq VC \leq 1.0 \quad (3)$$

$$0 \leq VR + VC \leq 2.0 \quad (4)$$

The sum of VR and VC (VR+VC) corresponds from the black level (=0) to the white level (=2.0), and all the color level exist in the range from 0 to 2.0.

Color difference information signal = VR/(VR+VC), or $$VC/(VR+VC) \quad (5)$$

In the case of the achromatic color, the ratios of the red level VR, and cyan level VC contained in the entire level (VR+VC) are both constant. Accordingly, the following equation becomes true.

$$\begin{aligned} VR/(VR + VC) &= VC/(VR + VC) \\ &= 0.5 \end{aligned} \quad (6)$$

On the other hand, in the case of the chromatic color, the equations for red color group can be expressed in the following manner:

$$0.5 = VR/(VR+VC) \leq 1.0 \quad (7)$$

$$0 \leq VC/(VR+VC) > 0.5 \quad (8)$$

and, the equation for cyan color group can be expressed in the following manner:

$$0 \leq VR/(VR+VC) > 0.5 \quad (9)$$

$$0.5 > VC/(VR+VC) \leq 1.0 \quad (10)$$

Accordingly, by using (VR+VC) and VR/(VR+VC), or (VR+VC) and VC/(VR+VC) as an ordinate and an abscissa of the coordinate system, it is possible to clearly separate the chromatic component (red color and cyan color) and achromatic component by means of performing only the level comparison processing.

FIG. 7 shows an coordinate system wherein the luminance signal component (VR+VC) is the ordinate and the color difference component is the abscissa. If VC/(VR+VC) is used as a color difference component, the area less than 0.5 becomes the red color R, and the area greater than 0.5 becomes the cyan color Cy. The achromatic component exists in the area where the luminance signal information is very low, as well as around the area where the color difference signal information is equal to 0.5.

Figure 8:
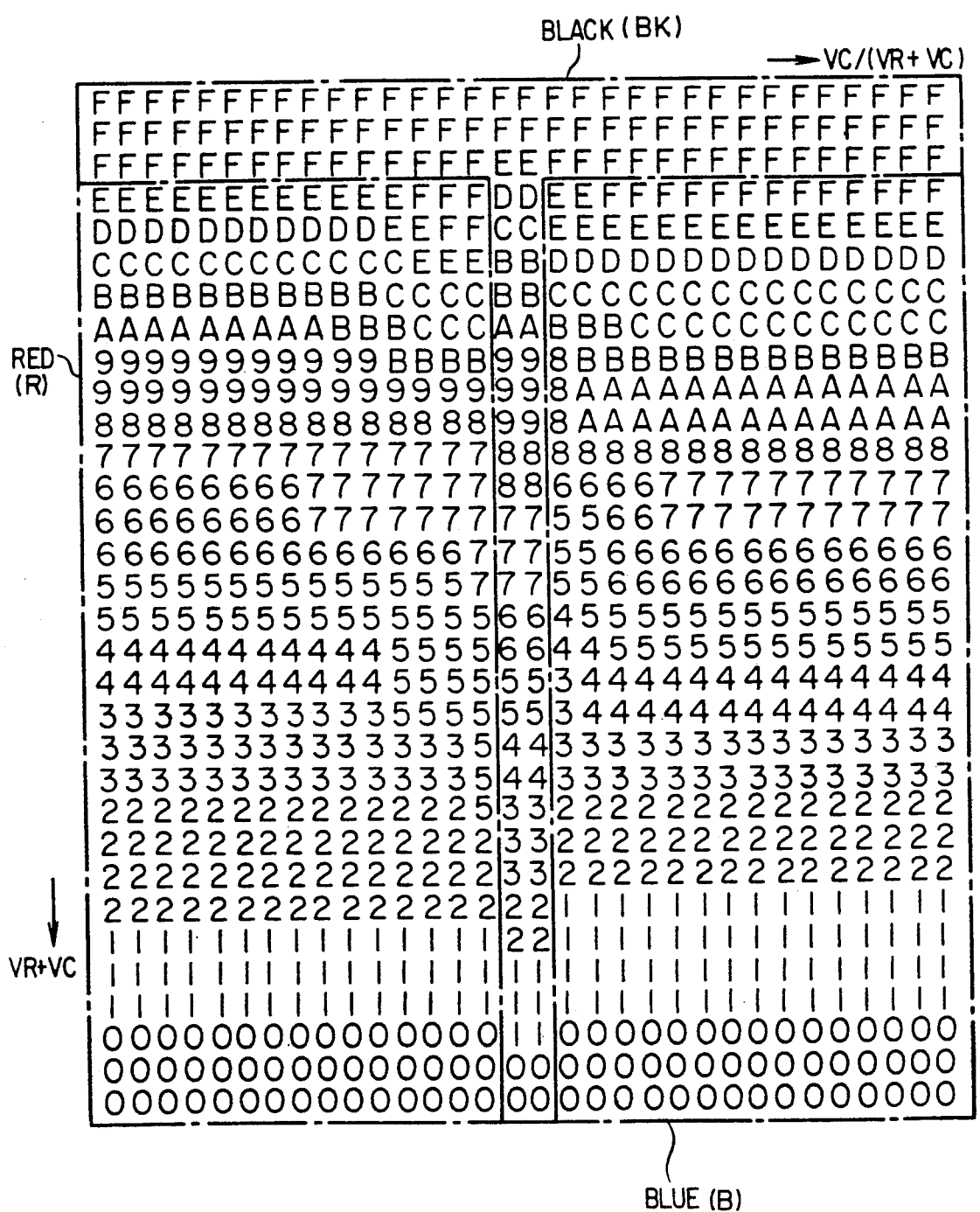
FIG. 8 is a diagram showing an example of the color separation map.

FIG. 8 shows an specific example of a color separation map obtained by means of the color separation according to the color separation method described above. The color separation map uses the ROM table, and the example shows the case wherein the ROM table is separated into the 32×32 blocks. Therefore, as for the number of the address bits for the ROM table, five bits for a column address, and five bits for a row address, are used.

In the ROM table, the quantized density corresponding values which would be obtained from the reflection density of any kind of original 52, are stored in advance.

Figure 9:
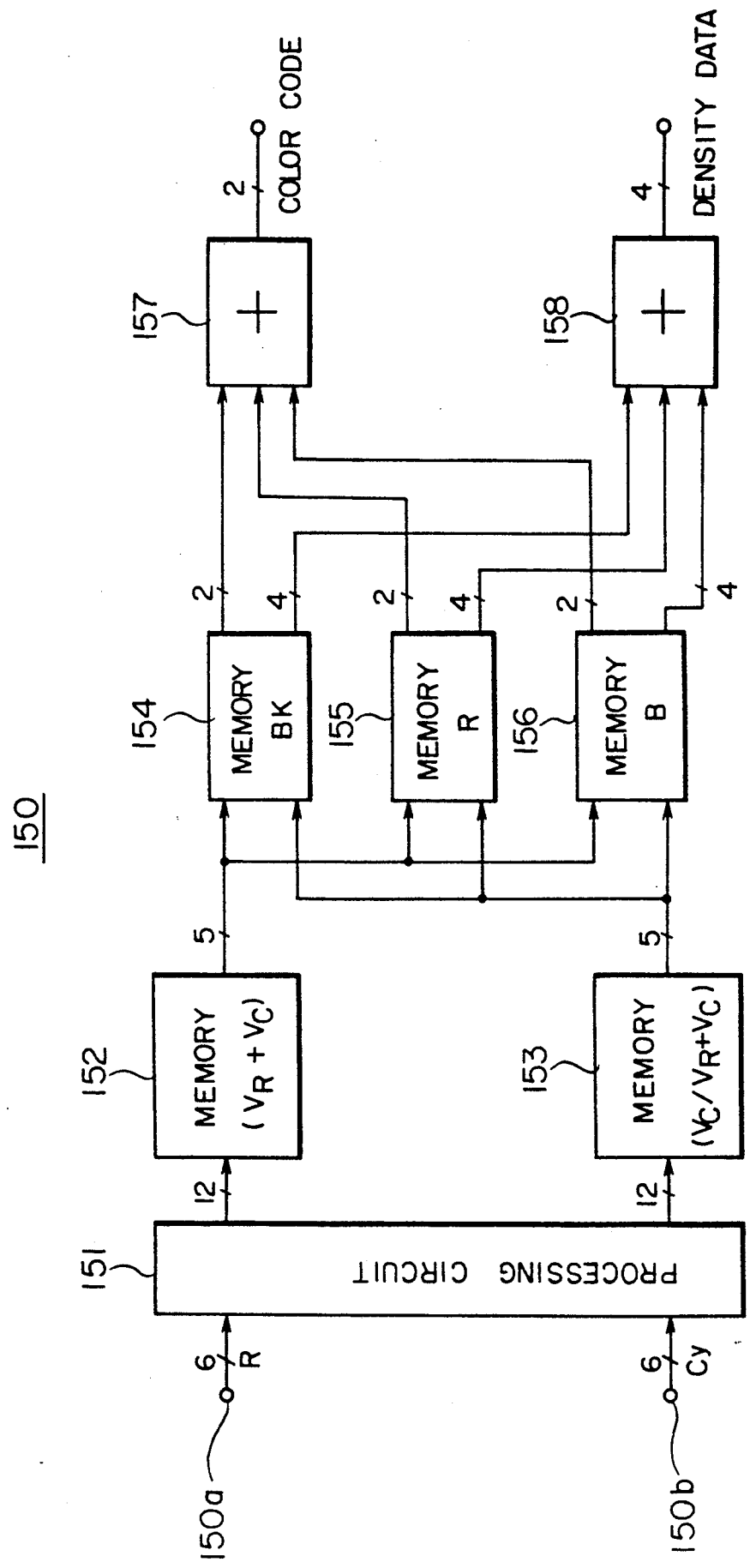
FIG. 9 is a block diagram showing an example of the color separation circuit.

FIG. 9 is a schematic flow diagram of an example of the main portion of the color separation circuit 150 for executing the color separation.

In FIG. 9, the terminals 150a and 150b are supplied with the red color component signal R and cyan color component signal Cy which are not yet separated into three colors, and processing such as the gradation conversion, γ correction, and so on, are executed by a processor circuit 151.

The processed signals are used as address signals with respect to the memory 152 in which the processing results of (VR+VC) for finding the luminance signal data are stored, as well as used as address signals with respect to the memory 153 in which the processed results of the color difference signal data VC/(VR+VC) are stored.

Each output of the memories 152 and 153, is used as an address signal of the separation memories (ROM construction) 154 through 156. The data table in which the color separation map as shown in FIG. 8 is stored for each color component, is used for the memories 154 through 156.

The memory 154 is for the black color signal BK, the memory 155 is for the red color signal R, and the memory 156 is for the blue color signal B.

As is apparent from the color separation map as shown in FIG. 8, by means of detecting the levels of the red color component signal R and the cyan color component signal Cy, the color information signals of the color original can be separately outputted in the form of three color signals, red, blue, and black colors.

The density data (four-bit construction) regarding each color, and the color code data (two-bit construction), are simultaneously outputted from each memory 154 through 156.

The density data and color code data, are synthesized by the synthesizing devices 157 and 158 in the later step. The synthesized density data and color code data are supplied to the ghost removing circuit (not illustrated), where the ghost signals are removed.

Figure 10:
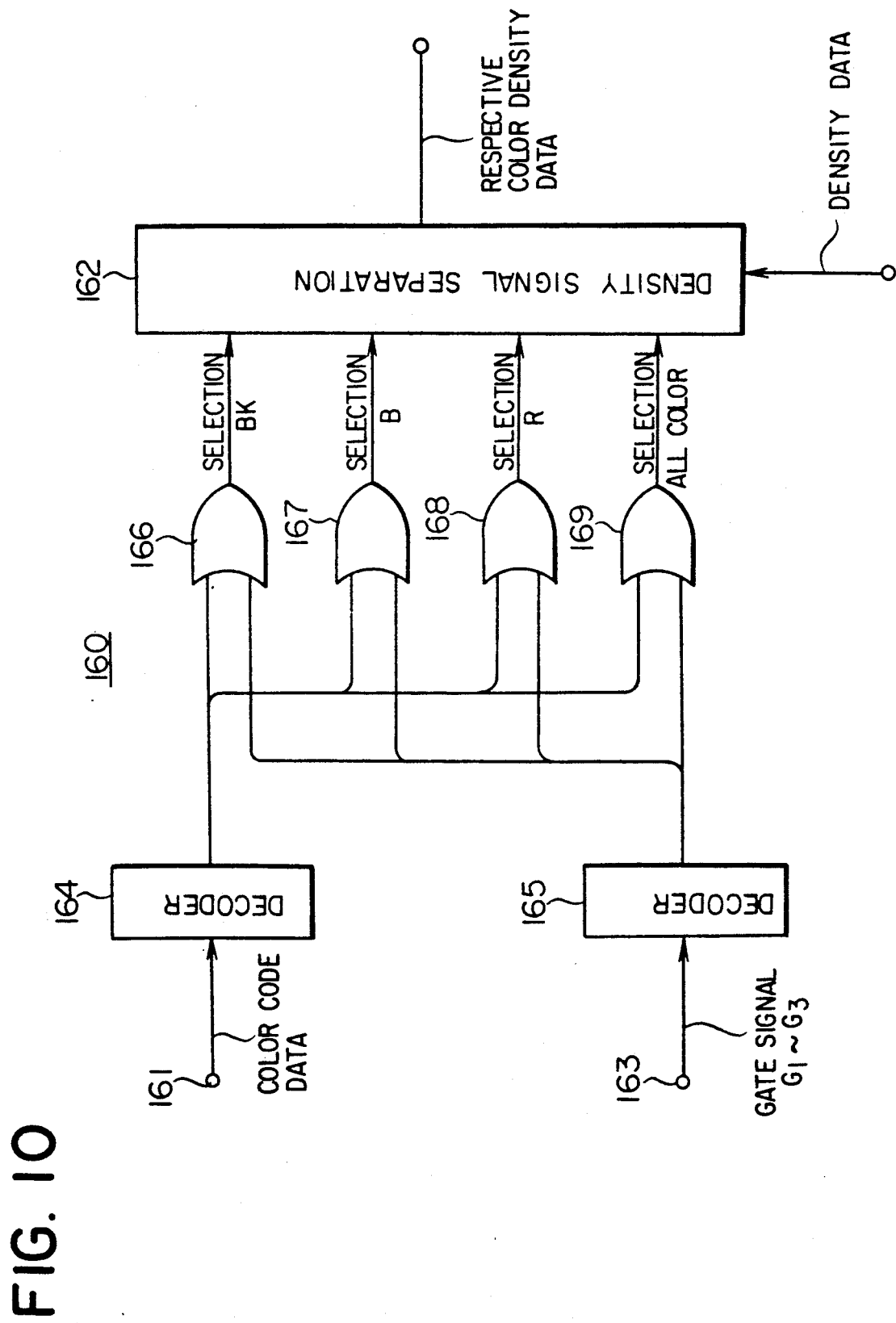
FIG. 10 is a block diagram showing an example of the color selection circuit.

Each data after ghost data is removed, is supplied to the color selection circuit 160 shown in FIG. 10.

The color code data supplied to the terminal 161, are then supplied to a decoder 164, where the color code is decoded, and the decoded output is supplied to the OR circuits 166 through 169. In the same manner, the data contents of the color selection signals (used as the gate signal) G1 through G3 supplied to the terminal 163, are decoded by the decoder 165; and also, the decoded output is supplied to the abovementioned plural OR circuits 166 through 169, thus allowing one desired color out of the signals (all colors) containing red, black, and all these colors to be selected.

The selected signals with respect to the color signals outputted from each OR circuit 166 through 169, are supplied to a density signal separation circuit 162 as a density selection signals. The density signal separation circuit 162 is supplied with the above-mentioned density data, which is to be selected according to the selection signal described above.

The selected data is supplied an enlargement/reduction circuit 2.

Figure 11:
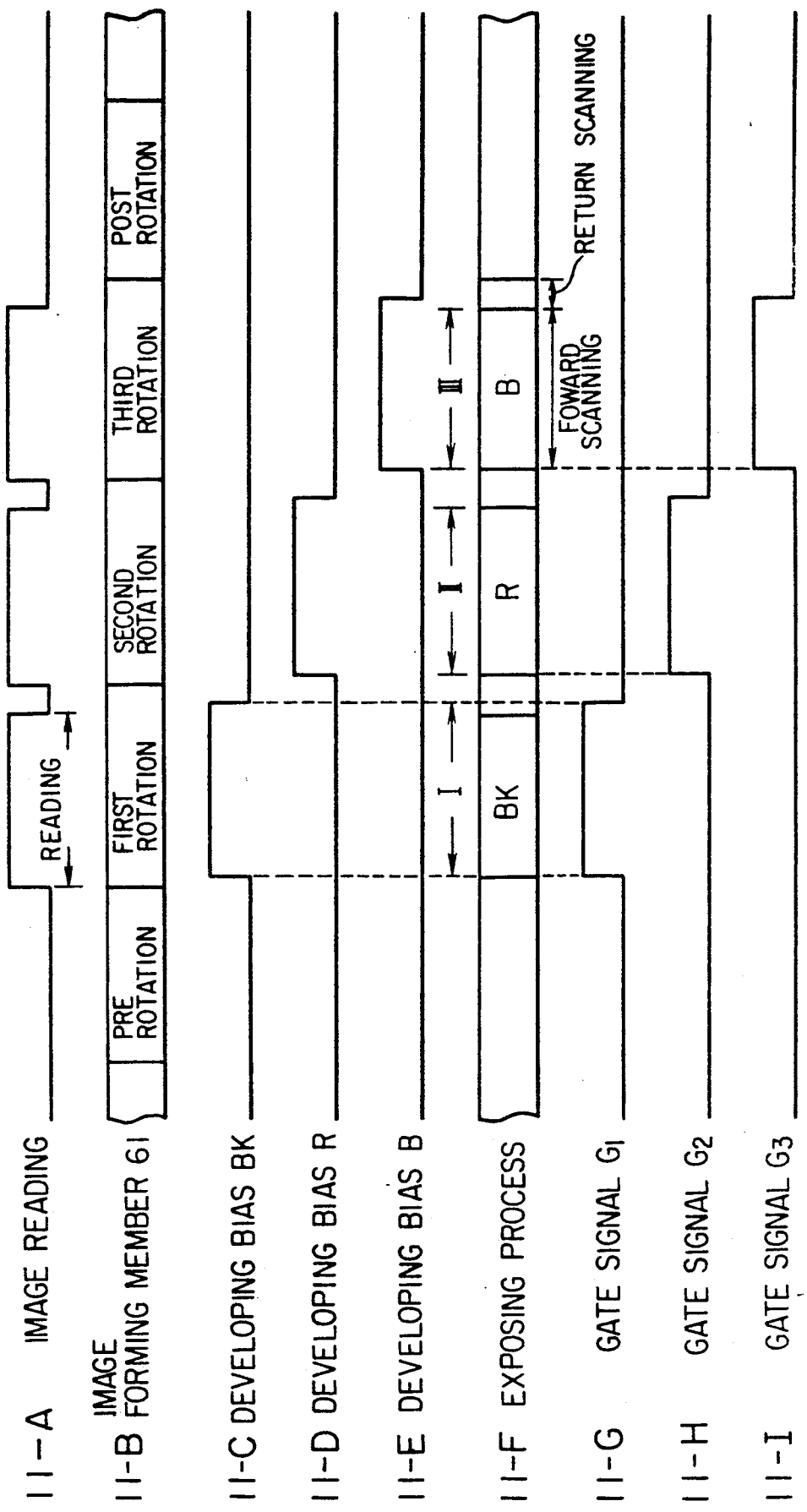
FIGS. 11 and 12 are wave charts for explaining the image forming process.

The color selection signals G1 through G3 correspond to the separated color signals, and in the normal color recording mode, the three-phase gate signals G1 through G3 are generated in synchronization with the rotation of the image forming member 201 (FIG. 11 G-I). At the same time, the developing bias as shown by the symbols C through E in the FIG. 11, are also supplied to the developing apparatuses 205 through 207 in synchronization with the rotation of the image forming body 201, resulting in that the exposure process and developing process are sequentially executed according to the exposure processes I through III for each color (FIG. 11 F).

Figure 12:
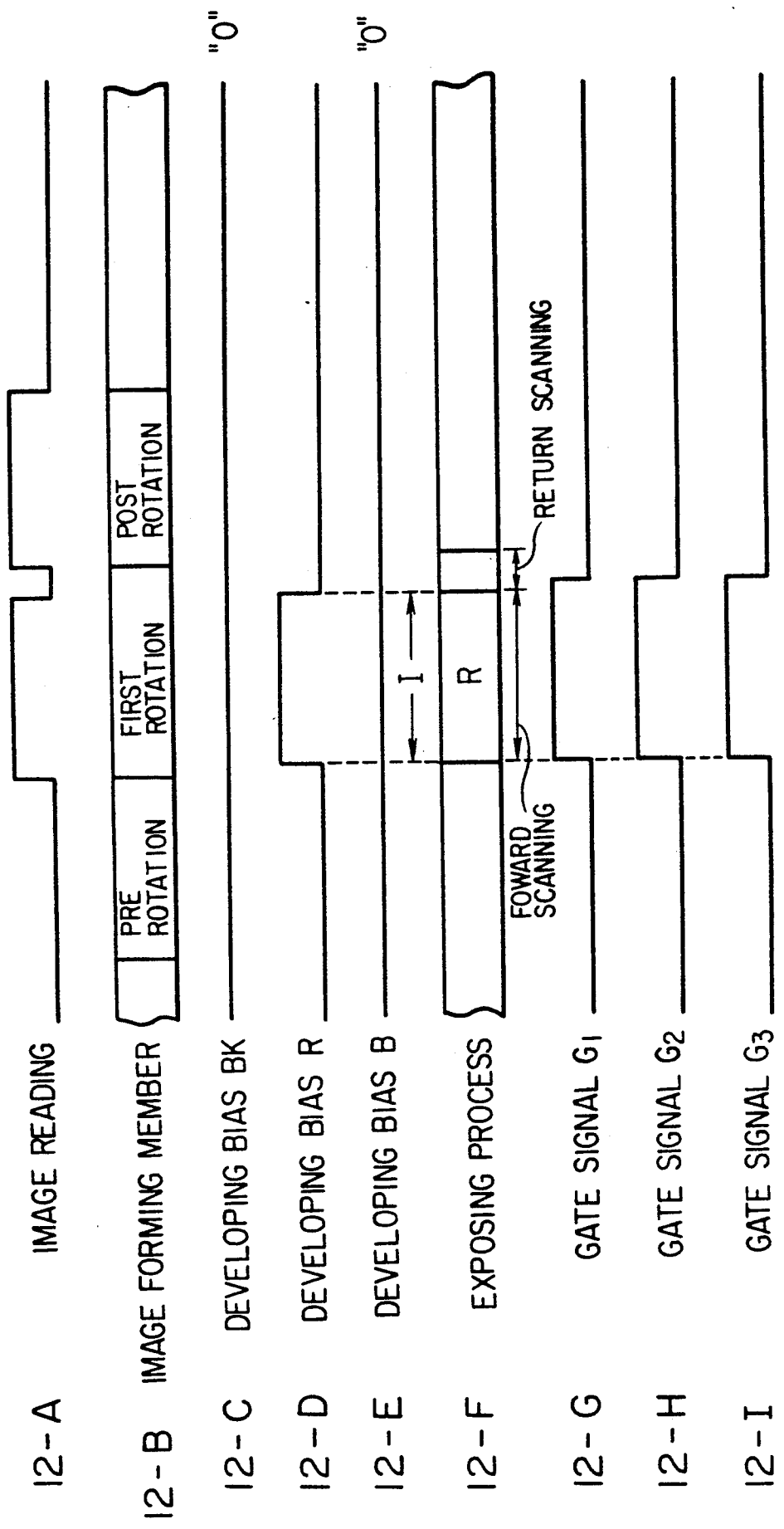

On the other hand, in the case of the color designation recording mode, only the designated monocolor image forming process is executed. Accordingly, as shown in FIG. 12, regardless of the designated color signal, three selection signals G1 through G3 are obtained in the same phase (FIG. 12 G-I). FIG. 12 shows an example when the red color is selected.

At the same time, the developing bias is supplied only to the corresponding developing apparatus 205 (FIG. 12 D) to activate the developing apparatus. Consequently, only the developing apparatus 205 charged with the red toner (developer), thus allowing the image to be recorded with the red color regardless of the color information of the color original.

In the case of designating another color (black or blue), the image forming processing is the same, therefore the detailed description for them is omitted.

Figure 14:
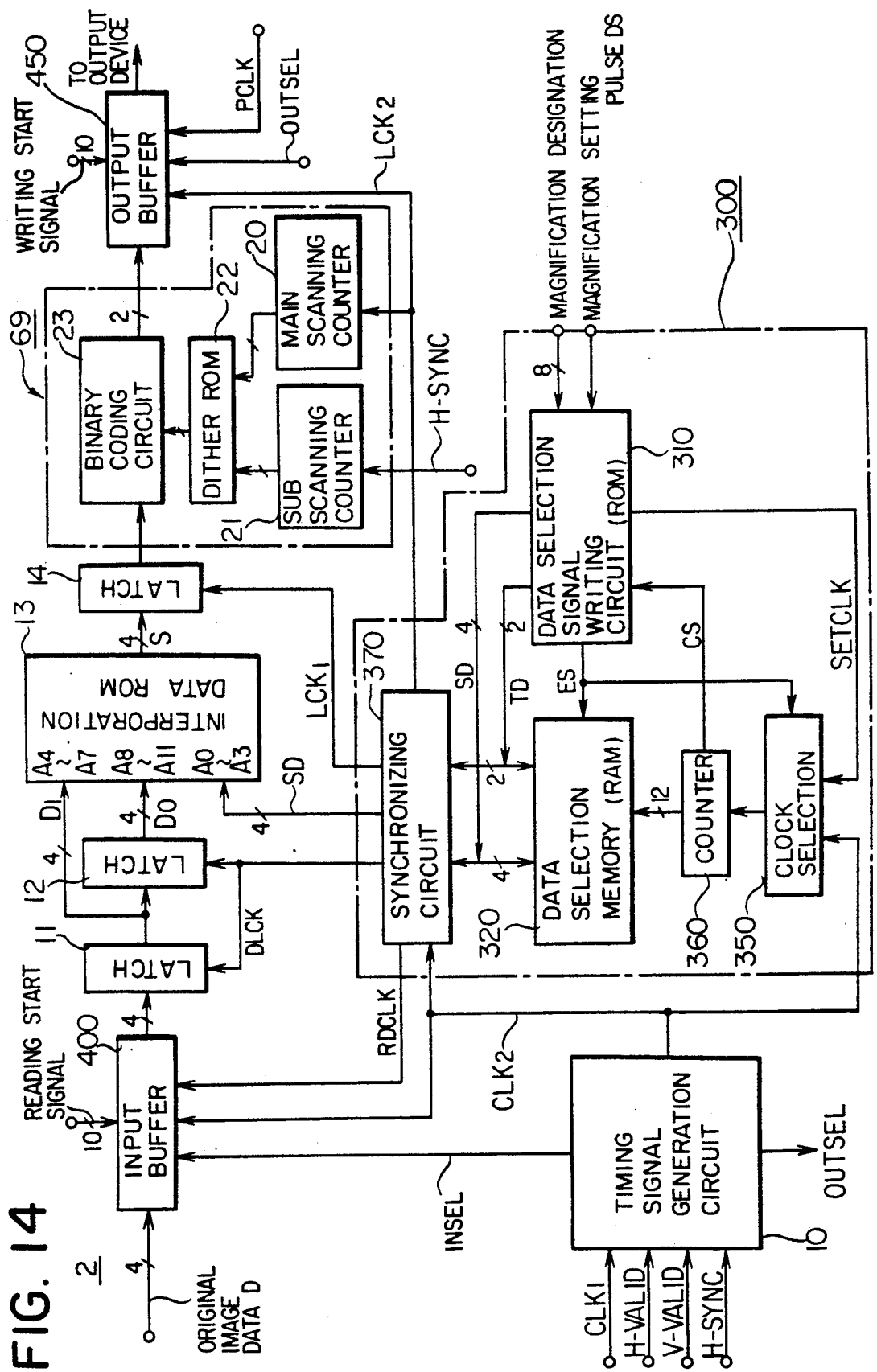
FIG. 14 is a block diagram showing an example of the enlargement/reduction circuit.

FIG. 14 is a block diagram showing an example of the enlargement/reduction circuit 2.

In this example, the circuit is so designed as to permit the enlargement/reduction process to function in the range from 0.5 reduction to 2.0 enlargement with the increment of 1 0%.

Figure 56:
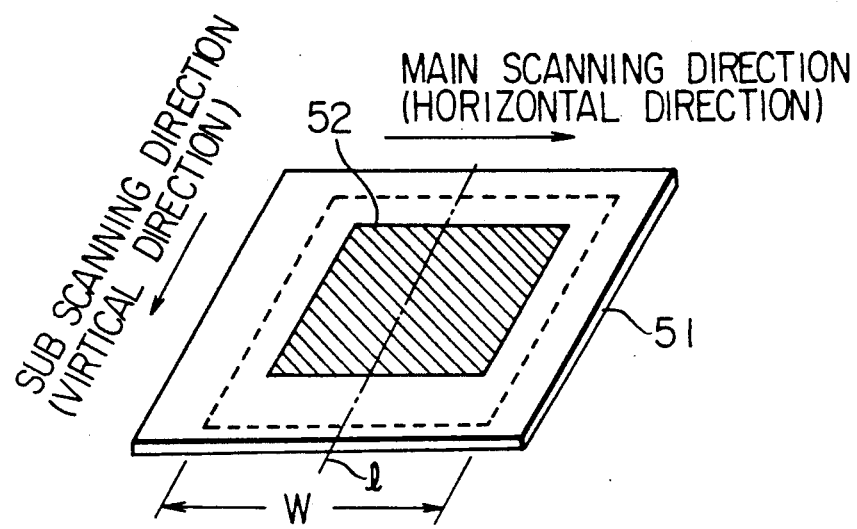
FIG. 56 is an isometric view of the image reading system.

In principle, the present invention utilizes the interpolation processing, whereby the enlargement processing is performed by increasing the image data, and the reduction processing is performed by decreasing the image data. The enlargement/reduction in the main scanning direction is, as shown in FIG. 56, performed by electrically processing the signals; and the enlargement/reduction in the subscanning direction (rotation direction of the image forming body) is performed by altering the moving velocity of the image or the photoelectrical conversion element, while keeping the exposure period of the photoelectrical conversion element mounted on the image read out system constant.

If the moving velocity in the sub-scanning direction is decreased, the original image is enlarged; and if the moving velocity is increased, the original image is reduced.

In FIG. 14, a timing signal generating circuit 10 serves to obtain the timing signals for controlling the entire processing timing of the enlargement/reduction circuit 2; and, likewise in the case of the CCDs 56 and 57, the timing signal generating circuit 10 is supplied with synchronization clock CLK 1, horizontal effective area signal H-VALID, and horizontal synchronization signal H-SYNC.

The synchronization clock CLK 2, which is outputted only during the period confined by the horizontal effective area signal H-VALID, is first outputted from the above-mentioned timing signal generation circuit 10; the synchronization clock CLK 2 is synchronous with the synchronization clock CLK 1.

Further, the memory control signals INSEL, and OUTSEL which are prepared for the memories mounted on the input buffer 400 and output buffer 450, are outputted.

The image data Da having the 16 gradation levels transmitted by the color selection circuit 160 for each color signal, are supplied to the input buffer 400. The input buffer 400 is mounted due to the following reasons:

First, even if the image data quantity to be used increases when executing the enlargement processing compared with the previous image quantity, the input buffer can effectively enhance the processing speed without increasing the frequency of the basic clock.

Second, the input buffer permits the enlarged image to be recorded with it's center line conformed to a reference line at the time of the enlargement mode.

Therefore, in order to satisfy the first condition, the frequency of the read out clock RDCLK to be supplied to the input buffer 400, is set to lower level compared with that in the normal condition. Further, in order to satisfy the second condition, the read out start address is set to the address number according to the enlargement/reduction ratio; the detailed description regarding this procedure will appear later.

The image data D outputted according to the designated enlargement/reduction ratio, is supplied to two latch circuits 11 and 12 which are connected in the form of cascade connection; where the four-bit construction image data, i.e., image data D1 and D0 of two adjacent picture elements out of the image data D outputted with the intermediate level, are latched by the timing of the latch clocks DLCK. The latch clocks DLCK have the same frequency as that of the read out clock RDCLK.

The image data D0 and D1 latched by the latch circuits 11 and 12, are used as the address data for the interpolation data memory 13 (ROM is used, hereinafter referred to as interpolation ROM).

The interpolation ROM 13 stores an interpolation data table which comprises the image data having new halftone level which are referred to by the two adjacent image data.

As for the address data of the interpolation ROM 13, other than a pair of latched data D0 and D1 mentioned above, an interpolation selection data SD is used.

The numeral 300 is an interpolation data selection means which stores the data such as the interpolation selection data SD. The interpolation selection data SD is used as an address data for determining which data should be used as an interpolation data out of the data group selected by a pair of image data D0 and D1; the detailed description will appear later on.

The interpolation selection data SD, as described later on, is determined by setting the enlargement/reduction ratio.

FIG. 15 shows an example of two interpolation data group capable of being selected by the image data D0, D1, and interpolation selection data SD. In the embodiment, the interpolation data is composed by linearly interpolating the data D0 and D1 as one example for easy consideration.

In FIG. 15, S represents interpolation data (four bits) outputted with 16-gradation level; since the image data D0 and D1 used as the base data have 16-gradation level respectively, the interpolation data table has $16 \times 16 = 256$ data blocks by the combination of the image data D0 and D1.

The FIG. 15 shows the theoretical values (indicated down to five decimal places) obtained by the linear interpolation in each step and the actual values of the interpolation data S stored in the ROM, when the base image data are 0 and F, with respect to the positive gradation (D0=0, D1=F) and the negative gradation (D0=F, D1=0), respectively.

Actually, the interpolation data S is stored in the form of a data table as shown in FIG. 16. The data table, however, show the case when D0=4 and D1=0-F only, wherein there are provided 16 groups of data blocks.

In FIG. 16, ADRS is a base address, which shows the condition that D1 takes the level from 0 to F while keeping D0=4. FIG. 16 indicates the relationship between the interpolation data S to be outputted and the interpolation selection data SD being laterally arranged from 0 to F with respect to every level of D1. The actual address with respect to the interpolation ROM 13 is obtained by combining the values of the address data ADRS with the value of the interpolation selection data SD in the abscissa.

Now, the interpolation data S outputted from the interpolation ROM 13, is latched by the latch circuit 14, and then supplied to the binary coding means 69 to be converted into binary values.

The image data converted into the binary values "1" and "0", which have been undergone the binary coding processing, are then supplied to the output buffer 450. The output buffer 450 is provided in order to process the invalid data generated by decreasing the image data in the image reduction mode; further, in order to be able to record the reduced image with the center line of the recording paper P as a reference line.

The final data being the binary values obtained from the output buffer 450, are supplied to the output device 65, where the image is recorded based on the binary data.

An example of the binary coding means 69 so mounted as to be positioned between the latch circuit 14 and output buffer 450 therebetween, is explained again using FIG. 14 as a reference.

In FIG. 14, the main scanning counter 20 serves to count the write clock LCK2 of the output buffer 450, and the subscanning counter 21 serves to count the horizontal synchronization signal H-SYNC. The output of the counters 20 and 21, cause the threshold value data of the dither ROM 22 to be addressed. By supplying the addressed threshold data to the binary coding circuit 23, the interpolation data S is converted into the binary values using the threshold value.

Accordingly, the digital comparison circuit is used for the binary coding circuit 23.

When the original to be read is a line drawing, the data having a certain threshold value corresponding to the density of the line drawing, is used; FIG. 17 shows an example, wherein the threshold data is expressed in the form of the hexadecimal.

If the original 52 is a picture image, it is preferable to convert its data into binary values by means of the dither method; therefore, in this example, the dither matrix is used as the threshold value data.

As for the dither matrix, in this example, three kinds of matrix (for example, $4 \times 4$ dither matrix) are prepared according to the density of the original 52; and one of them is selected as required.

If the density of the original 52 is low, the dither matrix as shown in FIG. 18 A is selected; if the density of the original 52 is normal, the dither matrix as shown in FIG. 18 B is selected; and if the density of the original 52 is high, the dither matrix as shown in FIG. 18 C is selected.

The threshold data used when the original is a line drawing, and the dither matrix used when the original is a picture image, may be manually selected by the operator depending on the density of the original 52; however, it is much more convenient to make the procedure automatic. When the procedure is automated, the density of the overall area of the original 52 is detected, and the most suitable dither matrix is selected according to the command from the control circuit 80.

Next, the specific example of each portion of the enlargement/reduction circuit 2 described above, is explained.

Figure 19:
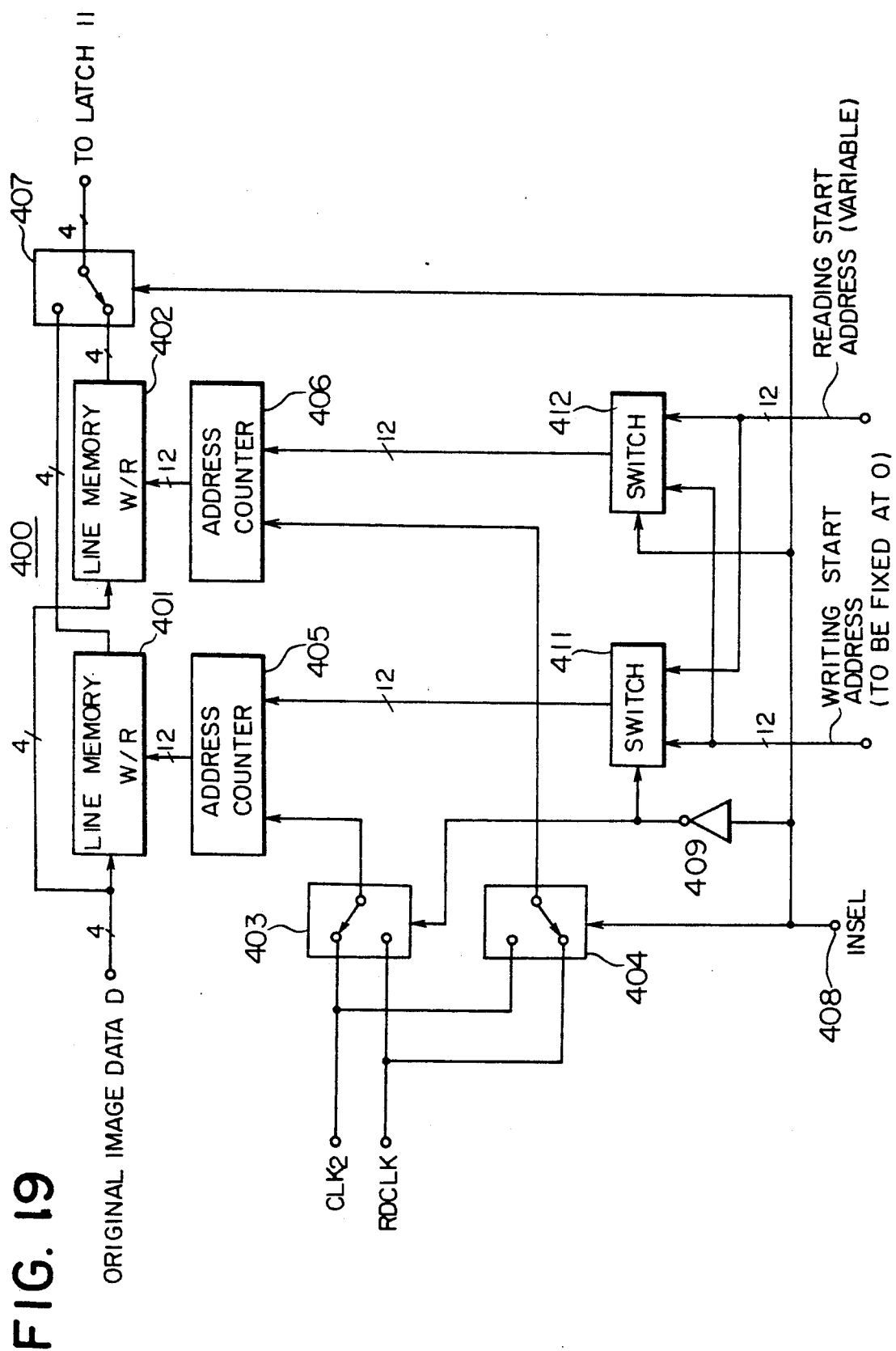
FIG. 19 is a block diagram showing an example of the input buffer.

FIG. 19 shows an example of the input buffer 400, wherein a pair of line memories 401 and 402 are mounted, to each of which the image data for one line is supplied. The pair of line memories 401 and 402 are mounted in order to be alternately supplied with the image data corresponding to one line, thus allowing the writing and reading processings of the image data to be executed in real time.

The memory having the capacity of 4096×4 bit is used for the line memories 401 and 402. This capacity represents the value when the resolution is set to 16 dots/mm and the maximum original size is B4 (256 mm in width).

When writing the data in the line memory, the write clock CLK2 is used, and when reading out the data from the line memory, the read out clock RDCLK is used; thus, these clocks are supplied to the address counters 405 and 406 through the first and second switch 403 and 404 dedicated for the clock selecting function.

The read out clock RDCLK is set to the different frequency from the normal one when designating the enlargement ratio; the set frequency depends on the designated enlargement ratio.

The first and second switches 403 and 404 are complementarily controlled, so that when one line memory is in the write in mode, the other line memory is in the read out mode. Consequently, the control signal INSEL generated by the timing signal generation circuit 10, is used as the switch control signal.

In this case, one switch 403 is supplied with the inverted control signal INSEL obtained by the terminal 408 after its phase being inverted by the inverter 409. The control signal INSEL is a rectangular wave signal whose cycle is equivalent to two cycles of H-VALID signal (See FIG. 33.).

One of the outputs from the line memories 401 and 402, is first selected by the third switch 407, and then, is supplied to the latch circuit 11. As for the switching signal for the above-mentioned step, the aforementioned control signal INSEL is used.

The address counters 405 and 406 are supplied with the address designation data for setting its initial address. Therefore, as shown in the figure, both write in start address data and read out start address data, are supplied to the address counters 405 and 406 through the fourth and fifth switches 411 and 412, respectively.

In this case, the write in start address data and read out start address data are controlled by the switch control signal INSEL so that they are alternately supplied for each line.

As for the write in start address data, 0 address is always designated; and as for the read out start address data, the data are automatically modified depending on the enlargement/reduction ratio. Both write in start address data and read out start address data, are supplied by the system control circuit 80.

Figure 20:
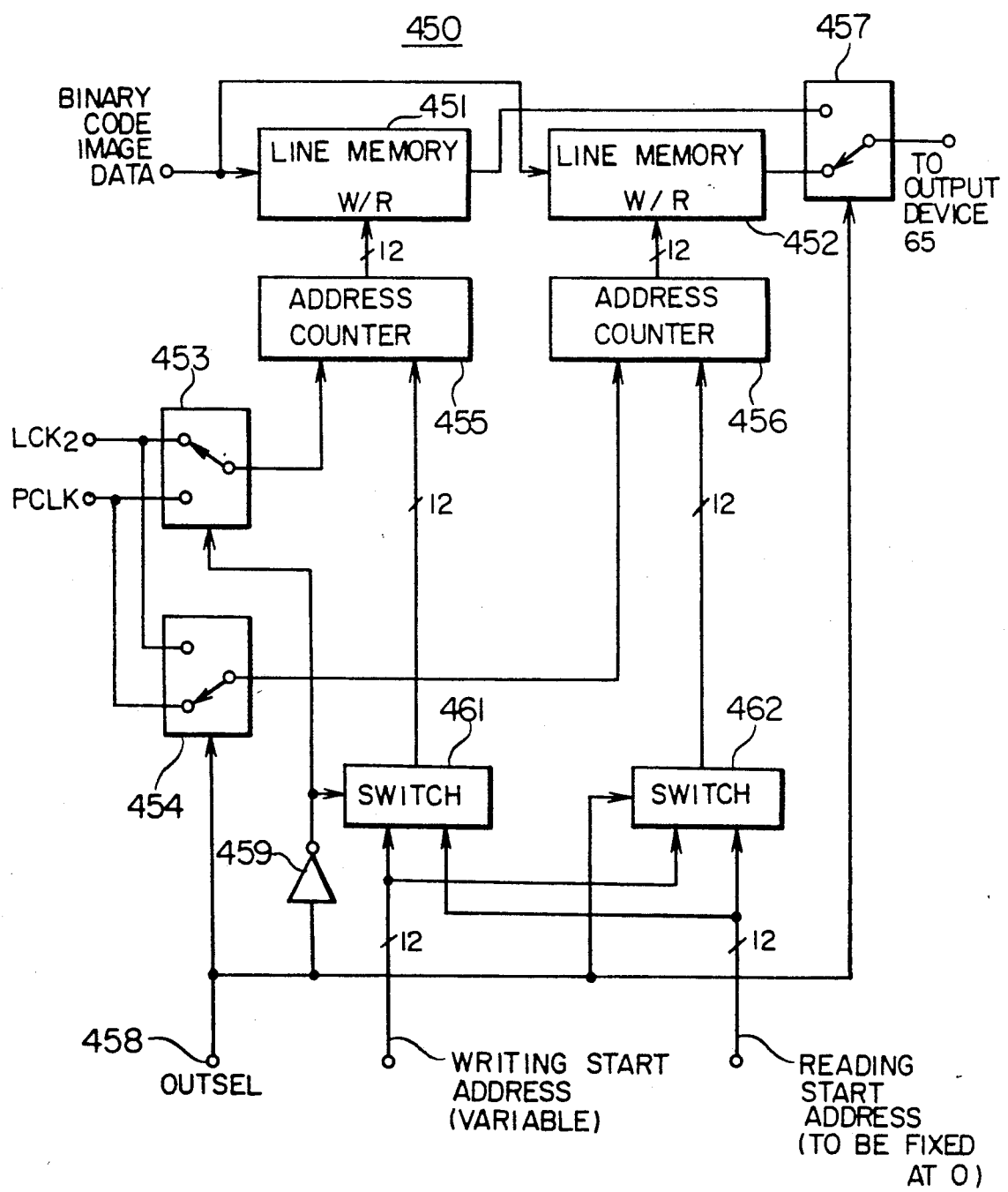
FIG. 20 is a block diagram showing an example of the output buffer.

FIG. 20 shows an example of the output buffer 450, whose construction is approximately the same as that of the input buffer 400; however, since the image data has been binarized, the memories for the line memories 451 and 452 need to have no more than 4096×1 bit capacity.

In addition, 453, 454, and 457 are first, second, and third switch, respectively; 455 and 456 are address counters; and 459 is an inverter.

The following clocks are used as the clocks fed to the first and second switches, 453 and 454, i.e., the clock LCK2 is selected during the time period of writing the image data D, and the clock PCLK is selected during the time period of reading the image data D.

As for the control signal for selecting the switch, the signal OUTSEL (See FIG. 33) generated by the timing signal generation circuit 10, is used.

The frequency of the clock LCK 2 is modified only in the case of reduction mode. The clock PCLK is a synchronization clock of the output device 65.

The address counters 455 and 456, are supplied with the address designation data for setting the initial addresses of the memories 451 and 452. Accordingly, as shown in the figure, the write in start address data and read out start address data, are supplied to the counters 455 and 456 through the fourth and fifth switches 461 and 462, respectively.

In this case, the write in start address data and read out start address data are so controlled by the switch control signal OUTSEL that each of the address data is alternately supplied for each line. As for the read out start address data, 0 address is always designated; and as for the write in start address, the data is automatically modified depending on the reduction ratio, so that the reduced image can be recorded with the center line of the original coincident with a reference line; the detailed description will appear later on.

Both write in start address data and read out start address data are, likewise in the above-described case, supplied by the system control circuit 80.

Figure 21:
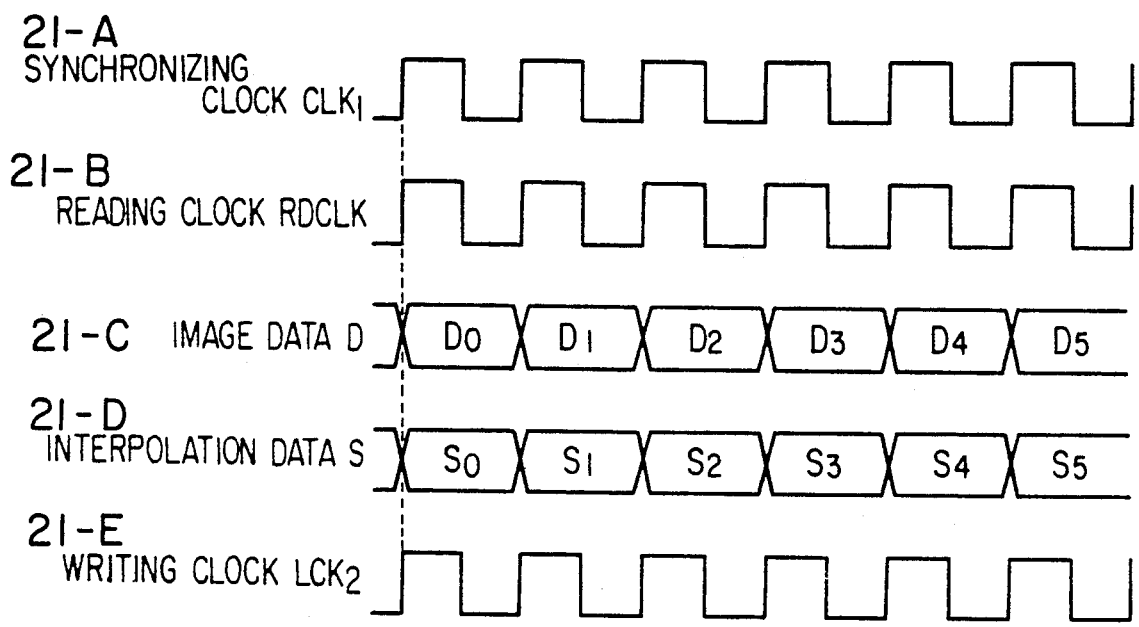
FIGS. 21 through 23 are waveform charts for explaining the operation of the output buffer.
Figure 22:
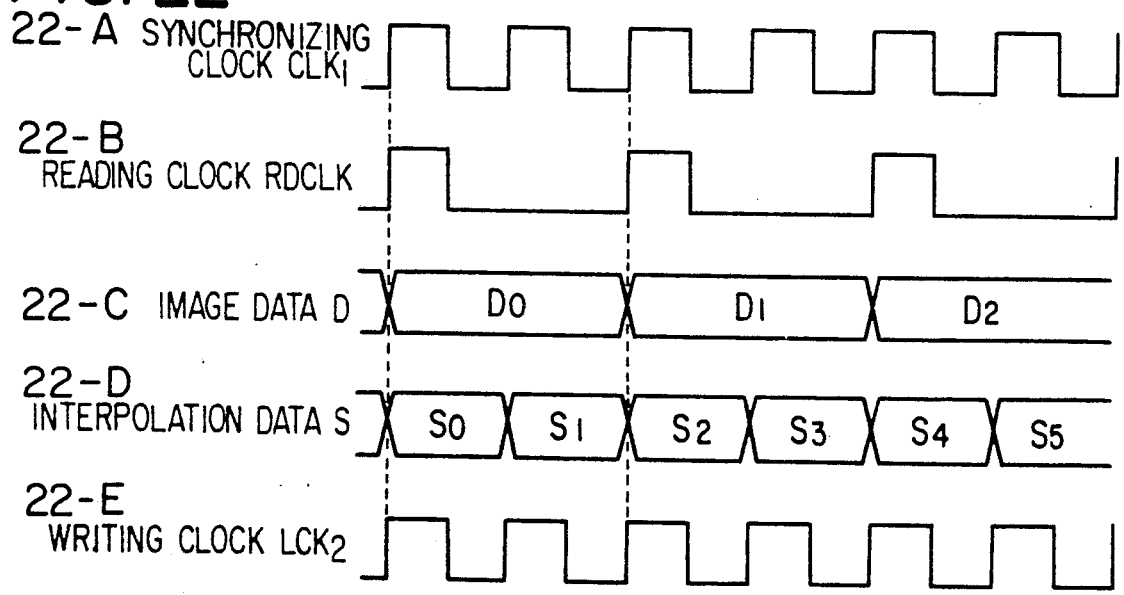
Figure 23:
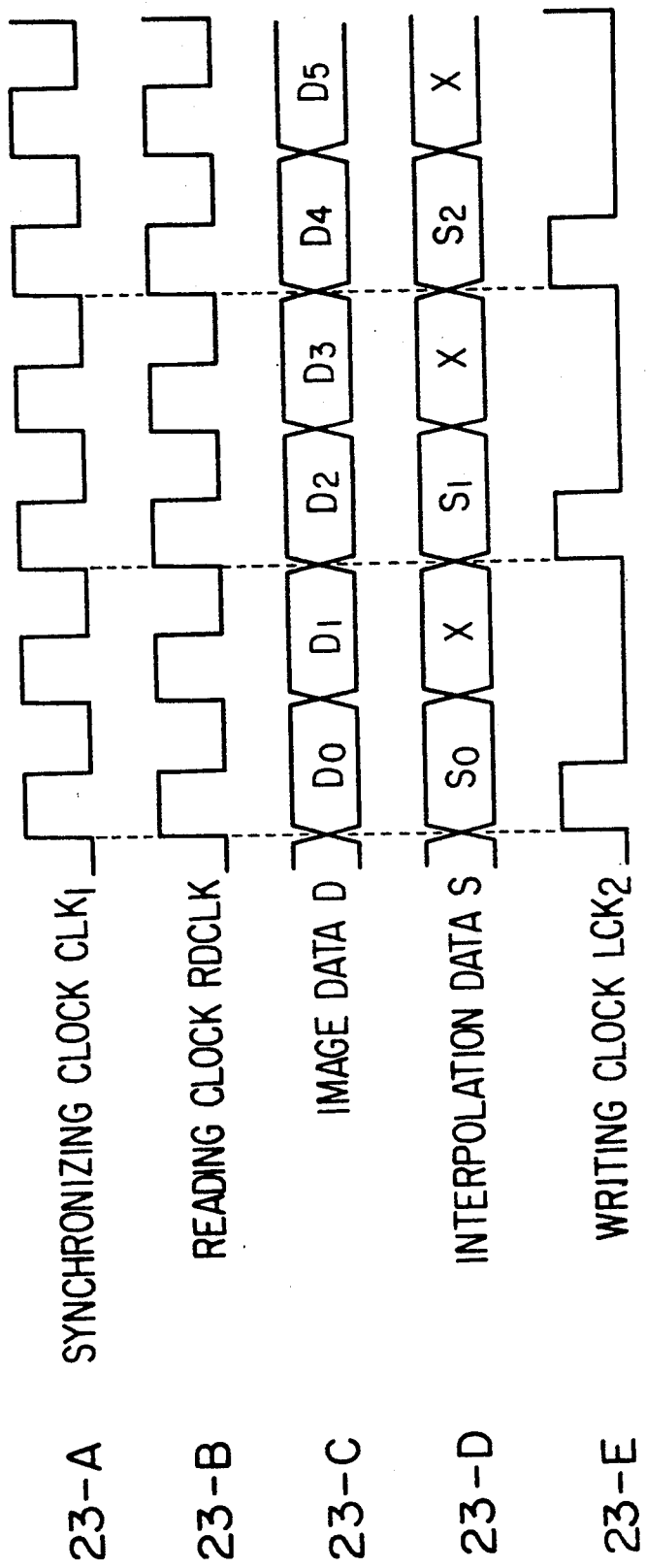

Now, the processing operation of the input buffer 400 and output buffer 450 are explained referring to FIG. 21 through FIG. 23.

FIG. 21 shows the processing operation for the nonenlargement/reduction mode, wherein the frequency of the read out clock RDCLK which is supplied to the input buffer 400 with respect to the synchronous clock CLK 1 as shown in FIG. 21A, is the same as the frequency of the synchronous clock CLK1 (FIG. 21 B). The image data D as shown in FIG. 21 C is read out from the input buffer 400 by means of the above-mentioned processing operation, which is then supplied as the address data of the interpolation ROM 13.

As a result, the interpolation data S as shown in FIG. 21 D, is obtained, which is finally supplied to the output buffer 450, where it is temporarily stored. In this case, the frequency of the write in clock LCK2 which is supplied to the output buffer 450, is the same as that of the synchronous clock CLK1.

On the other hand, FIG. 22 shows the processing operation wherein the enlargement ratio is set two times larger than the original size. When setting the enlargement ratio greater than the original size, the frequency of the read out clock RDCLK for the input buffer 400 is modified depending on the enlargement ratio to be set.

When setting the enlargement ratio two times greater than the original size, the frequency of the read out clock RDCLK supplied to the input buffer 400 is reduced to half of that of the synchronous clock CLK1 as shown in FIG. 22 A, whereby the image data as shown in FIG. 22 C is read out from the input buffer 400, which is then supplied as address data of the interpolation ROM 13. As a result, as shown in FIG. 22 D, one interpolation data S is obtained with respect to one cycle of the synchronous clock CLK 1, which is then supplied to the output buffer 450, where it is temporarily stored.

In this case, the frequency of the write in clock LCK2 supplied to the output buffer 450 is the same as that of the synchronous clock CLK1 (FIG. 22 E).

In this way, even when selecting the enlargement ratio greater than the original size, the enlargement processing can be performed by means of reducing the frequency of the read out clock RDCLK; therefore, the processing operations other than the clock RDCLK supplied to the input buffer 400, are executed without altering the basic clock.

Accordingly, as for the enlargement/reduction circuit 2, it is not necessary to employ the high-speed operation type circuit element. Of course, since even the clock frequency of RDCLK for the input buffer 400 is lower than that of the nonenlargement/reduction mode, no circuit element should have to be the high-speed operation type.

In the reduction mode, for example, when reducing the image to its half size, as shown in FIG. 23, the frequency of the write in clock LCK2 supplied to the output buffer 450 is reduced to a half of its original one as shown in FIG. 21 E, instead of making the frequency of the read out clock RDCLK for the input buffer 400 identical to the frequency of the synchronous clock CLK1, whereby the write in rate of the interpolation data S becomes one time for two cycles, thus allowing the extra image data to be omitted and the necessary image data to be stored in the output buffer 450. The enlargement/reduction processing operation will be described in detail later on.

The interpolation data selection means 300 as shown in FIG. 14, is comprised of a write in circuit 310 for the data selection signal, and a data selection memory 320. In the write in circuit 310 of the data selection signal, the interpolation selection data SD which is determined corresponding to the enlargement/reduction ratio, and the data of processing timing signal TD which performs the control function so that the rate of the read out clock RDCLK for the input buffer 400 or the rate of write in clock LCK2 for the output buffer 450 may be modified depending on the enlargement/reduction ratio, are stored for each block.

Since the interpolation selection data SD has a great amount of capacity, a ROM having a great capacity is used for its write in circuit 310. In this case, the dedicated ROM may be used for that purpose; also, a ROM for controlling the program provided in the system control circuit 80, may be used.

The data selection memory 320 is used for temporarily stored in a group of the sets of the interpolation selection data SD and the data of processing timing signal TD, which are selected and read out from the write in circuit 310 of the interpolation selection data, corresponding to the designated enlargement/reduction ratio. Accordingly, in the actual processing operation only those set of data stored in the data selection memory 320 are used.

For this reason, as for the data selection memory 320, a static RAM which allows high-speed writing and reading, is used. The magnification designation data, and the magnification setting pulse DS, are supplied to the write in circuit 310.

On the other hand, when writing the interpolation selection data SD and processing timing signal TD into the data selection memory 320, the clock SETCLK from the side of write in circuit 310, is used. Therefore, as shown in FIG. 14, a clock selection circuit 350 is provided on the data selection memory 320 side, which selects either the synchronous clock CLK2 or write in clock SETCLK from the write in circuit 310. The selected clock is counted by the counter 360, and its output is supplied as address data to the 12-bit address terminals A0 through A11 provided in the data selection memory 320. Accordingly, the counter 360 is so constructed as to generate a carrier pulse when the counter counts 4096 clocks (i.e., the data for 4096 picture elements). The carrier pulse is used as a transfer completion signal (write in termination signal) CS. (FIG. 25 B).

Figure 24:
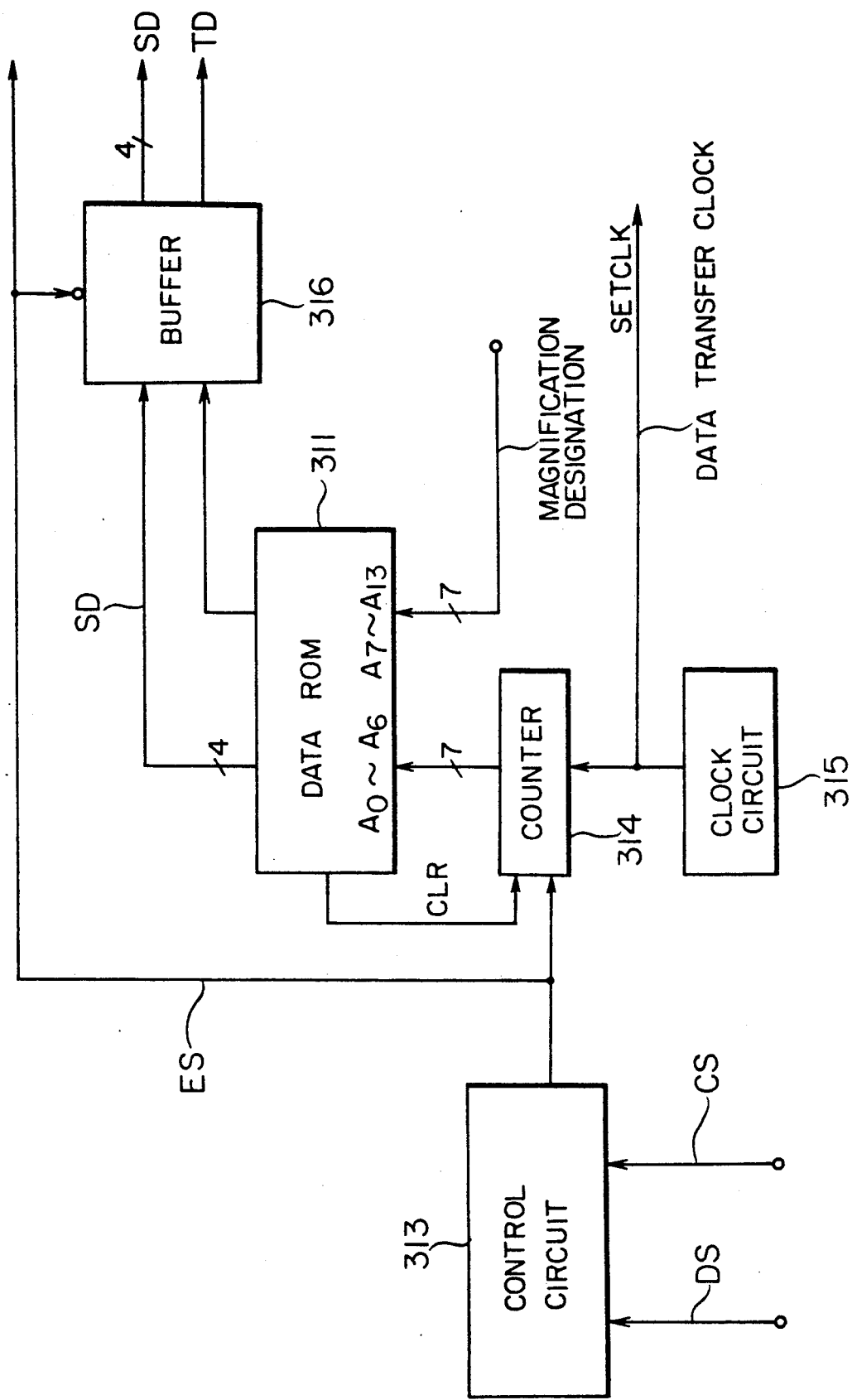
FIG. 24 is a block diagram showing an example of the data selection signal writing circuit.

FIG. 24 shows an example of the write in circuit 310, wherein 311 is a data ROM, in which, as shown in FIGS. 35 and 37, the interpolation selection data SD and the data of processing timing signal TD are stored. In this circuit, prior to the image reading process, among the interpolation selection data SD stored in the write in circuit 310, only the required data is transferred from the data ROM 311 to the data selection memory 320 based on the data setting pulse (magnification ratio setting pulse) DS (FIG. 25 A) after the enlargement/reduction ratio has been set in order to select out the required data.

Figure 25:
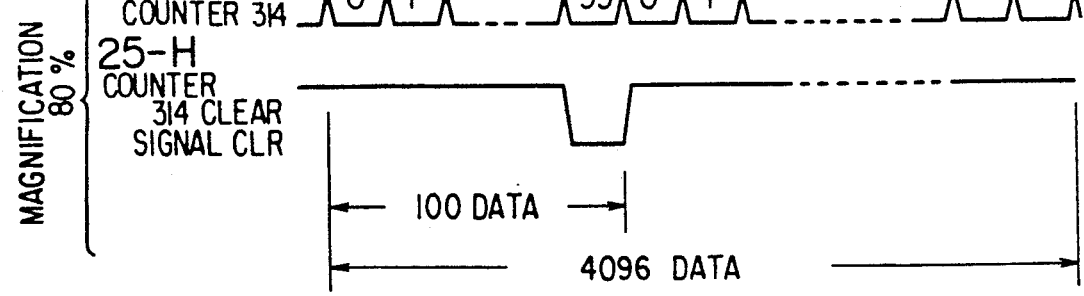
FIG. 25 is a waveform chart for explaining the operation of the above-described data selection signal writing circuit.

The data set pulse DS is supplied to the control circuit 313 as shown in FIG. 24, where the write-enable control signal ES as shown in FIG. 25 C is generated.

The control signal ES is supplied to the counter 314, and the counting condition of the clock SETCLK from the clock circuit 315 which is supplied to the counter 314 is controlled. (FIG. 25 D and E). While the control signal ES is "0", both the interpolation selection data SD and the processing timing signal TD corresponding to the signal from the counter 314 inputted at the address terminals A0 through A6 and the designated enlargement/reduction ratio inputted at the address terminals A7 through A13 are repeatedly written in the data selection memory 320 in the form of a block unit (the area encircled by the dotted line in FIGS. 35 and 37) until getting a prescribed data number equivalent to one line (4096 data).

In this process, as shown in FIG. 25 F, when the enlargement ratio is 160%, a cycle of 160 clocks (the data equivalent to 160 picture elements) is repeated, and when the reduction ratio is 80% as shown in FIG. 25 H, a cycle of 100 clocks (the data equivalent to 100 picture elements) is repeated.

Incidentally, since the ROM 311 is slow in access speed, the data are read out by the clock having a slower rate than the normal read out speed. The write in timing of the data read out from the data ROM 311 into RAM 320 is in synchronization with the data transfer clock SETCLK.

The buffer circuit 316 is provided so as to prevent the signal from the data ROM 311 from affecting the data selection memory 320 and a synchronization circuit 370 which will be discussed later on, during the image reading process; the buffer circuit 316 is, therefore, activated only when the control signal ES is "0". The control signal ES is also used as an write-enable signal with respect to the data selection memory 320. (See FIG. 14)

When the data (4096 data) have been written in the data selection memory 320, the transfer termination signal CS is outputted from the counter 360, thereby terminating the data writing period. Then, the mode returns to the normal image processing mode, wherein the interpolation selection data SD and processing timing signal TD are read out from the data selection memory 320, which are supplied to the synchronization circuit 370 of the later stage.

The counter 314 is cleared by the clear signal CLR (FIG. 25 F); the clear timing varies depending on the enlargement/reduction ratio.

In other words, the clear timing of the counter 314 depends on the incremental degree e.g. in terms of % of the enlargement/reduction ratio with which the ratio can be set.

For example, if the enlargement/reduction ratio can be set with the increment of 1/100 (1%), the counter 360 has a function to obtain a carrier pulse (corresponding to the signal CLR) which becomes low level when it counts 100 pulses, or the data corresponding to 100 pixels; and then, the carrier pulse become high level when it counts the next pulse subsequent to the 100th pulse. (See FIG. 25.)

Accordingly, in the data selection memory 320 is basically written the data with a repetition unit of 100 pieces of it. So far as the processing operation is made in the reduction mode, the number of the unit data is constant (100 pieces). For example, if the reduction ratio is set to 80%, the number of the unit data to be transferred is 100.

However, in the enlargement mode, the number of the unit data to be transferred differs depending on the enlargement ratio. If the enlargement ratio is 160%, the counter 311 will obtain a carrier pulse when 160 clock pulses (therefore, the data corresponding to the 160 pixels) have been counted. (See FIG. 25.)

Thus, the number of the unit data to be transferred to the counter 320 depends on whether the set mode is in the reduction mode or in the enlargement mode.

The reason for designing the construction in such a manner as described above is that the number of the interpolation data to be read out from the interpolation ROM 13 increases depending on the enlargement ratio at the time of the enlargement processing; for example, it is necessary to obtain 160 interpolation data S in the 160% mode, and 120 interpolation data S in the 120% mode respectively.

On the other hand, in the reduction mode, unnecessary image data is removed by means of controlling the writing timing of the output buffer 450; therefore, always a constant number of the data may be read out from the interpolation ROM 13.

Thus, the number of the unit data to be transferred is controlled depending on the enlargement/reduction ratio.

When designing the enlargement/reduction ratio can be set with the increment of 1/X (X is an arbitrary integral number). In the above-described example, X is set to 100, however, X can be set freely either to 64 or to 200, and so on. This is because there is no restriction arising from the construction of the address counter.

Incidentally, G and H in FIG. 25 show the clear timing in the reduction mode, wherein G and H represent the relationship between the address data of the counter 314 and the clear signal CLR supplied to the counter 314 in the 80% reduction mode.

Figure 26:
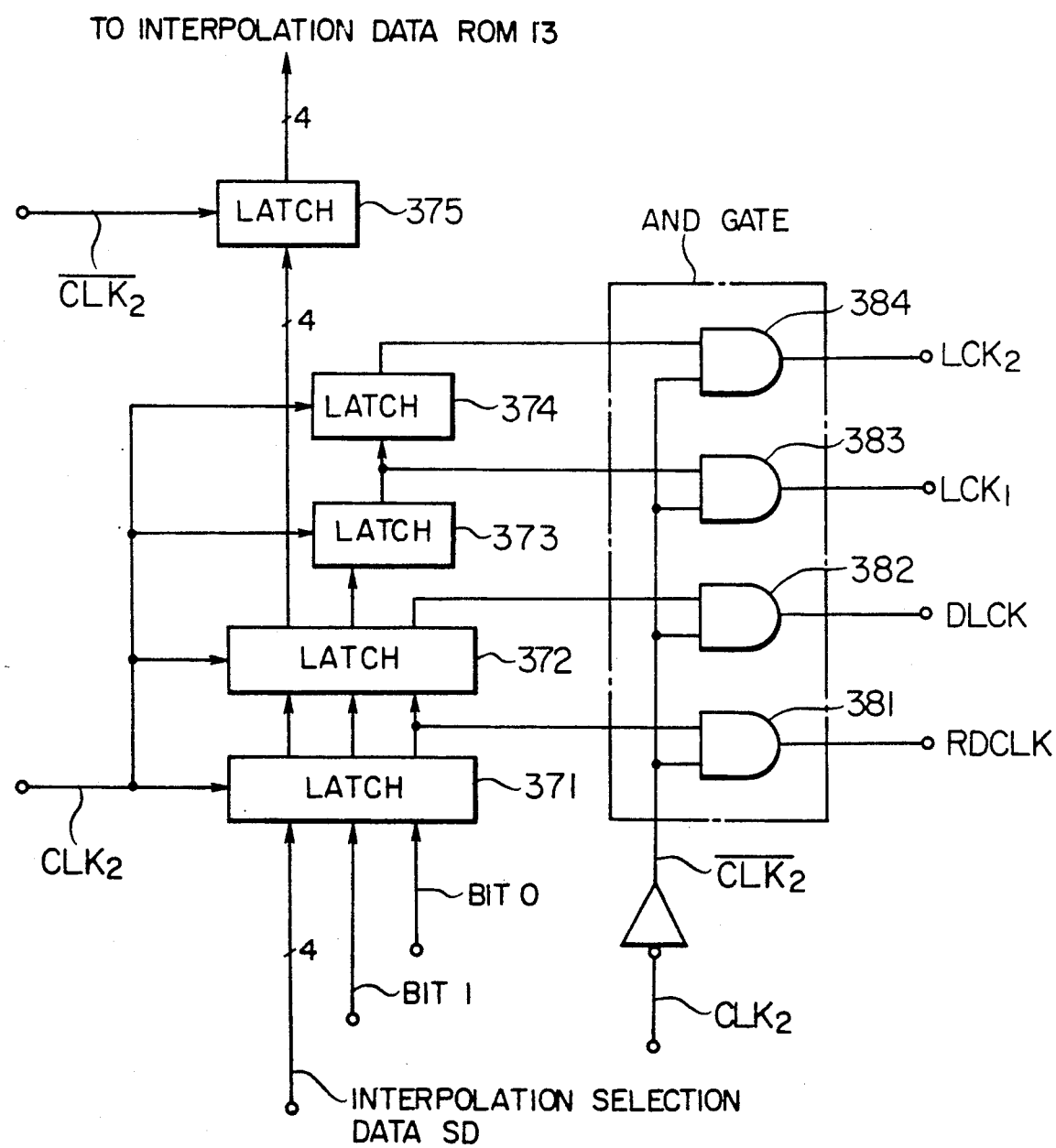
FIG. 26 is a block diagram showing an example of the synchronous circuit.

FIG. 26 shows an example of the synchronization circuit 370 shown in FIG. 14. The synchronization circuit 370 is comprised of, as shown in the figure, plurality of latch circuits 371 through 375, and a plurality of AND gates 381 through 384; and the interpolation selection signal SD is latched in the order of the latch circuits 371, 372, and 375. On the other hand, bit 1 component of the processing timing signal TD is latched in the order of the latch circuits 371 through 374. While the of bit 0 component is latched by the latch circuits 371 and 372. Above bit 1 and bit 0 represent the bit positions in the bit configuration of the signal TD. The synchronization clock CLK2 is supplied to the latch circuits 371 through 374, and the phase-inverted synchronization clock CLK2 is supplied as a latch clock to another latch circuit 375 and a plurality of AND gates 381 through 374.

On the other hand, these AND gates 381 through 384 are supplied with bit 0 data or bit 1 component of the latched processing timing signal TD, wherein the output of the AND gate 381 is used as a read out clock RDCLK of the input buffer 400, and the output of the AND gate 382 is used as a latch clock DLCK of the latch circuits 11 and 12.

Likewise, the output of the AND gate 384 is used as a write in clock LCK2 of the output buffer 450, and the output of the AND gate 383 is used as a latch clock LCK1 of the latch circuit 14. At this stage, when bit 0 data or bit 1 data of the processing timing signal TD is "1", the AND gates 381 through 384 inputted such bit 0 data and bit 1 data becomes open, and when such bit 0 data or bit 1 data of the processing timing signal TD is "0", the above mentioned AND gates become closed. When the synchronization circuit 370 is thus constructed, the read out clock RDCLK, as well as write in clock LCK2 having the frequency corresponding to the designated enlargement/reduction ratio can be generated. An example of such synchronization circuit will be shown below.

Figure 27:
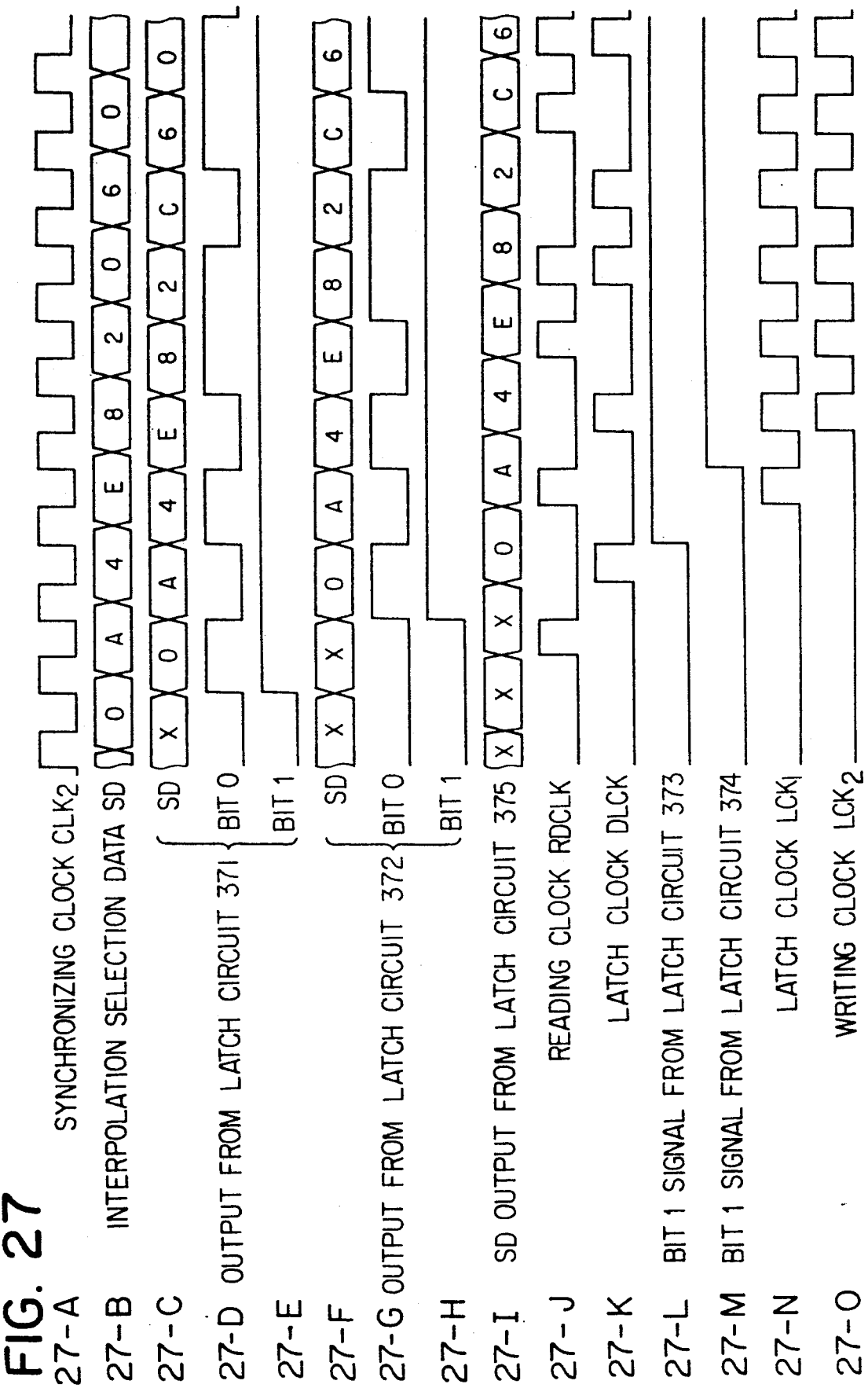
FIGS. 27 and 28 are waveform charts for explaining the above-described synchronous circuit.

FIG. 27 shows the timing chart when the mode is set to 160% enlargement mode. Firstly, into the data selection memory, the data corresponding to enlargement ratio 160% which are given in the dotted line in FIG. 35 showing a part of data of the data ROM 311 are repeatedly transferred.

It is apparent from FIG. 35, the data to be outputted in order to address one interpolation data for one pixel is constructed with a pair of data consisting of an interpolation selection data SD and a processing timing signal TD.

Figure 29:
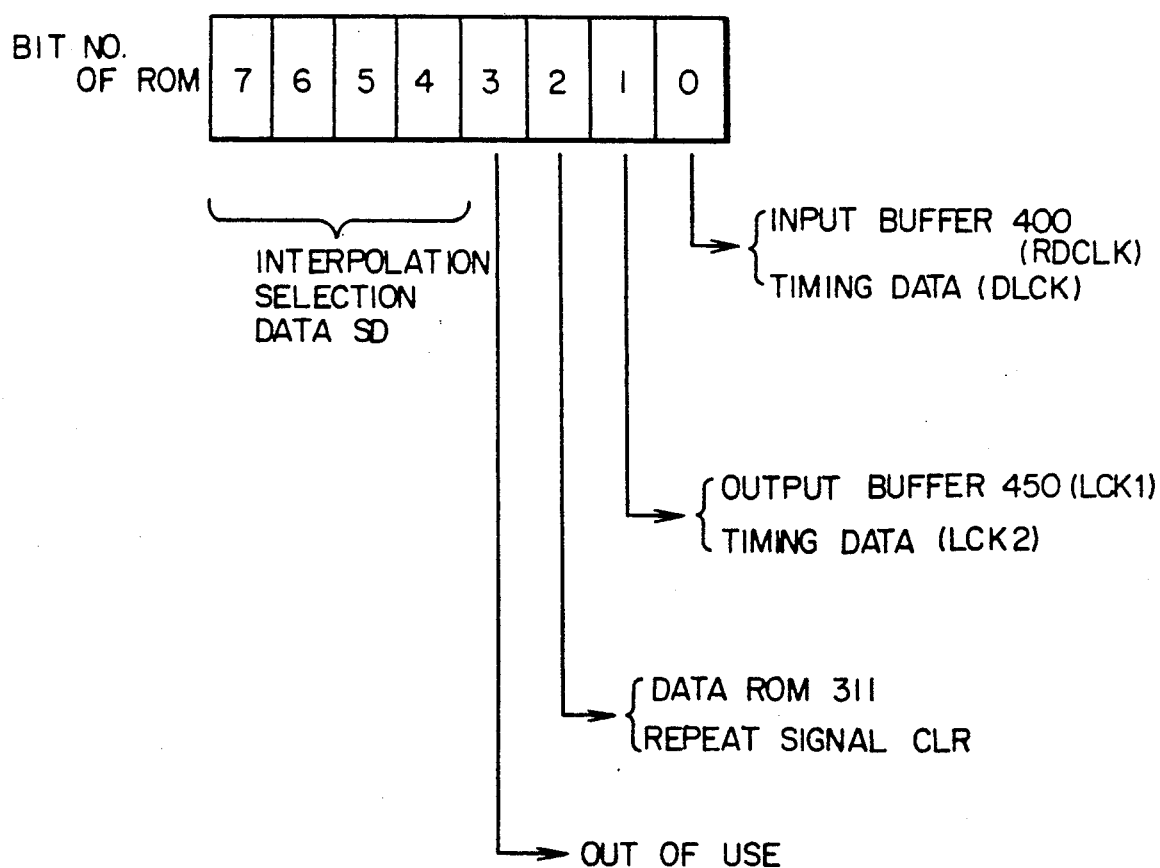
FIG. 29 is a bit arrangement of the data ROM.

The interpolation selection data SD and the processing timing signal TD in FIG. 35 are represented with hexadecimal indication, however, the detailed configuration of such data is constituted with a bit arrangement as shown in FIG. 29. In FIG. 29, 4 bits are allocated for the interpolation selection data SD, and the bit 0 of the remaining 4 bits is used as the data for the latch clock DLCK with respect to the latch circuits 11 and 12, and the read out clock RDCLK with respect to the input buffer 400.

Also, the bit 1 is used as a latch clock LCK2 with respect to the latch circuit 14 and the write in clock LCK1 for the output buffer 450. The bit 2 is used as a clear signal CLR for the counter 314, as well as a repetition signal for the data ROM 311. The bit 3 is not used in this example.

In the 160% enlargement mode, the interpolation data SD as shown in FIG. 27 B is outputted from the data selection memory 320; and the data, as shown in FIG. 27 D and E, are outputted as the bit 0 data and bit 1 data of the processing timing signal TD.

FIG. 27 B and C show the interpolation selection data SD; FIG. 27 B shows the timing before the latching is performed with latch circuit 371, and FIG. C shows the timing after the latching is performed. Accordingly, as shown in FIG. F through H, the interpolation selection data SD is outputted with one cycle delay from the latch circuit 372 of the next step. Since the interpolation selection data SD is further undergone the latch processing in the latch circuit 375, the interpolation selection data SD is further delayed for the period of one cycle as shown in the diagram in FIG. 27 F. The interpolation selection data SD as shown in FIG. 27 I is supplied as an address data to the interpolation ROM 13.

The AND gates 381 and 382 are supplied with the bit 0 component of the processing timing signal TD shown in FIG. 27 D and G; therefore, if the AND logic is taken between the phase-inverted synchronization clock CLK2 and aforementioned bit 0 component of the processing timing signal TD, the read out clock RDCLK and the latch clock DLCK, are obtained as shown in FIG. 27 J and K.

Also, since the bit 1 component of the processing timing signal TD is latched by the latch circuits 373 and 374 (FIG. 27 L and M), the clock LCK1 and LCK2, as shown in FIG. N and O, are outputted from the AND gate 383 and 384. These clocks LCK1 and LCK2 have the opposite phase to each other, however, their frequencies are same as that of the synchronization clock CLK.

Figure 28:
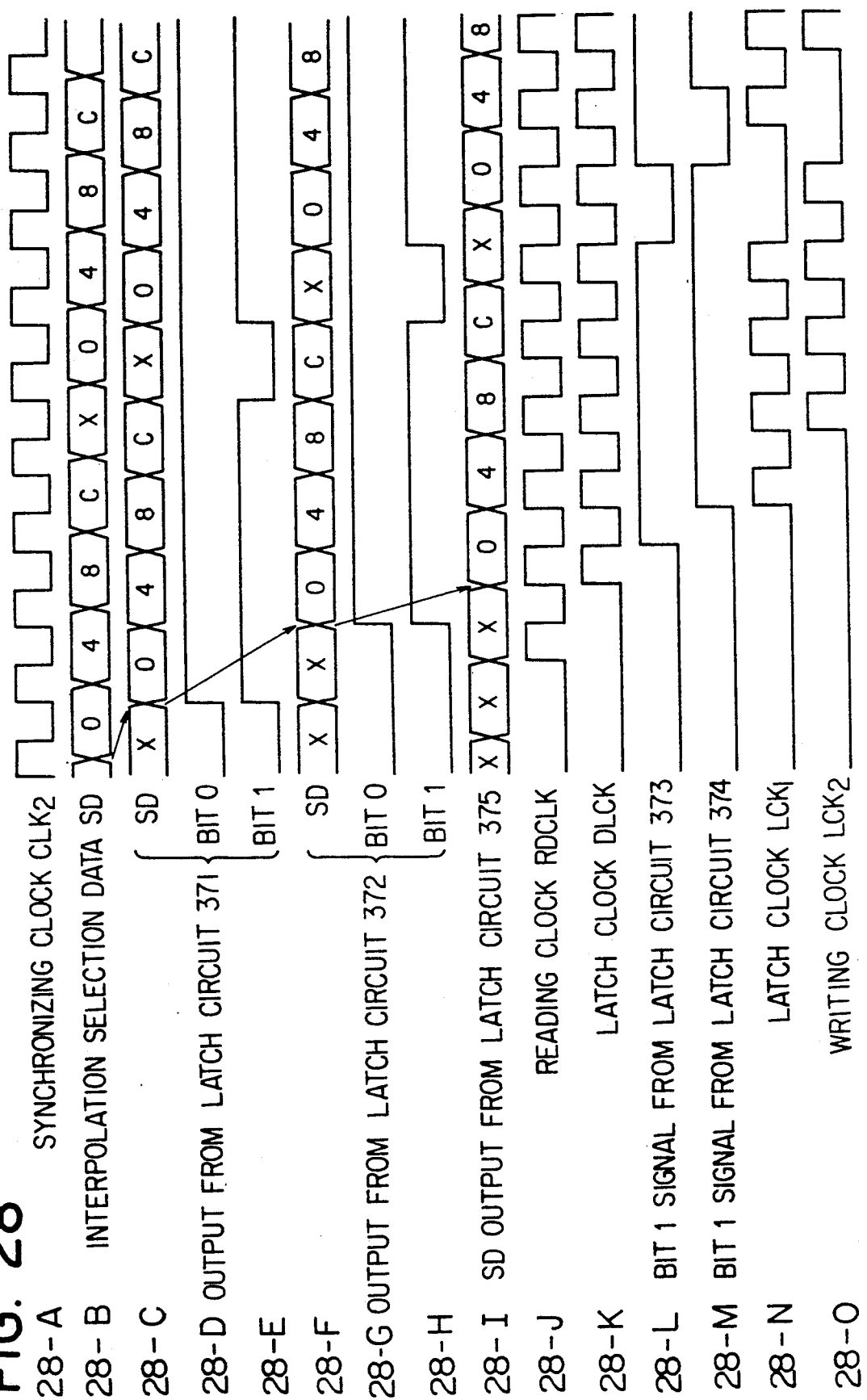

In this way, when the enlargement mode is selected, only the frequency of the read out clock RDCLK supplied to the input buffer 400, is modified. FIG. 28 shows the timing chart of the 80% reduction mode.

In this case, the interpolation selection data SD, as shown in FIG. 28 B, is outputted from the data selection memory 320 in which the data encircled with dotted line in FIG. 37 are repeatedly transferred in advance; and the data, as shown in FIG. 28 D and E, are outputted as the bit 0 and bit 1 data of the processing timing signal TD. The latch clock RDCK for the latch circuits 11 and 12 and the read out clock RDCLK supplied to the input buffer 400 are shown in FIG. 28 J and K, that is to say, their frequencies are not altered.

On the other hand, the bit 1 data, as shown in FIG. 28 L and M, are outputted from the latch circuits 373 and 374, whereby the latch clock LCK1, as shown in FIG. 28 N, is obtained from the AND gate 383. Likewise, the write in clock LCK2, as shown in FIG. 28O, is obtained from the other AND gate 384.

In this way, in the reduction mode, only the frequency of the write in clock LCK2 with respect to the output buffer 450 is modified depending on the preset reduction ratio.

As already described earlier, when recording the enlarged/reduced image using the center line 1 of the recording paper P as a reference line, first in the enlargement mode, the read out start address of the input buffer 400 should be controlled according to the enlargement ratio. On the other hand, in the reduction mode, the write in start address of the output buffer 450 should be controlled according to the reduction ratio. The following description explains the reason for the above-described procedures.

As described above, assuming that the maximum image reading size of the CCDs 56 and 57 is B4 size, and that the resolution capability is 16 dots/mm, the memory capacity for one line is 4096 bits. Accordingly, as for the capacity of the line memories 401, 402, 451, and 452, 4096 bits are sufficient.

In the non-enlargement/reduction mode, it is required no more than that the image data of 4096 bit for one line as read with CCD's is supplied to the output buffer 450, and then supplied to the output device 65.

On the other hand, in the enlargement mode, since the image data from the input buffer 400 increase according to the enlargement ratio, and if increased image data are directly supplied to the output buffer 450, the image data will overflow and the necessary image data cannot be stored in the output buffer 450, nor is it impossible to record the image using the center line of the recording paper as a.

Figure 30:
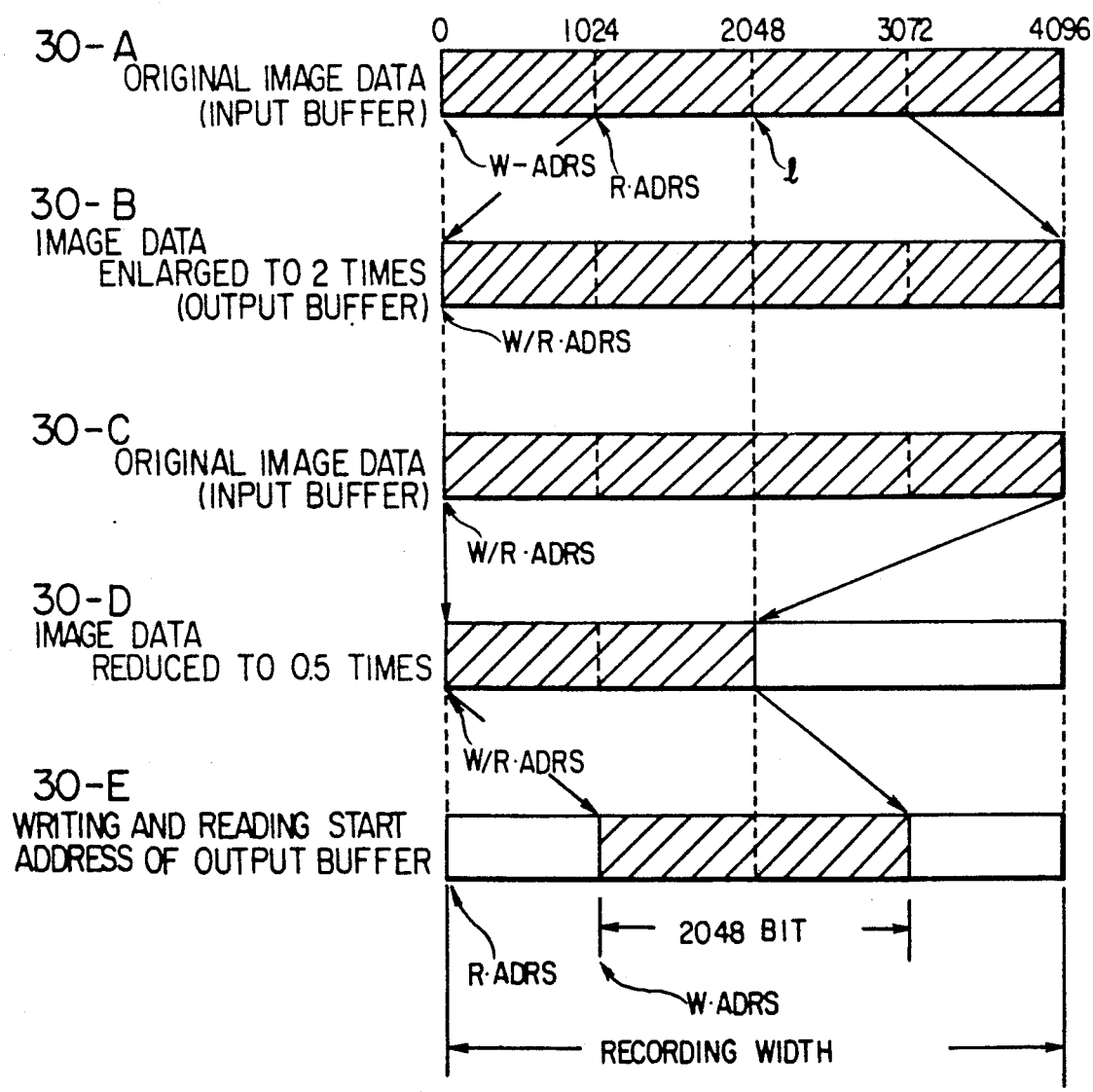
FIG. 30 is a schematic diagram for explaining the recording procedure based on the center reference in the enlargement/reduction mode.

When the original image data read out from the input buffer 400 is like the diagram as shown in FIG. 30 A, and if the data is enlarged by two times, the image data quantity will become two times as large as the original one. On the other hand, the 2048th bit of the image data which is equivalent to the half of the capacity (4096 bits) of the effective horizontal line (effective length) of the B 4 size, corresponds exactly to the center 1 of the image to be recorded.

Therefore, if the image data located from the 1024th bit to the 3072th bit only are read out from the image data supplied to the input buffer 400, and then if the sum of those bits, 2048 bits, are undergone the enlargement processing procedures, even if the data quantity becomes two times as large as the original one due to the enlargement processing, the enlarged data will be still within the range with which the output buffer 450 can deal. Furthermore, as shown in FIG. 30 A, since the data, which has undergone the image processing using the center 1 of the image (the 2048th bit of the original image data) as a reference of center, is supplied to the output buffer 450, the entire necessary enlarged image can be recorded.

Figures 31, 32:
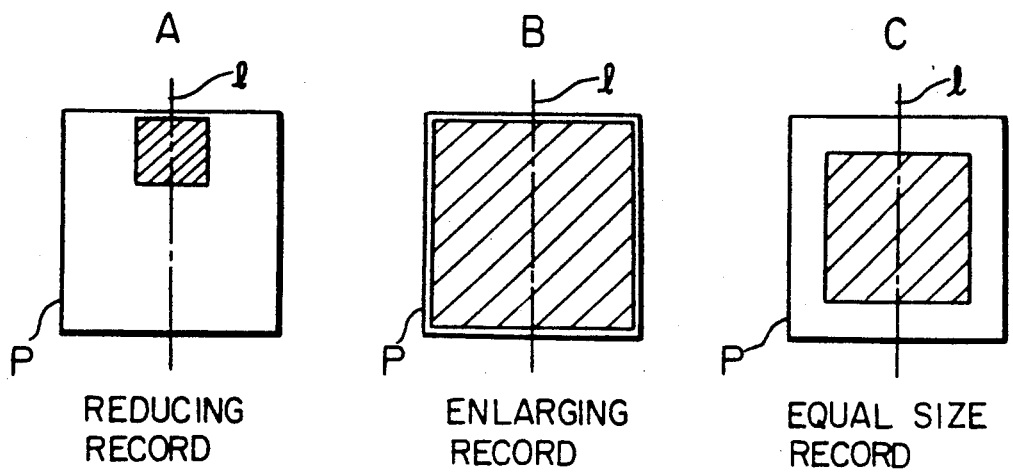
FIG. 31 shows recording examples of the center reference.
FIG. 32 is a chart showing an example of the read out start address data at the time of recording on the center reference.

In this way, in the enlargement mode, if the read out start address of the input buffer 400 is controlled according to the preset enlargement ratio, as shown in FIG. 31 B, the image can be recorded on the recording paper P using the center line of the recording paper P as a reference line.

Accordingly, the read out start address of the enlargement mode, is set according to the following equation:

Read out start address $$=(4096-4096\div\text{enlargement ratio})/2$$

If the original image is to be enlarged to 200% size, the enlargement ratio can be determined by 200/100=2.0.

FIG. 31 C shows the recording example of the non-enlargement/reduction mode.

In the reduction mode, as shown in FIG. 30 C, the write in process and read out process of the input buffer 400 are same as those of the non-enlargement/reduction mode, i.e., writing in and reading out from the 0 address.

Figure 57:
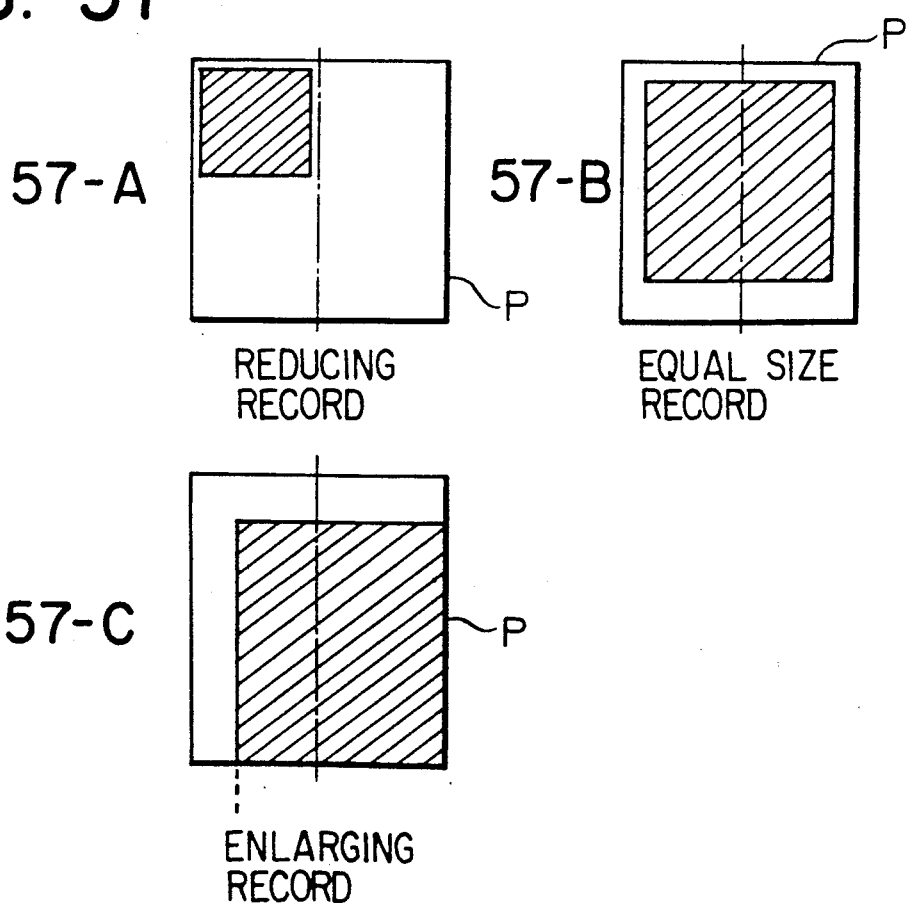
FIG. 57 is a series of diagrams showing the image recording condition.
Figure 58:
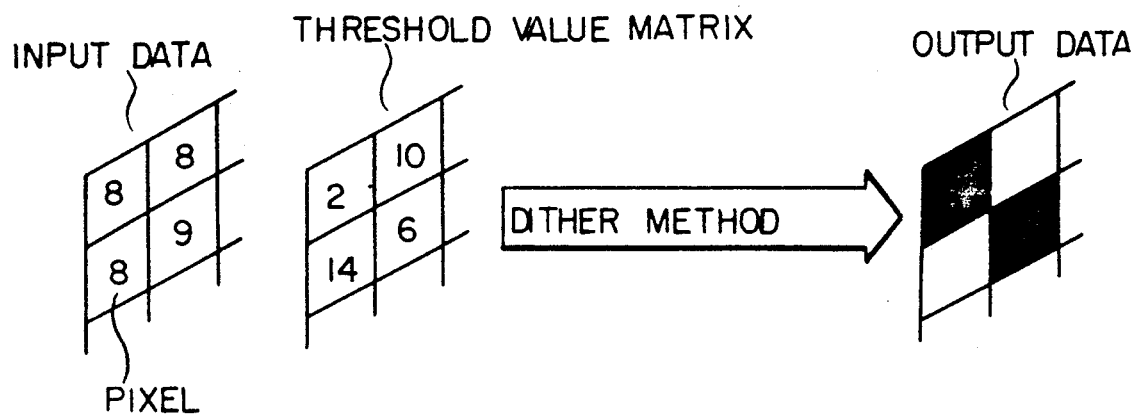
FIG. 58 is an explanatory diagram showing the dither method.
Figure 59:
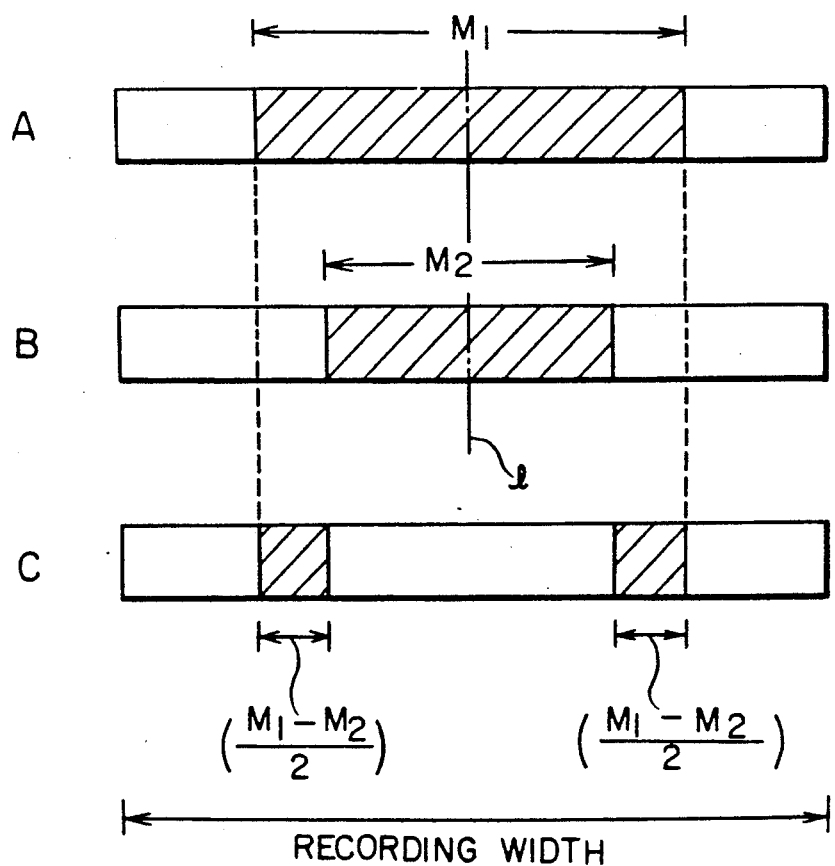
FIG. 59 is an explanatory diagram showing the relationship between the previous recorded image data and the image data to be currently recorded.

When the image is reduced to 0.5 times smaller than the original one, the image data for one line is reduced to ½ by means of the interpolation processing, and the reduced data is written in the output buffer 450. At this stage, if the image data D read out from the input buffer 400 is directly written in the output buffer 450, the image data is, as shown in FIG. 30 D, written in from the 0 address of the output buffer 450, and then if the image data from the 0 address is sequentially recorded from the one side of the recording paper P; then, the image is recorded as shown in FIG. 57 A.

In order to avoid such a problem in recording, the write in start address should be set to the 1024th address (FIG. 30 E). If the read out start address is set to 0 address, the vacant data (equivalent to the white) is recorded up to the 1024th bit; therefore, the reduced image is, as shown in FIG. 31 A, recorded using the center line of the recording paper P as a reference line.

Accordingly, the write in start address of the output buffer 450, can be set according to the following equation:

Write in start address $$=(4096-4096\times \text{reduction ratio})/2$$

Thus, if the read out start address of the input buffer 400 and the write in start address of the output buffer 450 are properly selected according to the enlargement/reduction ratio, a line memory having an one-line capacity can be used to carry out the recording processing using the center line of the recording paper as a reference line. FIG. 32 shows the setting example of the address data.

On the other hand, the address data to be used in a center reference mode, which has been already written in a ROM table as address data with respect to the input and output buffers as shown in FIG. 32, can also be used, whereby proper data may be selectively used according to the specified enlargement/reduction ratio, it is therefore not necessary to calculate the corresponding address data using the CPU whenever the ratio is specified, thus eliminating the load to be imposed on the CPU.

Also, if the write start address or the read start address of the output buffer and the input buffer is so constructed as to be controlled according to the specified enlargement/reduction ratio or the specified recording area, the enlarged/reduced image in the arbitrarily specified position can be recorded in the time.

Consequently, the image of the area specified by the operator can be recorded in the specified position on the recording paper with the specified size.

Further, as for the address data with respect to the output and input buffers, they may be stored in the ROM table, or may be calculated by the CPU and if both ways of preparing them are provided in the apparatus, they can be used selectively according to layout or composition in the recording mode, whereby editing can be made without limitation by using data processed by the CPU in the editing mode.

Moreover, in the normal recording mode, the address data stored in the ROM table is used, thereby eliminating the load to be imposed on the CPU.

Figure 33:
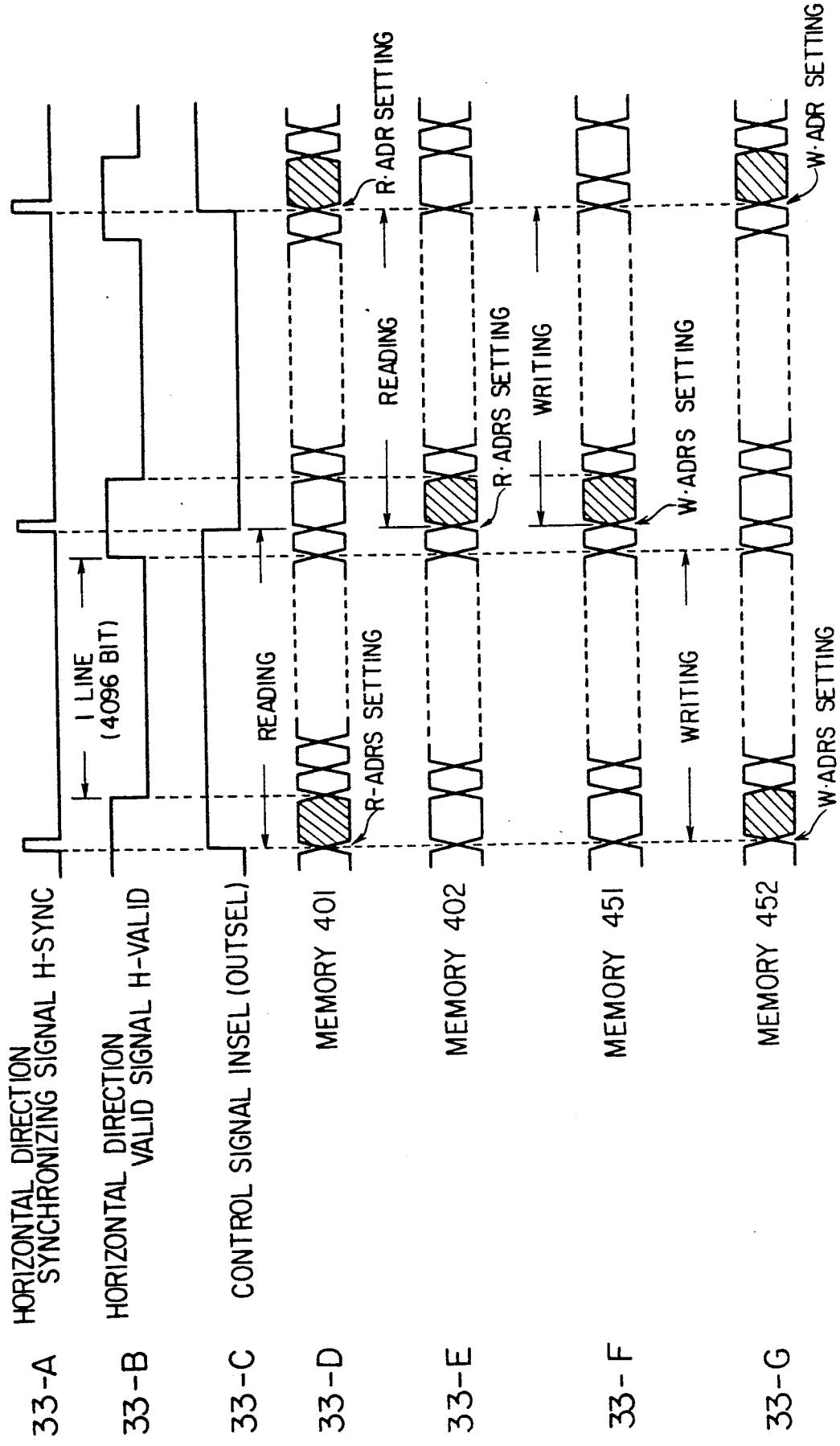
FIG. 33 is a waveform chart for explaining the processing operation of the recording procedure described above.

FIG. 33 shows an example of the processing operation described above.

As shown in FIG. 33 D through G, both the read out start address of the input buffer 400 and the write in start address of the output buffer 450 are set in synchronization with the horizontal synchronization signal H-SYNC.

FIG. 33 D and E show the write in and read out timings with respect to the input buffer 400. Likewise, FIG. 33 F and G show the write in and read out timings with respect to the output buffer 450.

The control signal INSEL and OUTSEL are, as described above, the rectangular wave signals wherein two cycles of H-SYNC corresponds thereof.

FIG. 34 shows the relationship between each sampling position used in the enlargement mode and the interpolation selection data SD. The data shown in FIG. 34 is an example where the enlargement ratio M is set to 160%; the enlargement ratio can be set with a increment of 1% in this embodiment according to the invention.

When the enlargement ratio is 160%, the sampling interval for outputting interpolation data becomes 100/160 (=0.62500); consequently, the relationship between the sampling position (theoretical value) with respect to the original data position and the interpolation data SD which is referred to at the sampling time, can be the one shown in the FIG. 34.

As for the interpolation selection data SD with respect to the original data No. "0," the former data (0) is the interpolation selection data SD when the sampling position is (0.00000); and the latter data (A) is the interpolation selection data SD when the sampling position is (0.62500).

Figure 38:
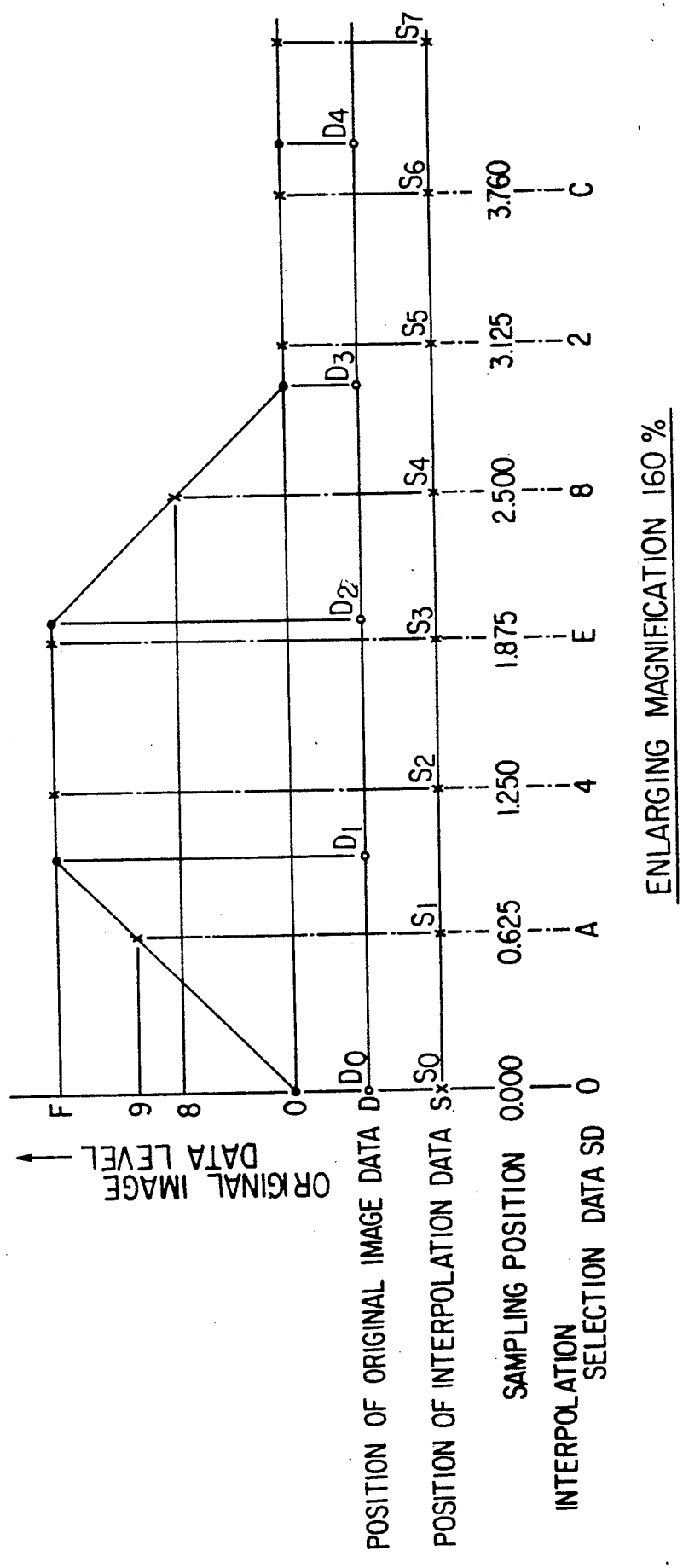
FIG. 38 is a diagram of an image signal for explaining the image enlargement procedure.

By the way, the positional relationship among them are indicated in FIG. 38.

There are no data of the latter interpolation selection data SD at the original data Nos. 2, 4, 7, 9. This fact shows that in the case of enlargement ratio 160%, the number of data has not been increased, but only one data exists in between original image data 2 and 3, 4 and 5, 7 and 8, 9 and 10, . . . respectively.

These data mentioned above are actually stored in the data ROM 311 in such a manner as shown in FIG. 35. In FIG. 35, each data referred to by the base address ADRS (ordinate) and the number of steps (abscissa) shows the interpolation selection data SD at its left side and the processing timing signal TD at its right side consisting of clock control signal for both the input buffer 400 and the output buffer 450 and clear signal CLK to the counter 314.

The bit configuration of the data ROM 311 is shown in FIG. 29 wherein least significant 3 bits represent the processing timing signal TD.

Accordingly, when the read out clock RDCLK and latch clock DLCK are to be outputted in order to process the original image data stored in the input buffer, the bit 0 data is basically; bit 0="1". However, in the case where there are two data of the interpolation data to be outputted between a pair of original image data, for example as shown in FIG. 34, the bit 0 of TD corresponding to the former sampling position is defined as "1" and that corresponding to the latter is defined as "0". When the write in clock LCK 2 and latch clock CLK1 are to be outputted, the bit 1 data is basically; bit 1="1". In the case where it is necessary to omit the invalid data "*" as shown in FIG. 28, the data of bit 1 is defined as "0". At the repetition cycle data position, for example, at the position of last data out of the data group indicated in FIG. 35, the data of bit 2 of relevant TD is; bit 2="0".

Herewith, taking the FIG. 35 as one example, since there is not such invalid data to be omitted, the data of bit 1 is always set to "1". Accordingly, data of the processing timing signal TD are as follows:

XXXX0111=X7

XXXX0110=X6

XXXX0011=X3.

FIG. 36 shows the relationship between sampling positions with regard to each original position and the interpolation selection data SD used when reducing the image. The chart shows the data in the 80% reduction mode. In the chart, "*" represents the invalid data. Actually, the data is stored in the memory in such a manner as shown in FIG. 37. The equation, bit 1="0 for TD ", is true only for the data corresponding to "*", which is shown as "05" in the chart.

Next, concerning above-mentioned enlargement/reduction operation, first of all, the enlargement processing operation is explained in detail referring to the figures starting from FIG. 38; wherein, for the convenience of explanation, the enlargement ratio M is set to 160%.

FIG. 38 shows the relationship, using the analogous method, between the original data and the data which has been obtained by the interpolation processing, wherein S represents a converted data (interpolation data) after the interpolation processing.

The relationship, taking $D_0$, $D_1$ and $S_1$ as example in the above-mentioned case, between the original image data level and the data after the interpolation processing is shown in FIG. 15. Also, the relationship between the sampling pitch for the interpolation processing and the interpolation selection data SD is shown in FIG. 34.

Figure 39:
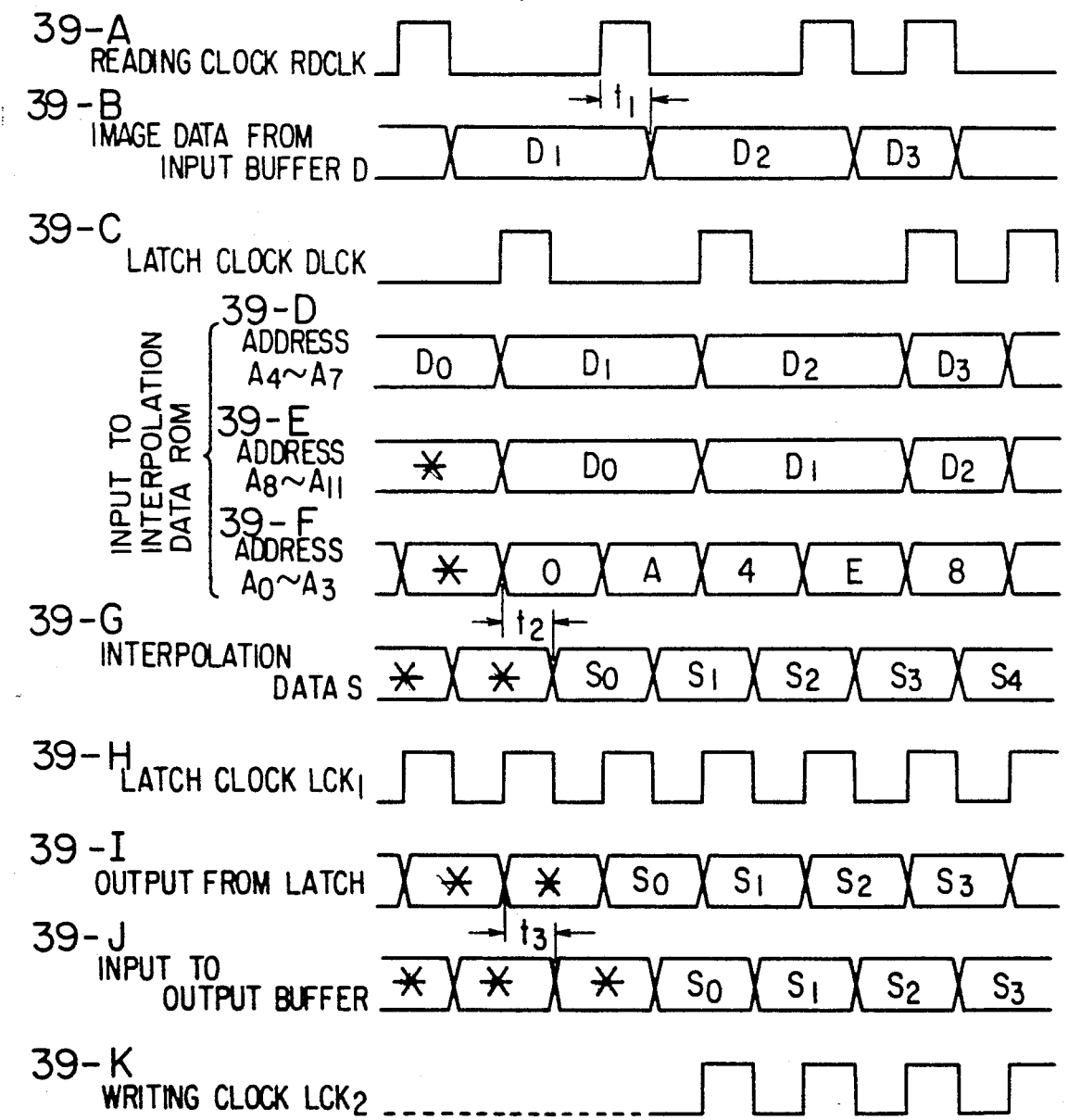
FIG. 39 is a wave form chart for explaining the image enlargement operation.

FIG. 39 shows the signal timing chart of each portion in the operation of interpolation processing. The original images obtained from the CCDs 56 and 57 shall be designated as D0(0), D1(F), D2(F), D3(0), and D4(0). (The letter and numeral in the parenthesis represents a gradation level.)

When the read out clock RDCLK is supplied to the input buffer 400, the image data D is outputted after the access time $t_1$ (FIG. 39 A and B), then the image data D are latched by the latch clock DLCK (FIG. 39 C). As the latch clock is synchronized with the read out clock RDCLK, so when the D1(F) is outputted from the latch circuit 11, the D0(0) is outputted from the latch circuit 12 (FIG. D and E). The latch pulse DLCK is delayed from the synchronous clock CLK1 by one cycle On the other hand, the data table shown in FIG. 37 is referred to by the externally set enlargement/reduction ratio. The letters and numerals, 0;A;4:E; ... (FIG. 39 F), are outputted as the interpolation selection data. As a result, the interpolation data table is referred to with the image data D0 and D1 and the interpolation selection data SD, thereby the interpolation data S are outputted from the interpolation ROM 13 (FIG. 39 G). Accordingly, the interpolation data S outputted are:

0 ($S_0$) · 9 ($S_1$) · F ($S_2$), F ($S_3$) ·
8 ($S_4$), 0 ($S_5$), ...

The read-out interpolation data S is sequentially supplied to the latch circuit 14 (FIG. 39 H and I). The interpolation data S converted into the binary values is written in the output buffer 450 by means of the write in clock LKCK2 (FIG. J and K). In FIG. 39, t2 is the access time of the interpolation ROM 13, and t3 is the access time of the binary-coding means 69.

Figure 40:
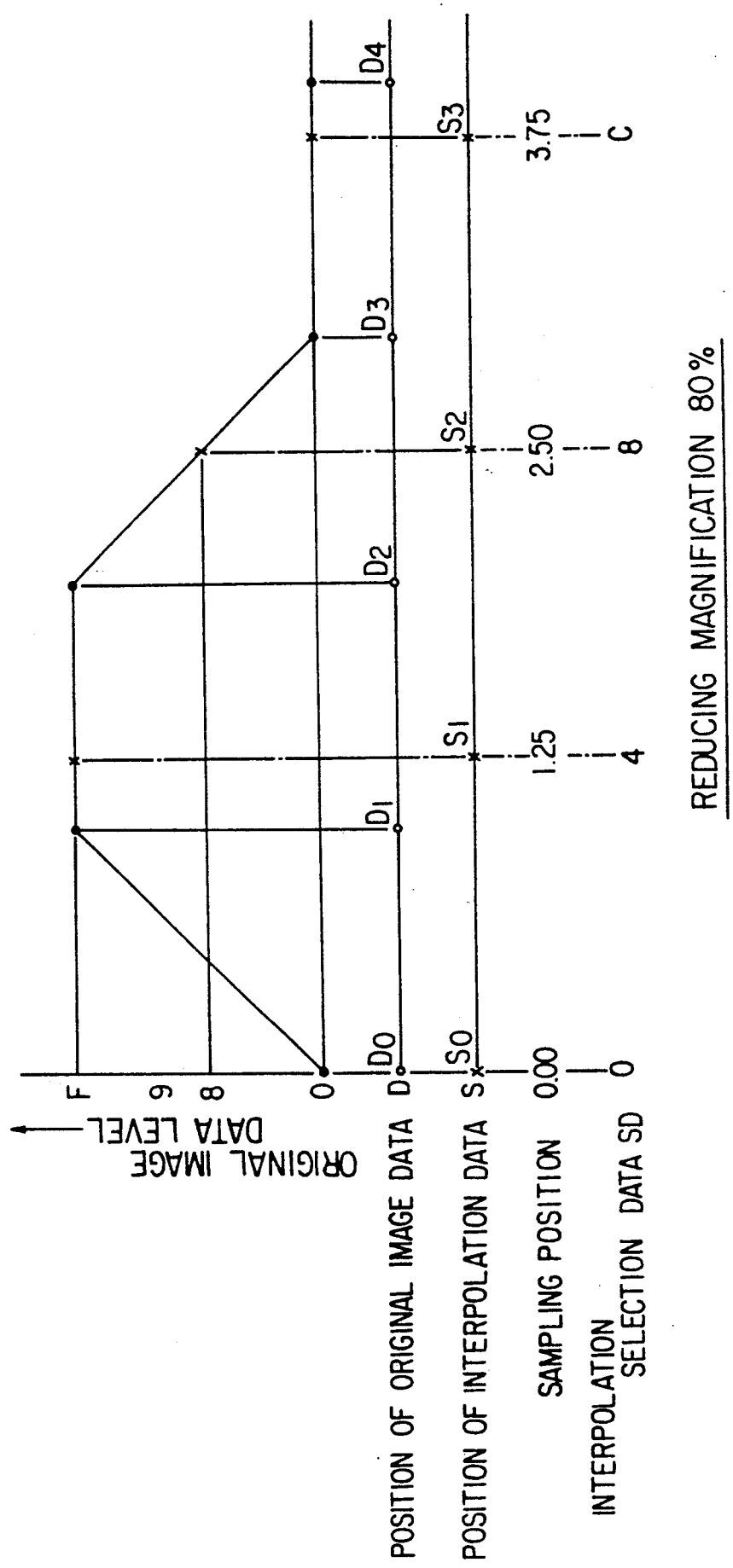
FIG. 40 is a diagram of an image signal for explaining the image data interpolation in the case of reduction procedure.
Figure 41:
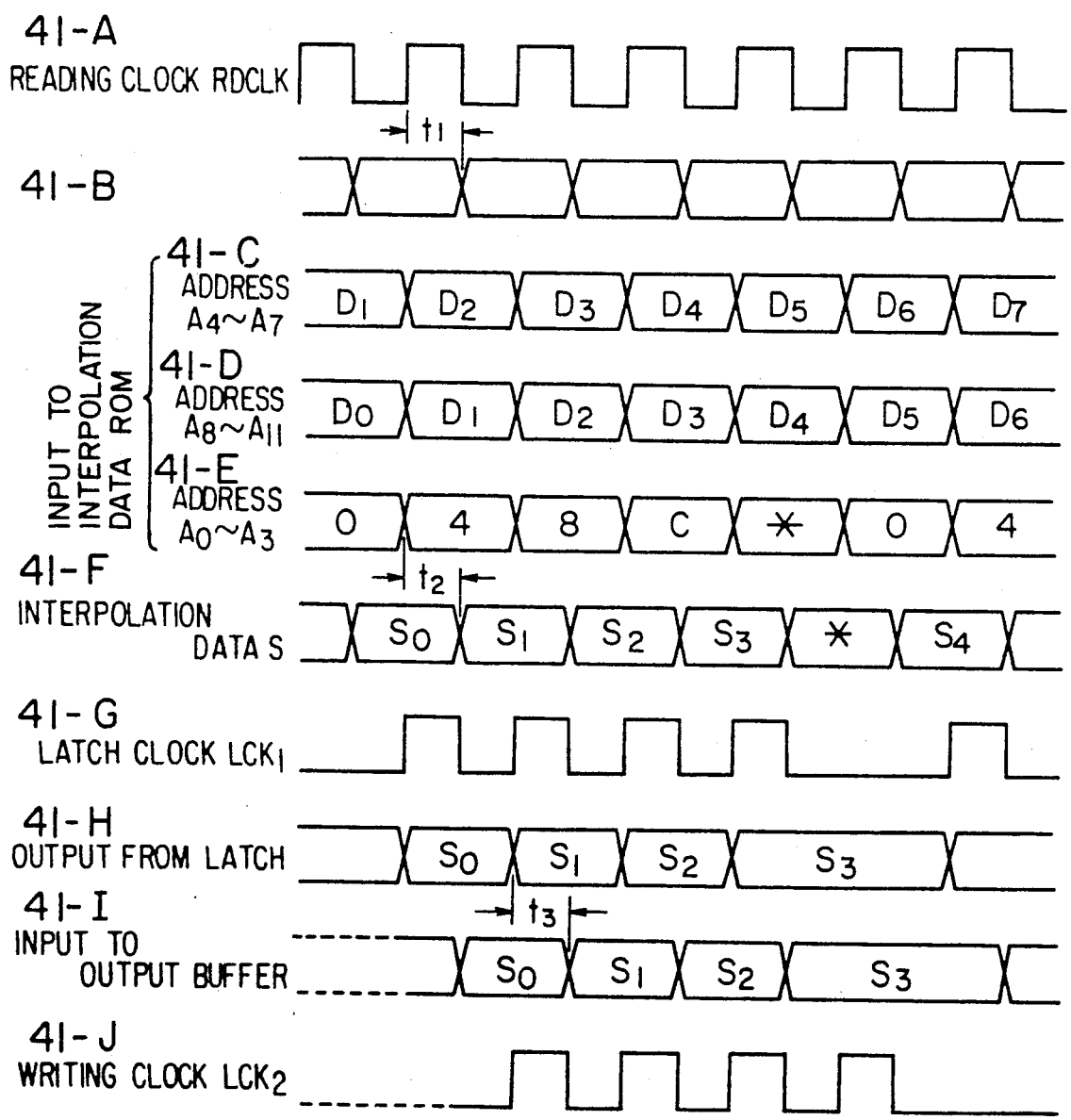
FIG. 41 is a waveform chart for explaining the image reduction operation.

Next, the reduction processing will be explained. FIG. 40 shows the image signals in the 80% reduction mode (0.8 enlargement ratio) using the analogous method, wherein D0, D1, D2, D3, ... are represented by the symbol mark 0, and the interpolation data S0, S1, ... are represented by the symbol X. FIG. 41 shows the timing chart of the signals in that case where the relationship between the original image data D and interpolation data S is indicated in FIG. 37 and the relationship between the original image data D and interpolation selection data SD is indicated in FIG. 36.

The gradation level of the image data is the same as that of the above-described enlargement processing. Two adjacent image data (for example, image data D1 and D0) are outputted as an address signal from the latch circuits 11 and 12 to the interpolation ROM 13, and externally set reduction ratio (80%) is supplied to the data selection signal write in circuit 310, which generally operates in the same manner as in the above-described enlargement processing.

In the case of the reduction processing, both the read out clock RDCLK and latch pulse DLCK have the same frequencies as that of the synchronous clock CLK1; and as for the interpolation selection data SD, the data shown in FIG. 36 is selected; therefore, the signal from the input buffer 400 and signal to and from the interpolation ROM 13 have the relationship as shown in FIG. 41 A through F.

On the other hand, the latch pulse LCK1 is as shown in FIG. 41 G, and the latch output is as shown in FIG. H. At this stage, since the write in clock LCK2 has the same frequency as that of the latch pulse LCK1, the data as shown in FIG. 41 I is written in the output buffer 450.

In the above-described embodiment, it has been clarified that if the enlargement/reduction ratio is altered, the interpolation selection data SD outputted from the interpolation data selection memory 320 is altered, and that the interpolation ROM 13 is addressed and its corresponding interpolation data S is outputted.

As described above, the input and output buffers are provided in the enlargement/reduction circuit 2, and the reading clock and the writing clock are modified according to the enlargement/reduction ratio, whereby the following advantages can be obtained.

First, the frequency of the reading clock of the input buffer is lowered according to the enlargement ratio in the enlargement mode; and the frequency of the writing clock of the output buffer is lowered according to the ratio in the reduction mode.

Accordingly, unlike in the conventional circuit construction, it is not required to install an exposure control circuit or a variable oscillator for the purpose of controlling the transfer clock or controlling the exposure quantity, thus the construction can be simplified.

Furthermore, since only the clock frequency of the input and output buffers has to be lowered, the upper limit of the enlargement/reduction ratio is not limited by the operation frequency of the circuit. Of course, since the interpolation data is used, no deterioration of the recorded image occurs.

Also, when using the interpolation selection data, the interpolation selection data written in a large capacity memory such as ROM is transferred to the data selection memory as required, and the transferred data is read out with high speed. The above data ROM can be also integrated with the ROM for storing the control program of the system control circuit, therefore, the circuit size of the ROM can be reduced, thus greatly reducing the manufacturing cost.

As explained above, according to the present invention, the interpolation data selection means storing the interpolation selection data for selecting the interpolation data from the interpolation table is provided, the interpolation data selection means is comprised of the writing circuit for writing an interpolation selection data and the data selection memory, wherein a plurality of the groups of the interpolation selection data predetermined for each of the enlargement/reduction ratio is stored in the writing circuit, a part of the interpolation selection data accommodated in the writing circuit is made to be stored in the data selection memory according to the designated enlargement/reduction ratio, and the interpolation selection data stored in the data selection memory is used as an address signal for reading out the interpolation data.

In addition, when implementing this image processing apparatus the values of the enlargement/reduction ratio can be determined with an arbitrary increment in the form of the percentage. Consequently, the enlargement/reduction ratio can be arbitrarily designed without being restricted by the binary counter constructing the address counter, as stated above.

Also, according to the present invention, since the interpolation data of the enlargement/reduction processing is obtained by means of using the interpolation table, unlike the conventional construction, it is not necessary to install the exposure control circuit or variable oscillator used for controlling the exposure quantity or transfer clock, thus the construction can be simplified. Of course the quality of the recorded image is not deteriorated, because the interpolation data is used.

Moreover, when this processing apparatus using the interpolation selection data SD, this data written in the large capacity writing circuit 310 is slowly transferred to the data selection memory 320 as required, then the transfer red data is read out with high speed.

The data ROM 311 can even be dispensed with by using the ROM for storing the control program of the system control circuit 80, therefore, the circuit size of the ROM can be reduced, thus greatly reducing the construction cost.

In the embodiment as shown in FIG. 14, as previously described, in order to perform the recording processing of the central reference, the read start address of the input buffer and the write start address of the output buffer are selected as shown in FIG. 32 depending on the enlargement/reduction ratio, however, the present invention is not limited only to this embodiment.

The following description deals with another embodiment wherein the preset data is used.

Figure 42:
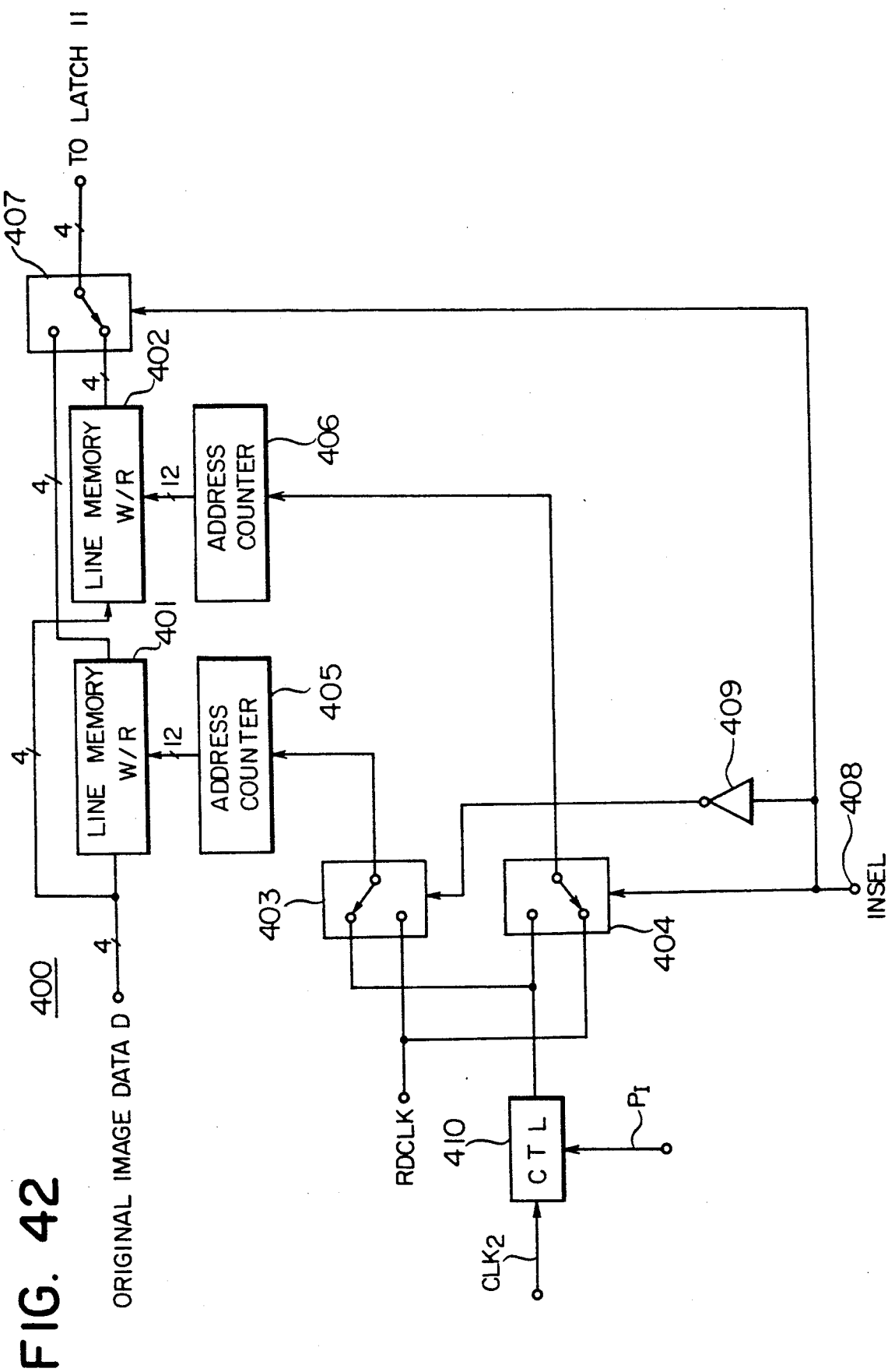
FIG. 42 is a block diagram showing an another example of the input buffer.

In the case wherein the preset data $P_1$ is inputted into the input buffer instead of the read start address of the input buffer as shown in FIG. 14, the input buffer as shown in FIG. 19 is altered to the one as shown in FIG. 42.

In the input buffer as shown in FIG. 42, in order to record the enlarged image using the center of the recording paper P as a reference in the enlargement mode as well, at the time of the enlargement processing, the write start timing of the input buffer of the original image is controlled depending on the enlargement ratio. Therefore, the clock CLK2 is fed to the first and second switches 403 and 404 through the clock output control circuit 410.

The control circuit 410 is supplied with the preset data $P_1$ for controlling the write start timing. The control circuit 410 is so constructed that the clock CLK2 is outputted when the value obtained by counting the number of the clock CLK2 coincide with the preset data $P_1$, whereby the data write quantity of the input buffer 400 is controlled.

In other words, for example, if the original image is enlarged two times as large as the original size, the image data quantity becomes two times as large as the original one due to the interpolation processing, so the data quantity to be written into the input buffer 400 should be restricted to the half of the original quantity beforehand.

On the other hand, the 2048th bit of the image data corresponds the position of the half of the capacity (4096 bits) of the effective horizontal line (effective length) with respect to the B4 size, which further corresponds to the center of the recorded image.

Figure 43:
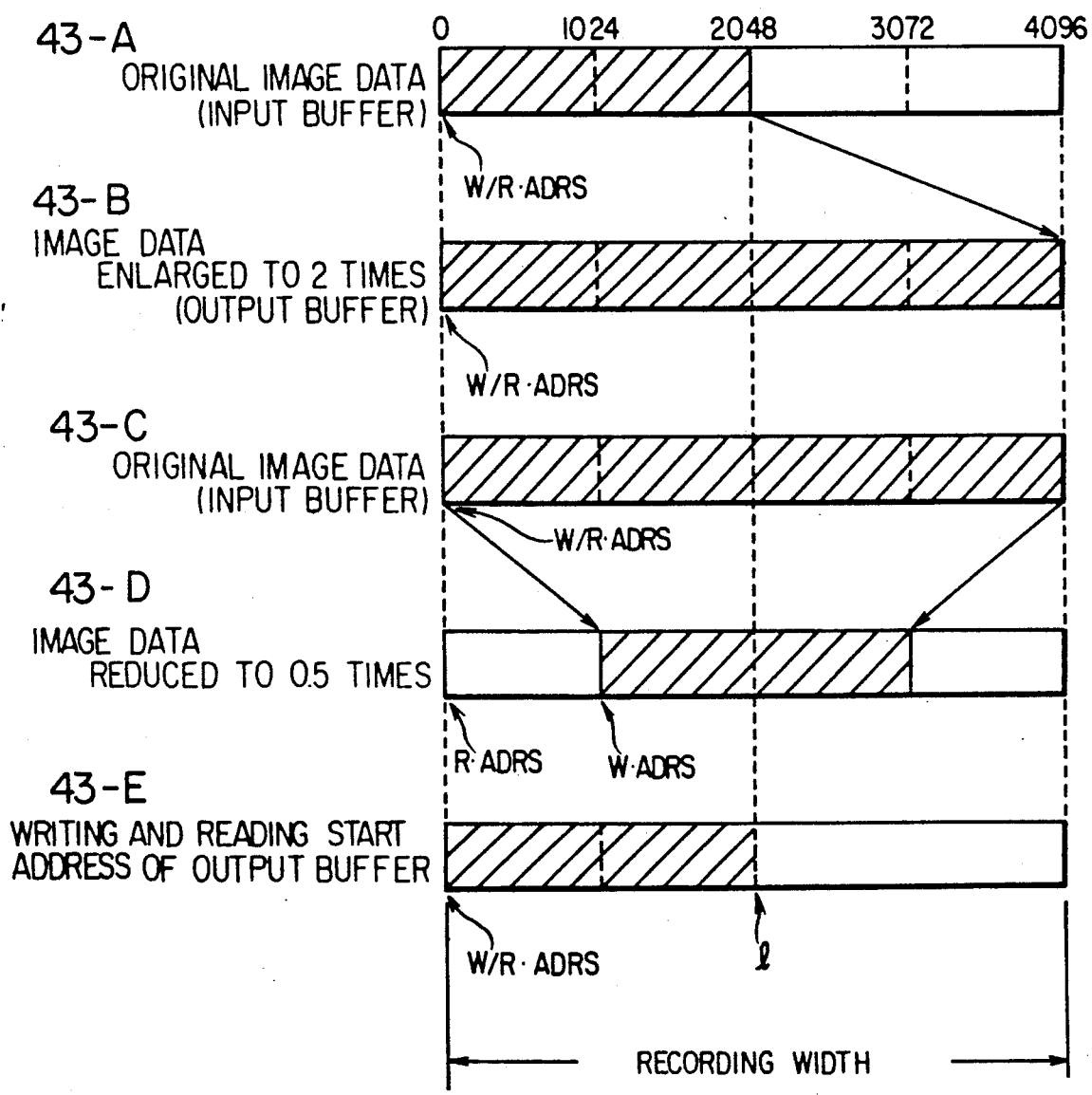
FIG. 43 is a schematic diagram for explaining the recording procedure according to the example as shown FIG. 42.

Thus, if the input image data ranging from 1024th bit to the 3072th bit, i.e., 2048 bits are sequentially written from the 0 address of the input buffer 400, as shown in FIG. 43, all the image data of those can be written into the output buffer 450 (FIG. 43 B) even if the data is increased to double in quantity by means of the interpolation processing.

In this case, as shown in FIG. 43, since the image data after the interpolation processing is the data being performed the enlargement processing using the image center ( as a reference center of processing, the required image area is entirely recorded.

Thus, in the enlargement mode, as shown in FIG. 31 B, the image is recorded on the recording paper P using the image center as a reference by means of controlling the write start address of the input image data to be inputted into the input buffer 400 depending on the preset enlargement/reduction ratio.

Accordingly, as shown below, the preset data $P_1$ of the enlargement mode is set in the same manner as in the case of the read start address of the input buffer shown in FIG. 32. Preset data $P_1 = (4096 - 4096 \div$ enlargement ratio$) / 2$ FIG. 43 C shows the recording example in the non-enlargement/reduction mode, wherein the aforementioned preset data $P_1$ is set to "0" both in the non-enlargement/reduction mode and in the reduction mode.

FIG. 43 E shows an example wherein the input data shown in FIG. 43 C is reduced to half in size and written into the output buffer the address 0 of it. If the image is recorded sequentially from the left side of the recording paper under this condition, as previously described and as shown in FIG. 48 A, the image cannot be properly recorded.

Consequently, if the write address of the output buffer is selected depending on the reduction ratio as shown in FIG. 32, and if the recording processing is done as shown in FIG. 43-D, then the image can be properly recorded.

To solve the above-mentioned problem, the preset data $P_0$ can be also used. That is to say, instead of the write start address of the output buffer as shown in FIG. 14, the preset data $P_0$ is inputted into the output buffer. In this case, the output buffer as shown in FIG. 20 is altered to the one as shown in FIG. 44.

Figure 44:
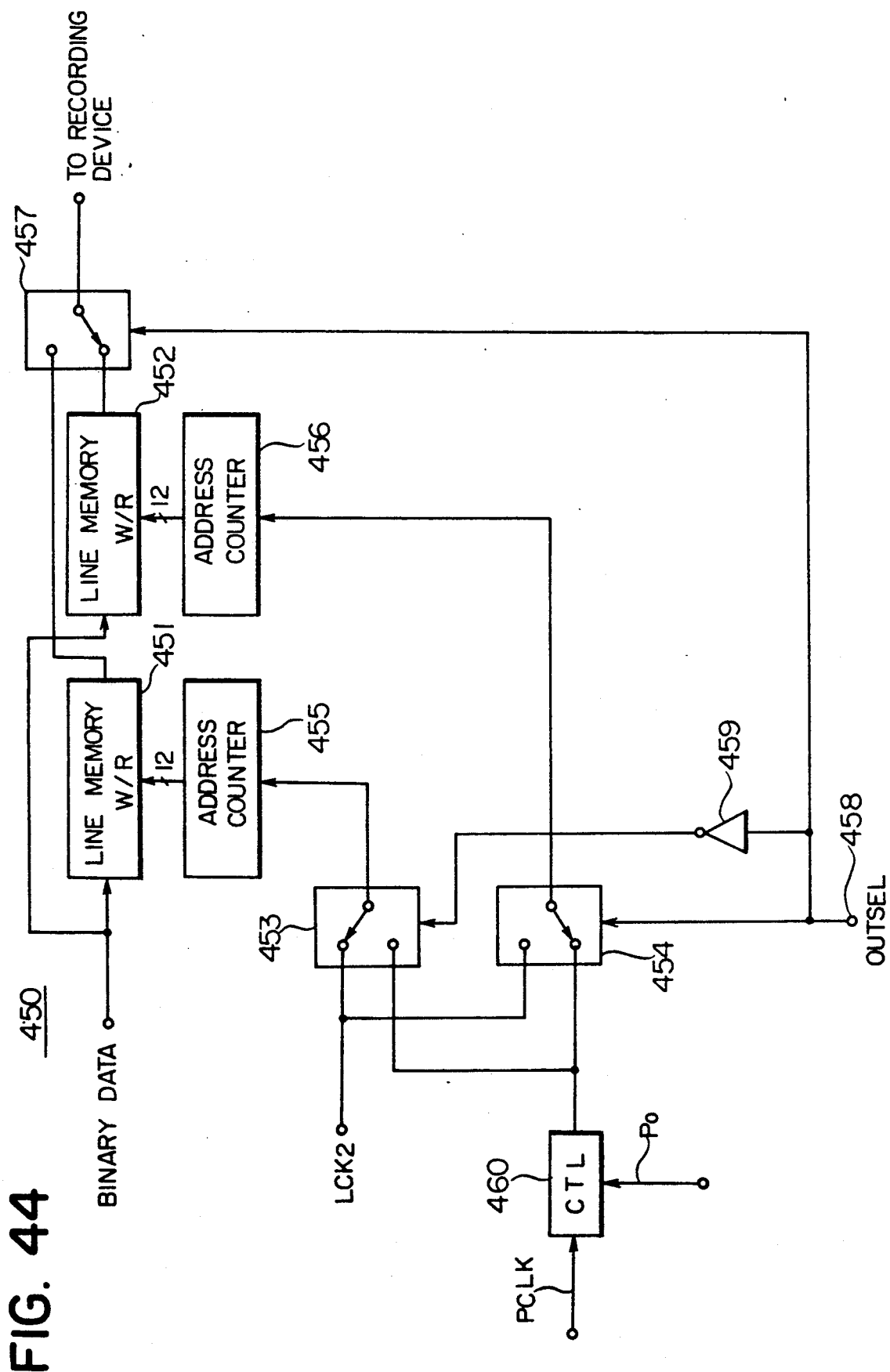
FIG. 44 is a block diagram showing an another example of the output buffer.

In FIG. 44, in order to record the reduced image using the center of the recording paper P as a reference in the reduction mode, the read start timing of the output buffer is controlled depending on the reduction ratio. Therefore, the clock PCLK is fed to the clock output control circuit 460 comprised of such as a gate circuit, to which the preset data $P_0$ for controlling the read start timing is fed.

The control circuit 460 is so designed as to start outputting the clock PCLK when the counted value of the clock PCLK meets the preset data $P_0$, whereby the write start timing for the recording paper P is altered.

Figure 45:
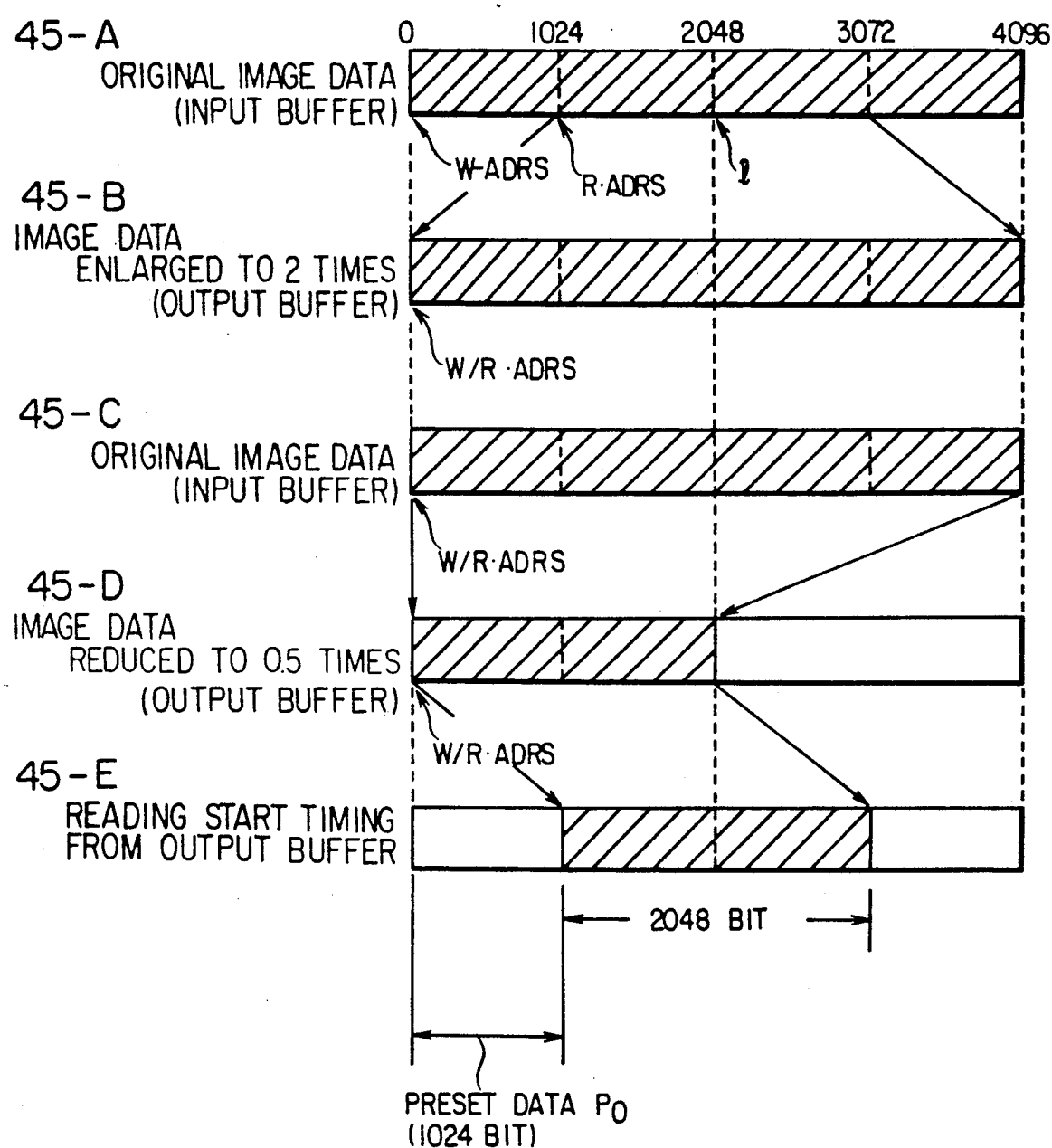
FIG. 45 is a schematic diagram for explaining the recording procedure according to the example as shown in FIG. 44.

In the reduction mode, as shown in FIG. 45-C, the writing and reading processes of the data in and from the input buffer 400 is done in the same manner as in the case of the non-enlargement/reduction mode, i.e., writing in and reading from the address 0.

If the data is written in from the address 0 without controlling the write start address of the output buffer, for example, then in the case of reducing the image to half in size, the recorded image will be like as shown in FIG. 45-D.

If the read start address of the image data from the output buffer is set to address 0, then, as shown in FIG. 45 D, the image is recorded in such a manner in which the image is excessively deflected from the center line. To prevent such a disadvantage, the number of the read start data should be set to the 1024th bit using the preset data $P_0$ (FIG. 45-E). This, in turn, means that the vacant data (equivalent to white) is recorded up to the 1024th bit, whereby, as shown in FIG. 31-A, the image is recorded using the center 1 of the recording paper P as a reference.

Then the preset data $P_0$ is, in the same manner as in the case of the write start address of the output buffer as shown in FIG. 32, set depending on the enlargement/reduction ratio as:

Preset data $P_0 = (4096 - 4096 \times \text{reduction ratio}) / 2$.

The recording process based on the central reference is performed by means of the preset data $P_1$ of the input buffer and the write start address of the output buffer as for the case as shown in FIG. 43, and by means of the read start address of the input buffer and the preset data $P_0$ of the output buffer as for the case as shown in FIG. 45, respectively. However, of course, the processing described above can be also performed by means of combining the preset data $P_1$ of the input buffer and the preset value $P_0$ of the output buffer.

In the above-mentioned construction, the present invention is applied to the image processing device wherein an image is read using the central line of the original as a reference line so as to record the image; the present invention is also applied to the image processing device other than described above.

First, if the image processing system employs the system wherein both the image reading and image recording are processed by means of using the side end of both the original and recording paper as a reference line, of both the image read out start position of the CCDs 56 and 57 and the recording start position (optical scanning start position; the recording beam start position of the laser beam in the laser printer) are the same, then the application of the present invention to the system can be done without any problem.

Second, in an image processing device wherein the image reading is performed using the center line of the original as a reference line. And the image recording is processed using the one side of the recording paper as a reference, the read out start address of the input buffer 400 is designed in the following manner as described below:

In this case, the write in start address of the output buffer 450 is always 0; and the read out start address of input buffer cannot be determined by the enlargement/reduction ratio only, but it depends on the size of the original. Consequently, in the image processing device of this type, the read out start address is determined by the designated enlargement/reduction ratio and the size of the original.

Figure 46:
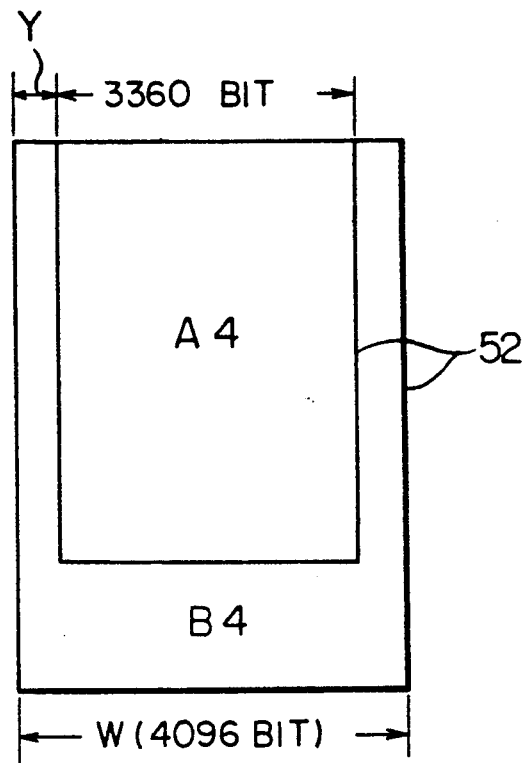
FIGS. 46 and 47 are diagrams showing another example of image reading and image recording.

The following description will deal with the case, as shown in FIG. 46, wherein the size of the original 52 to be read is A4. As described above, when the condition is 16 dots/mm, the number of bits corresponding to the width of the A4 is:

210 mm $\times$ 16 dots/mm = 3360 bits accordingly, if the maximum read out size of the original is B4, the read out start address with respect to the line memory of the input buffer is obtained by firstly comparing a read out start address corresponding to the width Y shown in FIG. 42 and a read out start address indicated in FIG. 32 which is determined to avoid the overflow of the image data due to enlargement processing, and by secondly selecting the larger value between the above both read out start addresses.

Therefore, the read out start address in the non-enlargement/reduction mode can be expressed in the following equation:

$(4096 - 3360)/2 = 368$ bits.

FIG. 48 shows each value of the write in start address of the output buffer 450, and the read out start address of the input buffer 400 in the arbitrary enlargement/reduction mode, wherein the size of the original is A4.

Figure 47:
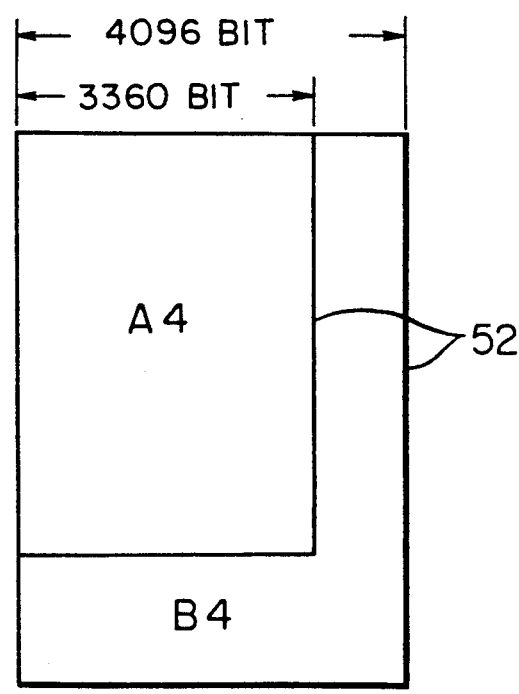

Third, in the image processing device, as shown in FIG. 47, wherein the image reading is performed using the one side of the original as a reference, and the image recording is processed using the center line 1 of the recording paper as a reference line, the read out start address of the input buffer 400 and the write in start address of the output buffer 450 are to be determined as follows.

In the case of $4096 > 3360 \times$ enlargement/reduction ratio, the write in start address of the output buffer 450 is set; and in the reversed case, the read out start address of the input buffer 400 is set.

Accordingly, in the case of $4096 < 3360 \times$ enlargement/reduction ratio the write in start address is:
Write in start address $= (4096 - 3360 \times \text{enlargement/reduction ratio}) / 2$.

In this case, the read out start address of the input buffer 400 is 0 address.

On the other hand, if $4096 < 3360 \times$ enlargement/reduction ratio, then the read out start address $= (3360 - 4096/\text{enlargement/reduction ratio}) / 2$.

In this case, the write in start address of the output buffer 450 is 0.

As a result, the read out start address of the input buffer 400 and the write in start address of the output buffer 450 in the specified range of enlargement/reduction ratios will have the values as shown in FIG. 49.

In this way, the read out start address or the write in start address, can be modified in accordance with the read out reference or the write in reference of the original.

Incidentally, in the above example, the preset data $P_1$ in place of the read out start address of the input buffer and the preset data $P_0$ in place of the write in start address of the output buffer can be applicable. As described above, according to the present invention, the read out start address to the line memory provided in the input buffer and the write in start address to the line memory provided in the output buffer can be controlled in accordance with the enlargement/reduction ratio, thus eventually providing the same effect which can be obtained when the enlargement/reduction is performed using the center line of the original as a reference line and also when the recording is performed using the center line of the recording paper as a reference line.

As a result, the image processing device according to the present invention is characterized in that the necessary image can be correctly recorded, because the enlarged image is not biasedly recorded nor is the unnecessary white area enlarged and recorded. Likewise, in the case of reduction processing, the reduced image is not biasedly recorded nor is the image recorded outside the transfer area of the recording paper.

Furthermore, as other advantages according to the present invention, the interpolation data can be obtained by means of referring to the data table, thus enhancing the image quality compared with the one obtained by the conventional method; and moreover, a high-speed processing becomes possible.

The following description deals with the means for making the non-effective area of the image data clear during the image processing according to the present invention.

Figure 50:
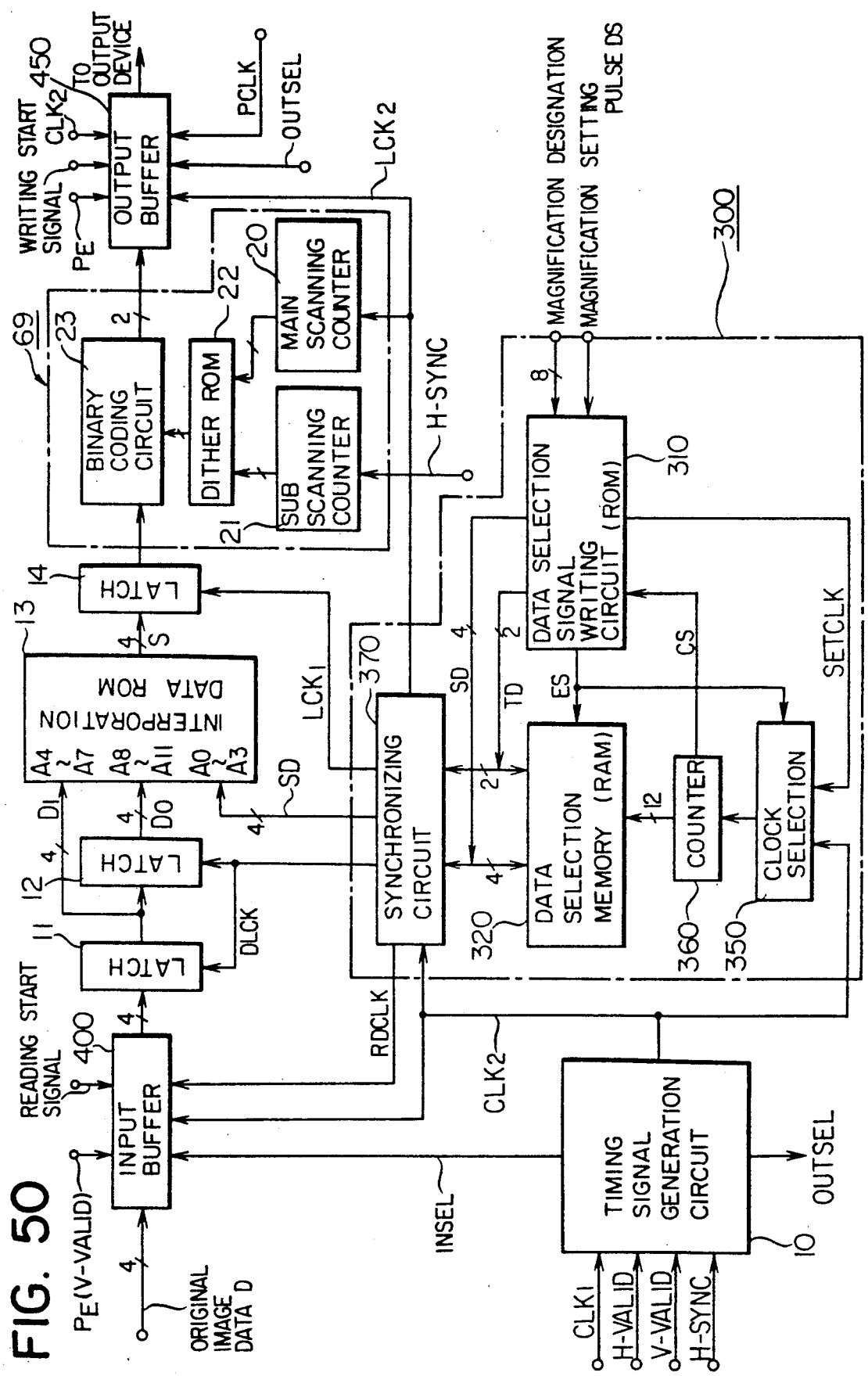
FIG. 50 is a block diagram incorporating a clearing means into the enlargement/reduction circuit as shown FIG. 14.

FIG. 50 shows an example wherein the above-mentioned clearing means is applied to the enlargement/reduction circuit as shown in FIG. 14.

Figure 51:
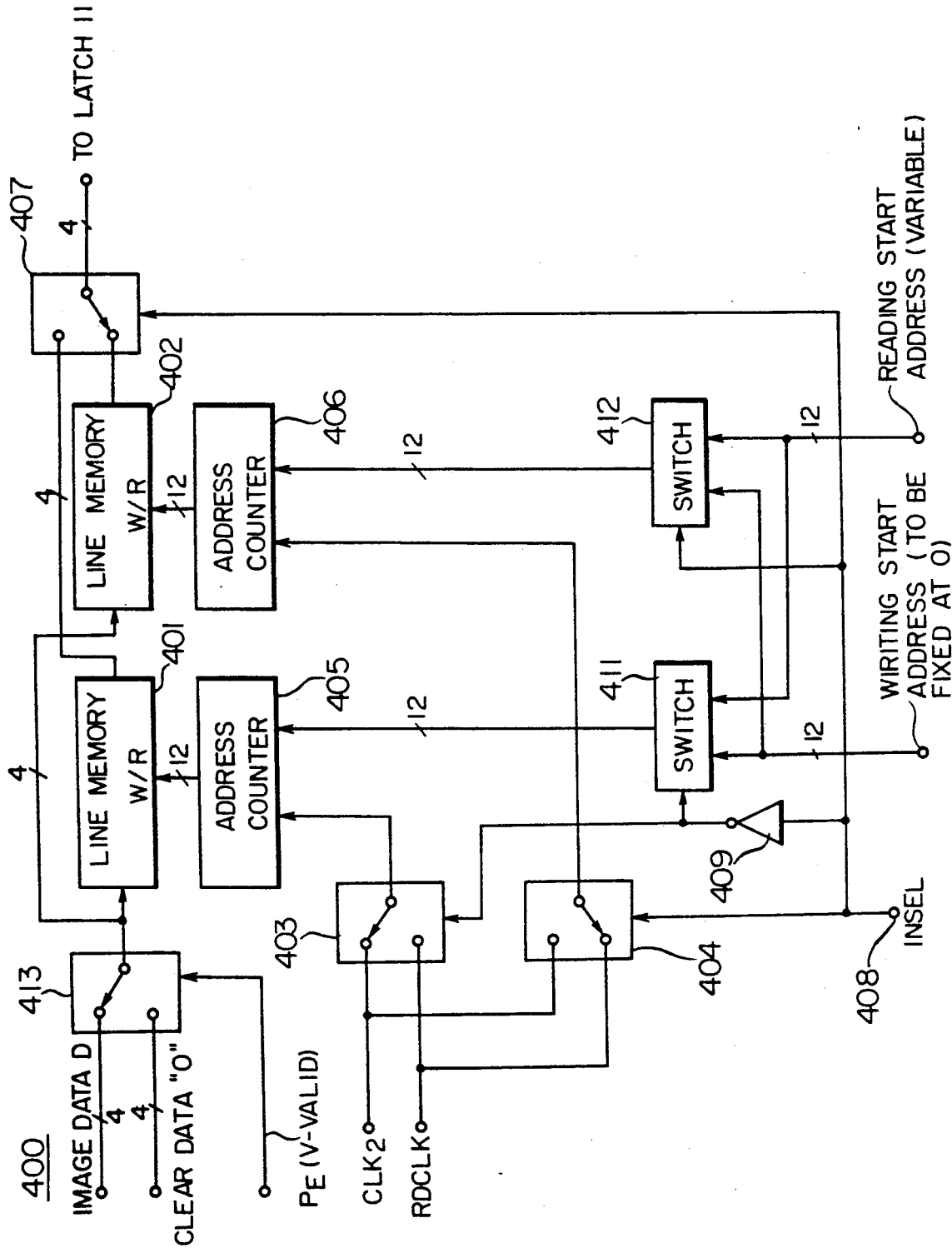
FIGS. 51 and 52 are block diagrams showing input and output buffer incorporated in FIG. 50.
Figure 52:
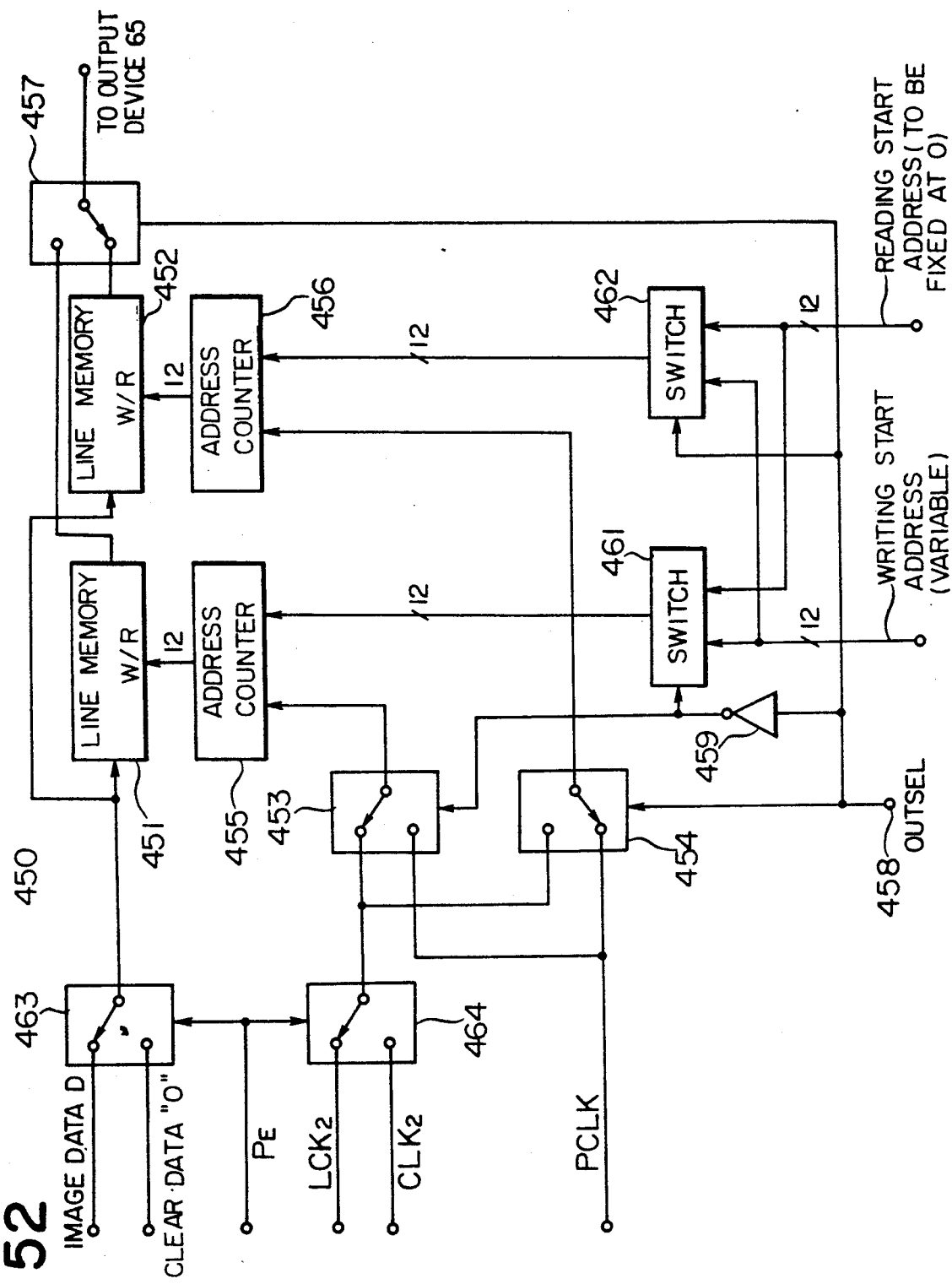

The input buffer and output buffer shown in the FIG. 50 are so constructed as shown in FIGS. 51 and 52, respectively.

In FIG. 51, a pair of line memories 401 and 402 are provided in the input buffer 400, and the image data D for one line or clear data is selectively fed to each line memory. The numeral 413 represents the switch (the sixth switch) used for feeding the data described above, which is controlled by the vertical effective area signal V-VALID or the clear signal PE related to the aforementioned vertical effective area signal, whereby the image data of the line memories 401 and 402 are completely cleared by means of using the period of the non-effective area. The clear data is the data "0" corresponding to the white information.

In FIG. 52, a switch 463 (the sixth switch) is provided in data feeding lines to a pair of line memories 451 and 452, whereby the clear data and the image data fed from the enlargement/reduction circuit 2 are selectively fed.

The clear data is used for clearing the data contents of the pair of line memories 451 and 452 before the image data is fed.

This is because, as already described above, there is a possibility that the unwanted image data (invalid image data) remains in the line memories 451 and 452 unless these line memories are cleared after either altering the enlargement/reduction ratio or turning on the power.

As for the clear data, the data "0" or "1" is used. In this example, the data "0" corresponding to the white digit is used as a clear data, because a binary data is used as an image data.

At the input side of the first switch 453, the seventh switch 464 is further provided for the purpose of switching the write clock LCK2 and the synchronization clock CLK2. This is because especially in the case of reduction processing, the number of bits of the aforementioned writing clock LCK2 becomes less than 4096 bits per one line, therefore, when clearing the image data, all the data of the line memories 451 and 452 have to be completely cleared by means of selecting the synchronization clock CLK2. The synchronization clock CLK2 is identical to the transfer signal fed to the photoelectric conversion elements 56 and 57.

The sixth and seventh switches 463 and 464 are, as shown by the clear signal PE, both simultaneously controlled.

Figure 53:
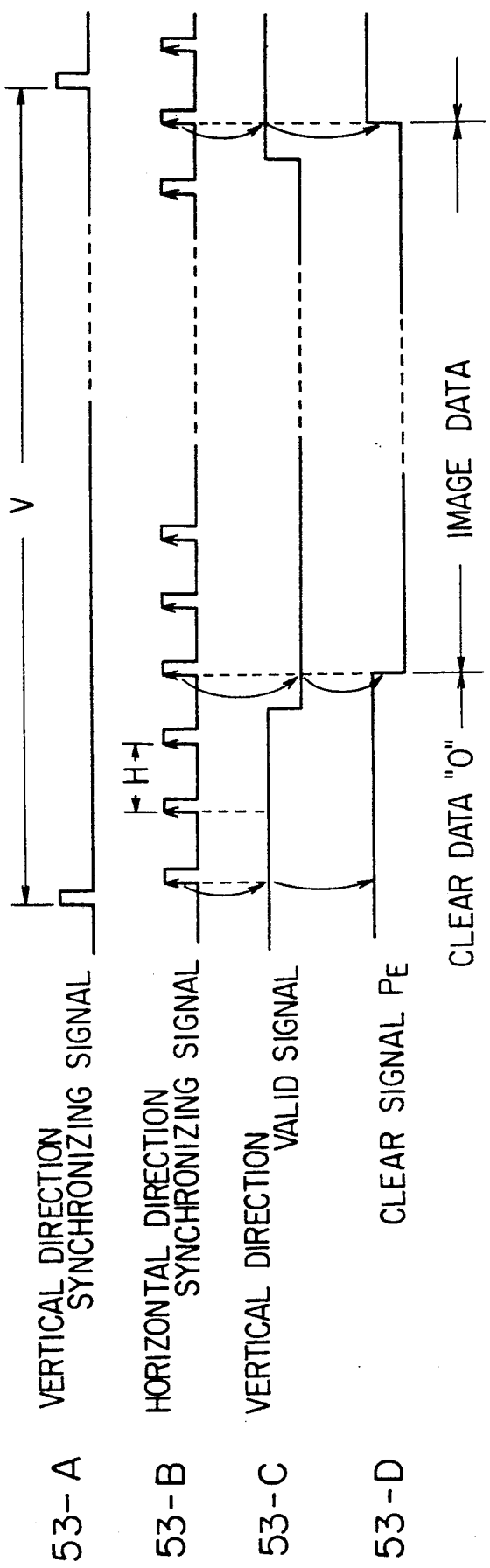
FIG. 53 is a timing chart for explaining a clearing operation.
Figure 54:
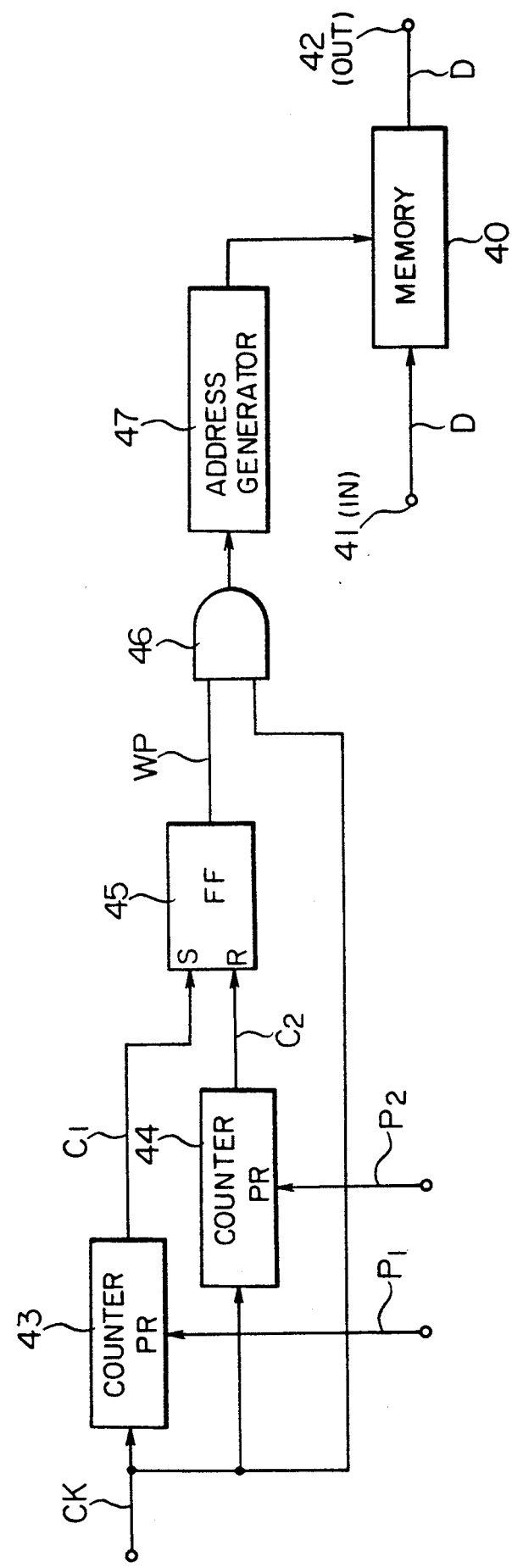
FIG. 54 is a block diagram showing an example of the main portion of the conventional enlargement/reduction type image processing device.
Figure 55:
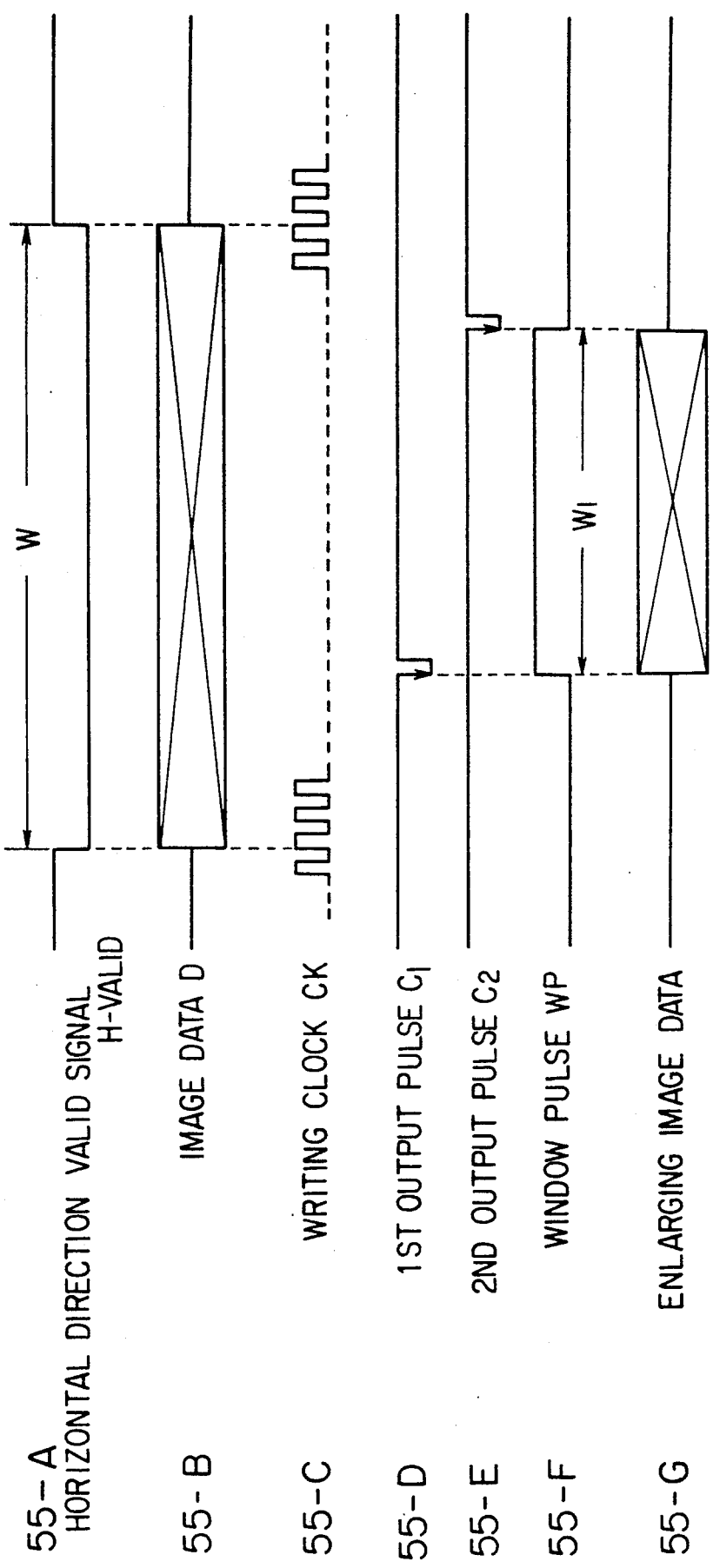
FIG. 55 is a waveform chart for explaining the operation of the conventional image processing device described above.

The clearing timing with respect to the line memories 451 and 452 are implemented during the period other than the effective area of the image reading; in this example, the vertical non-effective area is used for that purpose. Consequently, as shown in FIG. 53 B and C, the signal shown in FIG. 53 D which is generated by latching the vertical effective area signal (V-VALID) with the horizontal synchronization signal (H-VALID) is used as the clear signal PE.

Only during the period wherein the clear signal PE is "1," the status is switched to the clear data or to the synchronization clock CLK2. The vertical effective area signal V-VALID may be used instead of the clear signal PE.

During the period of clearing the image data, the writing start address is set to "0," whereby the image data of the line memories 451 and 452 are always all cleared regardless of the enlargement/reduction ratio to be processed.

As explained above, the image processing device according to the present invention is so constructed that the data written in the line memory is cleared at least just before the image data is written therein; therefore, the invalid image data stored before and still remaining after altering the enlargement/reduction ratio or written at the time of turning on the power of the device is completely cleared just before the wanted image data is written in, thus only the wanted image data can be always read out from the memory.

What is claimed is:

1. An image processing apparatus for processing original image data of a line of pixels of an original image which are obtained by scanning the original image line-by-line in a main scanning direction using an image reading device, wherein said image data of a line of pixels of the original image is processed to produce new image data of a line of pixels of an enlarged or reduced image in the main scanning direction, the apparatus comprising:

(1) input buffer means for temporarily storing the original image data of a line of pixels of the original image;

(2) means for obtaining new image data of a line of pixels of the enlarged or reduced image in response to a designated enlarging or reducing scale ratio by processing said original image data of a line of pixels of the original image;

(3) output buffer means for temporarily storing said new image data of a line of pixels of the enlarged or reduced image; and (4) means for generating a first clock signal which has the same frequency as that of a clock signal used in said image reading device, said first clock signal controlling the timing of writing said original image data into said input buffer means;

wherein said means for obtaining new image data comprises:

(a) means for generating a second clock signal which is to remove pulses from said first clock signal at predetermined intervals in response to said designated enlarging scale ratio, said second clock signal controlling the timing of reading out said original image data from said input buffer means; and (b) means for generating a third clock signal which is to remove pulses from said first clock signal at predetermined intervals in response to said designated reducing scale ratio, said third clock signal controlling the timing of said writing said new image data into said output buffer means.

2. The image processing apparatus of claim 1, wherein said means for generating the second clock signal and said means for generating the third clock signal generate said second clock signal and said third clock signal in response to a timing signal stored in a memory means.

3. The imaging processing apparatus of claim 1, wherein said means for obtaining new image data of a line of pixels includes means for enlarging or reducing by interpolation.

4. The image processing apparatus of claim 3, wherein said means for enlarging or reducing includes a first memory means for storing a look-up table of interpolation data.

5. The image processing apparatus of claim 4, wherein said means for enlarging or reducing includes a second memory means for storing interpolation data selection signals which address said first memory means storing said look-up table in order to address and output a portion of said interpolation data.

6. The image processing apparatus of claim 4, wherein said second memory means includes means for storing data of processing timing signals for controlling said second clock signal and said third clock signal.

7. The image processing apparatus of claim 4, wherein said means for enlarging or reducing includes means for designating an enlargement or reducing scale ratio and data-writing means for selecting and reading out a selected part of said stored data of interpolation data selection signals in accordance with the designated enlarging or reducing scale ratio from the second memory means to write the read out data into a high-speed RAM.

8. The image processing apparatus of claim 7, wherein said second memory stores a plurality of groups of data representing the interpolation data selection signal, each of said groups of data corresponding to a enlarging or reducing scale ratios, and wherein said data-writing means reads out a group of data of the interpolation data selection signal in accordance with a designated enlarging or reducing scale ratio and writes the read out group of data into said high-speed RAM.

9. The image processing apparatus of claim 8, wherein said data-writing means writes the read out group of data into said high-speed RAM to obtain the interpolation data selection signal corresponding in number to a line of pixels of an original image.

10. The image processing apparatus of claim 1, wherein said means for obtaining said new image data of an enlarged or reduced image of a line of pixels includes means for binarizing image data.

11. The image processing apparatus of claim 1, further comprising an address control means for controlling a writing/reading address of said input buffer means and said output buffer means in accordance with a designated enlarging or reducing scale ratio so that reference positions of the original image and the recorded image are set at a predetermined position.

12. The image processing apparatus of claim 11, wherein said address control means changes a read start address of said input buffer in accordance with a designated enlarging scale ratio.

13. The image processing apparatus of claim 11, wherein said address control means changes a start timing for writing image data into said input buffer in accordance with a designated enlarging scale ratio.

14. The image processing apparatus of claim 11, wherein said address control means changed a write start address of said output buffer in accordance with a designated reducing scale ratio.

15. The image processing apparatus of claim 11, wherein said address control means changes a start timing for reading image data from said output buffer in accordance with a designated reducing scale ratio.

16. The image processing apparatus of claim 11, wherein said address control means changes a writing/reading address of said input buffer and said output buffer in accordance with a selected size of recording paper.

17. The image processing apparatus of claim 1, further comprising clear means for clearing an image data of said output buffer.

18. The image processing apparatus of claim 17, wherein new image data is written into said output buffer to replace data stored in said output buffer, said wherein said clear means clears old data stored in said output buffer which are not replaced with said new data.

19. The image processing apparatus of claim 17, wherein said clear means clears said output buffer in synchronization with clock pulses having the same frequency as that of said first clock signal.

20. An image reading apparatus for reading an original image and producing new image data, comprising:

(1) image reading means for scanning an original image line-by-line in a main scanning direction in synchronization with a scanning clock signal to obtain original image data of a line of pixels;

(2) input buffer means for temporarily storing the original image data of a line of pixels of the original image;

(3) means for controlling the timing of writing said original image data into said input buffer means by using a first clock signal which has the same frequency as that of the clock signal used in said image reading device;

(4) means for obtaining new image data of a line of pixels of an enlarged or reduced image by processing said original image data of a line of pixels of the original image, said means for obtaining new image data comprising means for generating a second clock signal which is to remove pulses from said first clock signal at predetermined intervals in response to a designated enlarging scale ratio and means for generating a third clock signal which is to remove pulses from said first clock signal at predetermined intervals in response to a designated reducing scale ratio;

(5) output buffer means for temporarily storing said new image data of a line of pixels of the enlarged or reduced image;
(6) means for controlling the time of reading out said original image data from said input buffer means by using the second clock signal in the case of enlargement process; and
(7) means for controlling the timing of writing said new image data into said output buffer means by using the third clock signal in the case of reduction process.

21. The image processing apparatus of claim 1, further comprising address control means for controlling a readout start address and a readout stop address in said input buffer means in response to an enlarging scale ratio so that the amount of said original image data readout from said input buffer means is reduced in accordance with the enlarging scale ratio.

* * * * *

UNITED STATES PATENT AND TRADEMARK OFFICE
CERTIFICATE OF CORRECTION

PATENT NO. : 5,029,017
DATED : July 02, 1991
INVENTOR(S) : Yoshinori Abe et al.

It is certified that error appears in the above-identified patent and that said Letters Patent is hereby corrected as shown below:

Claim 8, column 37, line 55, change "a" to --an--.

Column 37, line 55, change "ratios" to --ratio--.

Claim 18, column 38, line 34 change "said" (second occurence) to --and --.

Title page, item [54], and col. 1, lines 1-2, change "APPARATUS" to --OPERATION--.

Signed and Sealed this

Twentieth Day of April, 1993

*Attest:*

MICHAEL K. KIRK

*Attesting Officer*   Acting Commissioner of Patents and Trademarks